May 15, 1934.                H. ISHERWOOD                1,958,515
                          CALCULATING MACHINE
                    Filed July 9, 1930       19 Sheets-Sheet 1
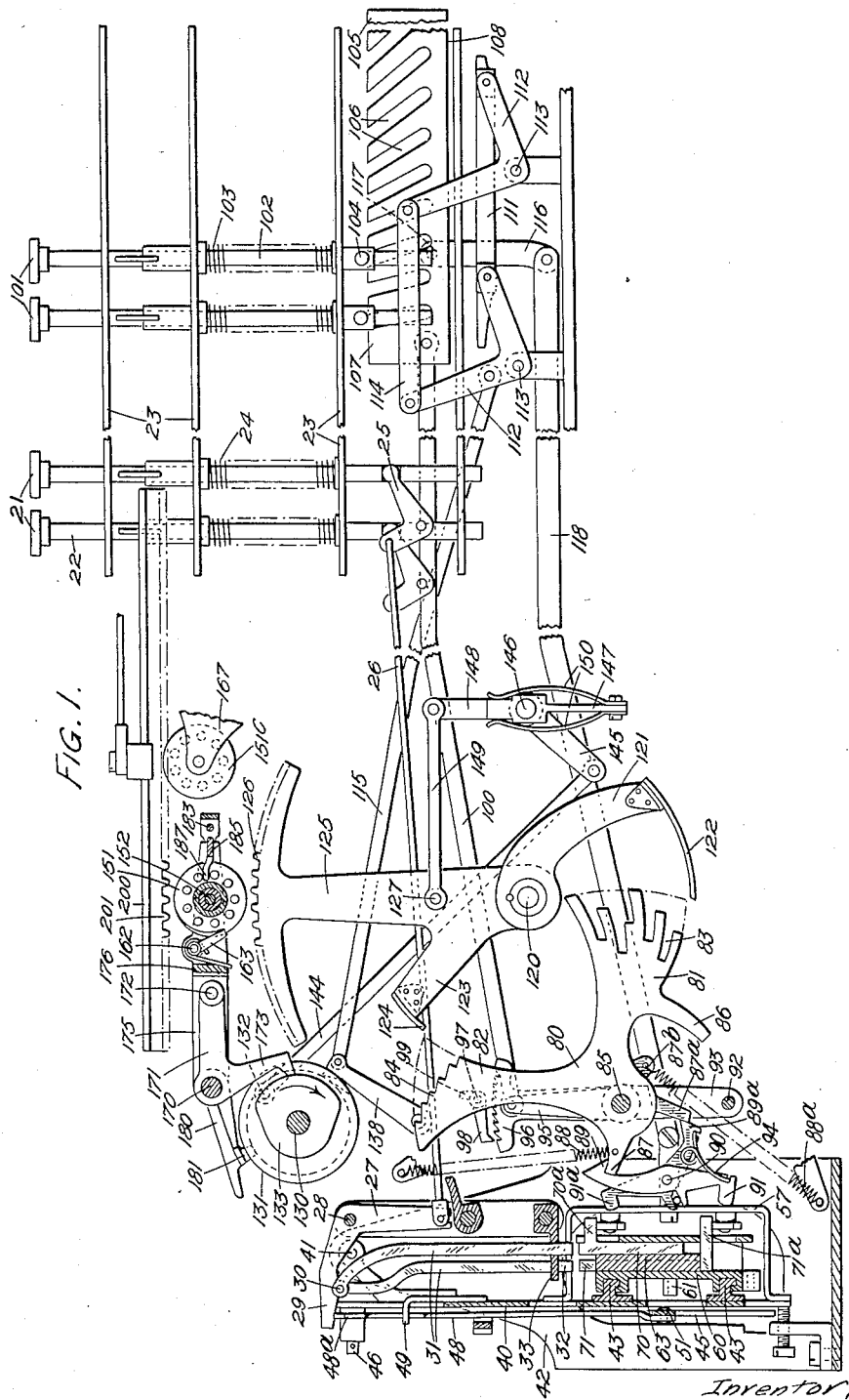

May 15, 1934. H. ISHERWOOD 1,958,515
CALCULATING MACHINE
Filed July 9, 1930 19 Sheets-Sheet 2
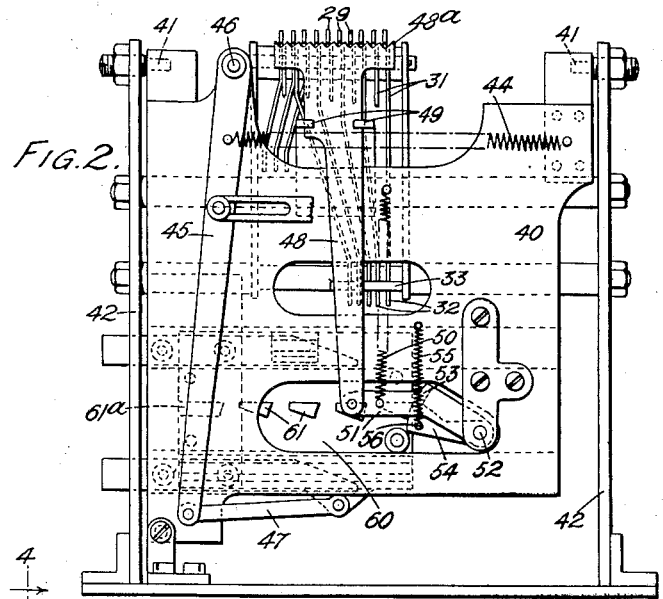
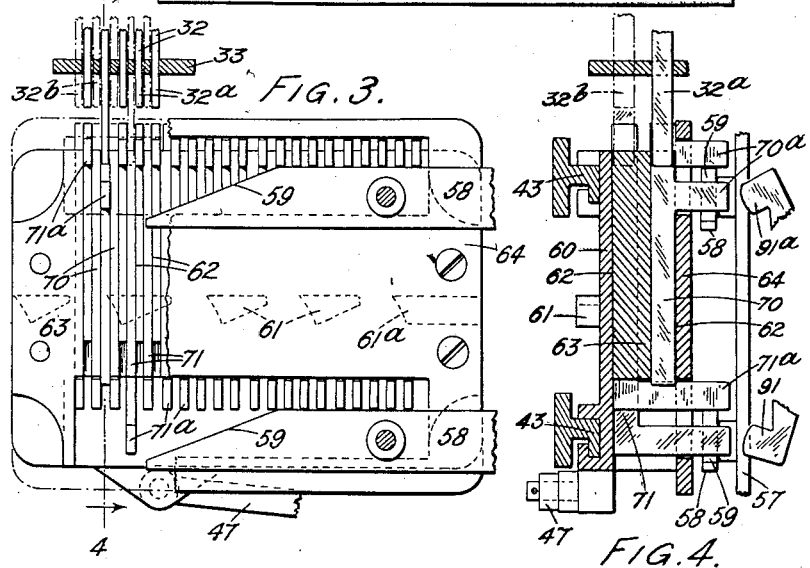
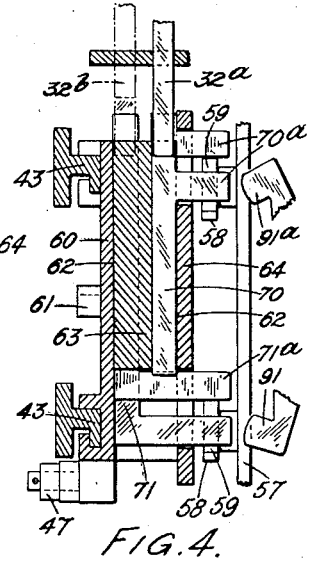
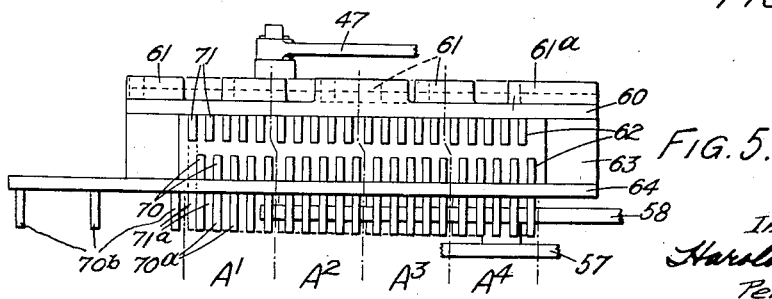
Inventor,
Harold Isherwood
Per,
Watson, Cait, Morse & Grindle Atty.

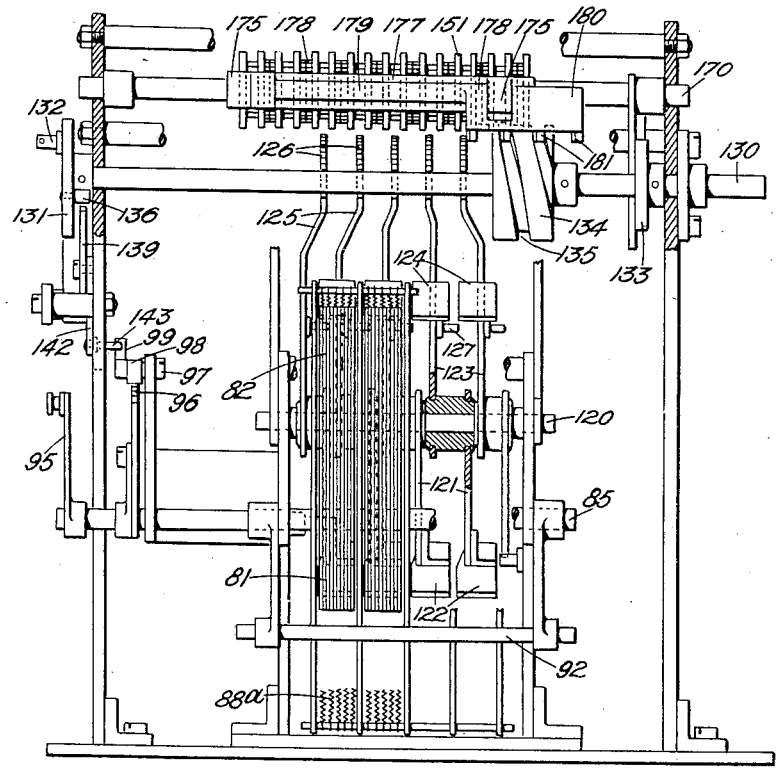

May 15, 1934.  H. ISHERWOOD  1,958,515
CALCULATING MACHINE
Filed July 9, 1930  19 Sheets-Sheet 4
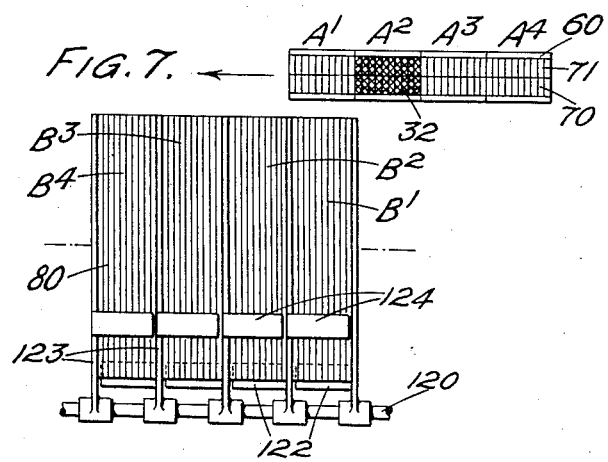
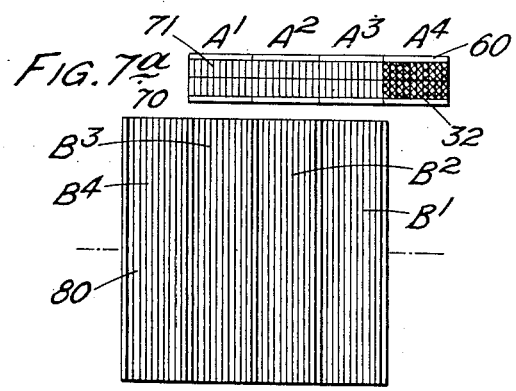
Inventor,
Harold Isherwood
Per,
Watson, Coit, Morse & Grindle
Atty.

May 15, 1934.  H. ISHERWOOD  1,958,515
CALCULATING MACHINE
Filed July 9, 1930  19 Sheets-Sheet 5

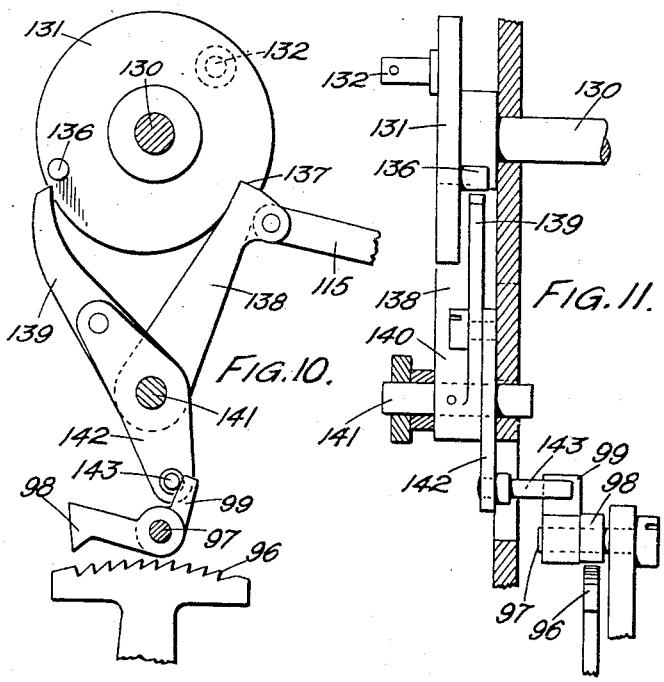
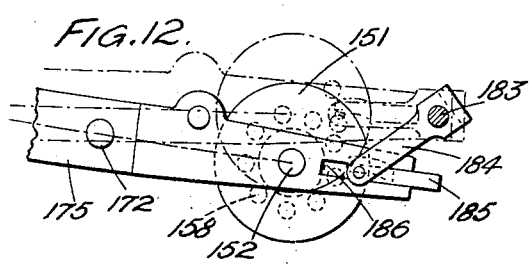
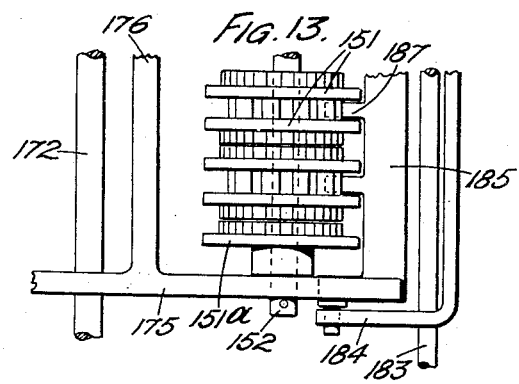

May 15, 1934.  H. ISHERWOOD  1,958,515
CALCULATING MACHINE
Filed July 9, 1930    19 Sheets-Sheet 7

Inventor,
Harold Isherwood
Per,
Watson, Coit, Morse & Grindle
Atty.

May 15, 1934. H. ISHERWOOD 1,958,515
CALCULATING MACHINE
Filed July 9, 1930 19 Sheets-Sheet 8

Inventor,
Harold Isherwood
Per,
Watson, Coit, Morse & Grindle
Attny.

May 15, 1934.   H. ISHERWOOD   1,958,515
CALCULATING MACHINE
Filed July 9, 1930   19 Sheets-Sheet 10

Inventor,
Harold Isherwood
Per,
Watson, Coit, Morse & Grindle
Atty.

May 15, 1934.  H. ISHERWOOD  1,958,515
CALCULATING MACHINE
Filed July 9, 1930   19 Sheets-Sheet 12

Inventor
Harold Isherwood
Per,
Watson, Coit, Morse & Grindle
Atty.

May 15, 1934.　　　　H. ISHERWOOD　　　　1,958,515
CALCULATING MACHINE
Filed July 9, 1930　　　19 Sheets-Sheet 18

May 15, 1934. H. ISHERWOOD 1,958,515
CALCULATING MACHINE
Filed July 9, 1930 19 Sheets-Sheet 19

Inventor,
Harold Isherwood
Per,
Watson Cole, Morse & Grindle Atty

Patented May 15, 1934

1,958,515

UNITED STATES PATENT OFFICE 1,958,515

CALCULATING MACHINE

Harold Isherwood, London, England

Application July 9, 1930, Serial No. 466,783
In Great Britain July 19, 1929

68 Claims. (Cl. 235—61)

This invention relates to calculating machines for performing multiplication of the general type which comprises members of the nature of stops to which number values are assigned, these numbers being first selected and positioned as a result of depressing keys to feed in the figures in the two factors and being subsequenty felt for the purpose of ascertaining the number values represented by them. The number values which have been thus ascertained in terms of distances moved are then transmitted into answer-indicating mechanism.

One object of the present invention is to provide for a calculating machine of the above type improved key-actuated selecting mechanism for stop members constituting mechanical representations of partial products.

A further object of the present invention is to provide an improved construction and arrangement of members constituting mechanical representations of partial products together with mechanism for operating these members. For convenience these members are referred to in the specification and claims by the arbitrarily selected term "templates". It will nevertheless be understood that the term is intended to designate members having such configuration that by their position with respect to cooperating portions of the machine they may represent a value or values, and that the word is not to be understood in its more common sense in which it is applied to a member used for a pattern or guide.

A further object of this invention is to provide improved means for feeling the template members so as to ascertain the numerical values of the partial products represented by them and to transmit these partial products into answer-indicating mechanism.

Yet another object of the present invention is to provide a complete calculating machine of the type indicated wherein are combined the improved key-actuated selecting mechanism, the improved template members and means for operating them, and the improved feeling mechanism together with mechanism for presenting the answer in printed form.

The word "sum" is used throughout the specification in its more general sense, meaning a problem to be solved; an example.

The improved key-actuated selecting mechanism comprises a set of key-actuated members and a plurality of individually movable members mounted on a carriage and arranged in sets the number of these members in each set corresponding to the number of the key-actuated members. The carriage can be traversed relatively to the key-actuated members and the movable members on the carriage can thus be brought in successive sets into operative registration with the key-actuated members so that when the keys are operated to feed in the figures in the first factor in the sum to be performed, members on the carriage in successive sets will be selected and moved. There is a number of sets of individually movable members, such as rotatable templates, constituting mechanical representations of partial products, the number of these partial product members corresponding to the number of the movable members on the carriage and being arranged in similar sets. As the carriage is traversed, the movable members thereon which have been selected by key actuation are brought into operative registration with respect to the partial product members. By suitable means all the selected carriage members can then be moved simultaneously, thereby causing selection of corresponding partial product members which at the same time are rendered operative. By key-actuated means there are imparted to the selected partial product members positioning movements determined by the value of the figures in the second factor. When thus positioned these partial product members are felt by suitable means and the partial product values are thereby ascertained in terms of distances moved. These partial product values are transmitted into answer-indicating mechanism.

The arrangement of the keys and the means by which the figures in the first factor are fed into the machine as also the construction and manner of operation of the key-actuated members may vary. The movable members indicated above as being mounted on the sliding carriage may be formed and arranged in various ways with respect to their manner of movement on the carriage and with respect to those parts of these members which, on the one hand, are acted on by the key-actuated members, and on the other hand those parts which effect selection of the partial product members. Further, after the members on the carriage have been selectively moved, various means may be adopted for moving all these members simultaneously so that they may effect selection of the partial product members. This movement is, however, preferably imparted to the carriage members by movement of the carriage as a whole.

The above-mentioned key-actuated selecting mechanism may be employed in conjunction with various types and structures of partial product members of the kind comprising stops which have to be selected and set up and subsequently felt. Preferably, however, the partial product members used are those which comprise a part of the present invention.

These mechanical representations of the partial products are constituted by a series of separately rotatable notched template members mounted on a common axis and provided with means whereby all these template members are retained initially in inoperative positions. By means of key-actuated mechanism, such for example as that indicated above as forming part of the present invention, these template members are simultaneously selected and rendered operative such selection being in accordance with the figures in the first factor. By key-actuated mechanism these selected templates are then rotationally positioned in accordance with the value of the figures in the second factor. The templates which have been selected and positioned are then felt by suitable means and the partial product values thus ascertained in terms of distances moved are communicated to answer-indicating mechanism. The template members are conveniently retained in their inoperative positions by catch-like devices which are released by the key-actuated selecting mechanism, the templates which have been thus selected all moving then into operative positions. This causes the templates to come into contact with a universal bar which can then be moved by key-actuated mechanism so that the selected templates will all be swung through an angle determined by the value of a figure in the second factor. When thus swung the templates are felt by suitable means. Each template member has two angularly separated parts which are respectively formed, as by notching, to represent numerical values, the one part representing units values and the other part representing tens values in the partial products. The templates are arranged in sets which function in respect of the different denominations of the figures in the first factor.

Various means may be employed for the retention of the template members in their initial and inoperative positions in a manner which will permit of selection and release of these template members in the desired manner. Various constructions of key-actuated mechanism may be employed to effect the rotational positioning of those templates which have been selected and rendered operative, this positioning being in accordance with the numerical values of figures in the second factor.

Template members constructed and arranged for example as above indicated may be felt by means of a series of separately movable feeler members each having two connected parts which are adapted when the feeler member is moved in one direction from a neutral position to feel one part of a template and when the feeler is moved in the other direction to feel the second part of a template. Means are provided for moving the feeler members first in one direction and then in the other and for transmitting into answer-indicating mechanism the partial products ascertained in terms of the distances moved as the feelers make their second feeling movements. Each feeler member may be constructed and arranged in various ways but conveniently each is formed so as to swing with its two parts constituted for example by arms disposed so that by swinging the member it will feel the two template parts in succession. A yielding connection is interposed, either between each feeler member and the mechanism whereby the movements in either direction are imparted thereto, or otherwise, so that while the feeler member as a whole will tend to be moved in either direction from its neutral position through the full distances determined by the actuating mechanism, the actual distance moved by the parts of each feeler member in either direction may be less owing to the distances through which these feeling movements take place being determined by the formations of the template parts with which the two parts of the feeling member make contact.

Such means are provided for transmitting the feeling movements to the answer-indicating mechanism that there will be transmitted into the answer-indicating mechanism only the second movement of each feeling member which occurs when feeling the second part of a template, while the first movement of each feeling member which occurs when feeling the first part of a template is not operative on the answer-indicating mechanism. Conveniently a toothed rack such as a quadrant is connected to each feeling member in such a manner as to be movable therewith. The answer-indicating mechanism comprises toothed wheels which can be caused to engage respectivley with the racks of feeler members so that these answer wheels can be rotated and set in accordance with the movements of the feeler members.

As above indicated, the templates are conveniently arranged in sets each set functioning with respect to a different denomination. The construction and arrangement of the feeler members is such that when one of these members swings in one direction it will feel the one part of a template in one denomination set, but when that feeler swings in the opposite direction it will feel the other part of a template in the next adjacent set. By this means the second feeling movement of a template will take place through a distance which represents the sum of the tens figure in the partial product in one template set and the units figure in the partial product in the template set of next highest denomination.

A complete calculating machine for performing multiplication constructed in accordance with this invention comprises a set of numeral keys by means of which the figures in the first factor are fed into the machine and a second set of numeral keys by means of which the figures in the second factor are fed into the machine. There is a series of separately rotatable template members constituting mechanical representations of partial products and arranged in sets corresponding to the different denominations of the figures in the first factor, these template members being constructed, arranged and operating for example as above indicated. There is selective mechanism actuated by the numeral keys in the first set with means whereby this selective mechanism is caused to bring about the selection and movement of the templates, this selective mechanism being constructed, arranged and operating as above indicated. By suitable means the operation of a key in the second set causes corresponding positioning of all the selected templates and these selected and positioned templates are felt as for example by feeling mechanism constructed, arranged and operating as indicated above with means for transmitting into answer-indicating mechanism the partial products ascertained in terms of distances moved by this feeling mechanism. The selected templates are repeatedly positioned as and when keys in the second set are successively depressed to feed in the figures in the second factor, and after each such positioning the selected templates are felt and the several partial products are transmitted in succession into the answer-indicating mechanism wherein these partial products are added together so that a complete answer is subsequently presented.

There is associated with the answer-indicating mechanism means whereby the answer can be printed. Conveniently this printing mechanism comprises means whereby when the answer-indicating mechanism is reset type are set up corresponding to the figures in the product indicated by this mechanism before resetting. The machine is also conveniently provided with means whereby the operation of the numeral keys in each set causes corresponding type to be positioned, the type thus set up being subsequently employed to print the figures in the two factors. Thus when the machine is operated the figures in the two factors in the sum performed in the machine together with the answer are all printed, thus providing a record of the sum.

In this machine the answer-indicating mechanism preferably employed comprises toothed wheels which, on the one hand, can be brought into engagement with toothed racks which move with the feeler members, the answer mechanism being thus set. There are provided also a series of parallel sliding toothed rack bars and means whereby the wheels of the answer mechanism can be engaged with these rack bars. By suitable mechanism the rack bars are caused to slide when in engagement with the wheels of the answer mechanism thereby resetting these wheels by turning them back to their zero positions. The rack bars will then severally have moved distances indicative of the numerical values at which the answer wheels were set. As they thus move the rack bars are caused to bring about a visible display of the product figures represented by the positions of the rack bars when they have reset the answer wheels. This visible display of the product figures is conveniently obtained by setting up type from which the figures are printed.

In addition to the main answer-indicating mechanism the machine may comprise at least one other answer mechanism having toothed wheels embodied therein, and by bringing the wheels of such additional answer mechanism into engagement with the above-mentioned parallel sliding toothed rack bars the latter can transfer successive products into the additional answer mechanism wherein these products are added together.

In this machine following actuation of the numeral keys in the first set and subsequently numeral keys in the second set for the purpose of feeding in the figures in the two factors, the operations of the several mechanisms take place automatically up to and including the setting of the wheels of the answer-indicating mechanism in accordance with the figures of the product ascertained by the operation of these mechanisms. The machine is provided with a shaft rotatable by hand or power and means actuated by this shaft whereby the wheels of the answer-indicating mechanism are turned back to zero, printing of the figures in the two factors and the figures in the product is brought about, and all parts of the mechanism are subsequently reset.

The invention may be carried out in practice in various ways but the accompanying drawings illustrate by way of example a construction in which the present invention is embodied. The machine shown in these drawings is capable of performing multiplication with two factors either of which may contain from one to four figures, that is to say, the machine being used for the multiplication of any number from 1 to 9999 by any number from 1 to 9999. With comparatively slight modifications, however, the machine is capable of expansion so as to increase its capacity in this respect.

In the accompanying drawings—

Figure 1 is a sectional elevation showing the principal features of key-operated mechanisms for selecting and positioning the templates together with the means for feeling the templates and for presenting the answer. This figure shows the general relationship between the parts and the manner in which they cooperate, certain structural portions, however, being omitted for the sake of clearness.

Figure 2 is a rear elevation of the primary selector mechanism, that is to say, the figure comprises a view of this mechanism as seen from the lefthand end of the mechanism as shown in Figure 1, this being at the back of the machine.

Figure 3 is a front elevation on an enlarged scale of the selector carriage. The figure shows that face of this apparatus which is opposite to that seen in Figure 2, part of the cover plate being broken away and only the end portions of the key-operated push rods being shown. Other parts are omitted for the sake of clearness.

Figure 4 is a transverse vertical section on the line 4—4 in Figure 3 looking in the direction of the arrows.

Figure 5 is a plan of the selector carriage as seen in Figure 3.

Figure 6 is a part sectional elevation of the templates, feelers and answer mechanism as seen from the rear, the parts appearing as viewed from the lefthand end of the mechanism as shown in Figure 1 with the primary selector mechanism removed and other parts omitted for the sake of clearness.

Figures 7 and 7a are diagrams illustrating the relations between the several sets of L-shaped movable members carried on the selector carriage, the several sets of templates, and the feelers which cooperate with the templates.

Figure 8:
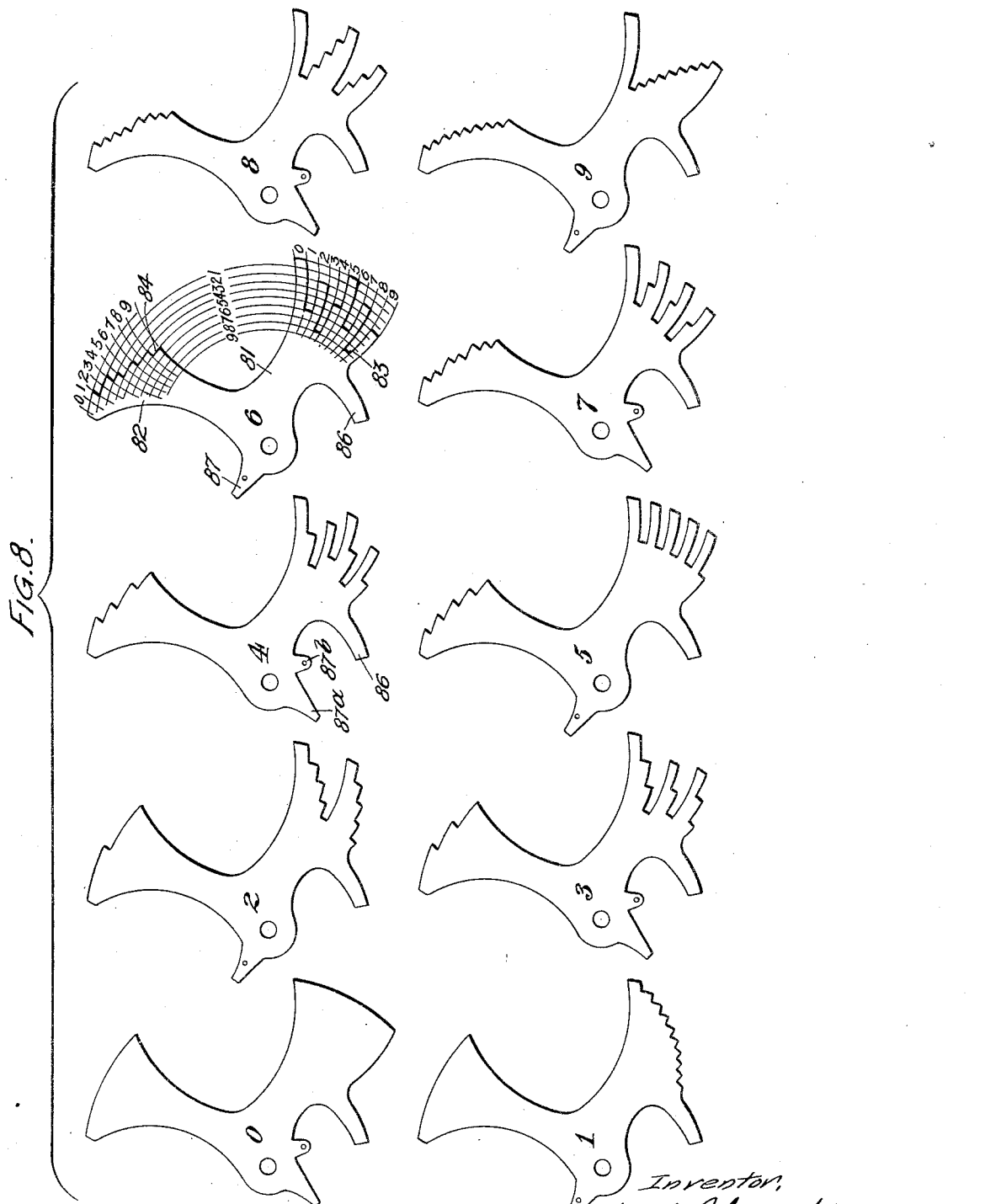

Figure 8 comprises a series of views showing in elevation the forms of the ten templates which compose a complete set.

Figure 9 is a plan of the adder or totalizer with the parts associated therewith and together comprising the main part of the answer-indicating mechanism.

Figure 10 is a side elevation on an enlarged scale of the escapement device, which is seen in plan at the lefthand end of Figure 9, and controls the rotation of the camshaft by means of which is brought about the actuation of the feelers, the traversing, raising and lowering of the totalizer wheels. This escapement controls also the locking of the positioned templates.

Figure 11 is an end view of the escapement as shown in Figure 10.

Figure 12 shows in side elevation and on an enlarged scale details of the locking device for the totalizer wheels.

Figure 13 is a plan of the parts shown in Figure 12.

Figure 14:
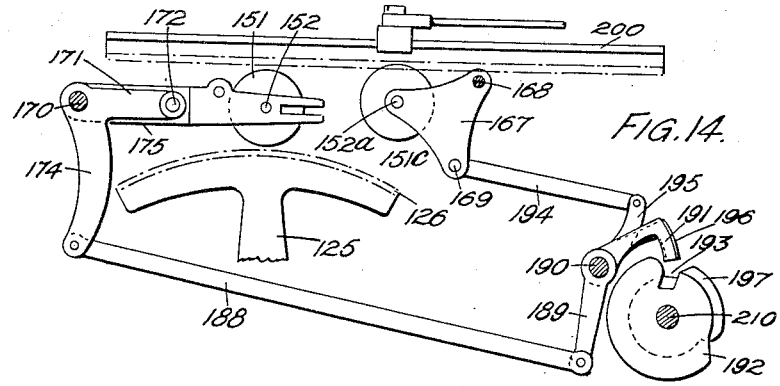

Figure 14 is a somewhat diagrammatic side elevation of certain parts of the answer-indicating mechanism and the means by which these parts are controlled.

Figure 15:
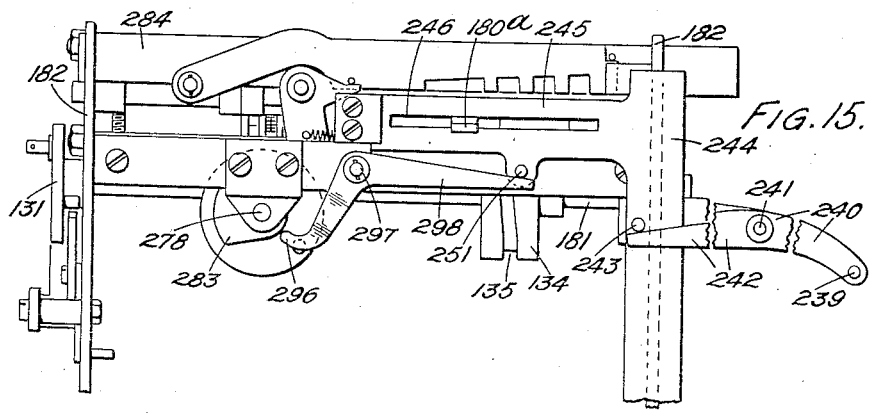

Figure 15 is a rear elevation of parts of the mechanism associated with the totalizer and answer-indicating mechanism.

Figure 16:
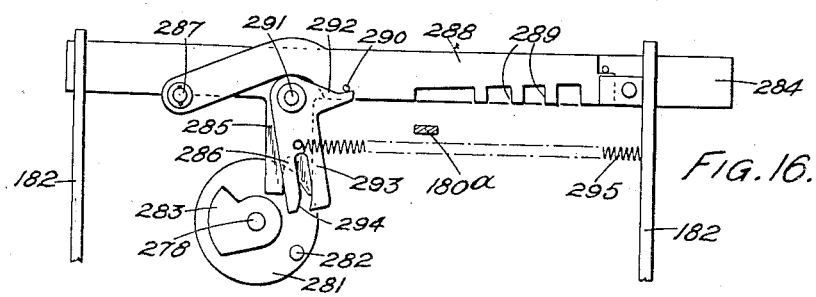
Figure 17:
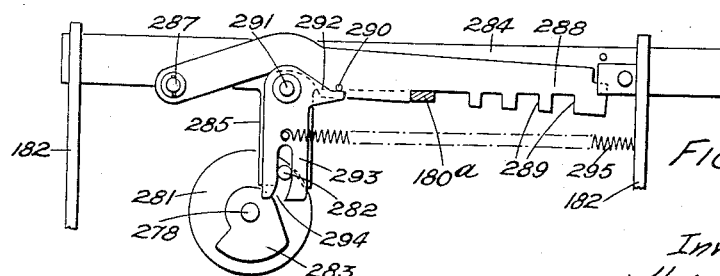

Figures 16 and 17 are rear elevations similar to Figure 15 but with parts removed to show the details of mechanism employed for controlling the position of the traversing carriage with the totalizer wheels when the apparatus is adjusted to calculate and deduct discount.

Figure 18:
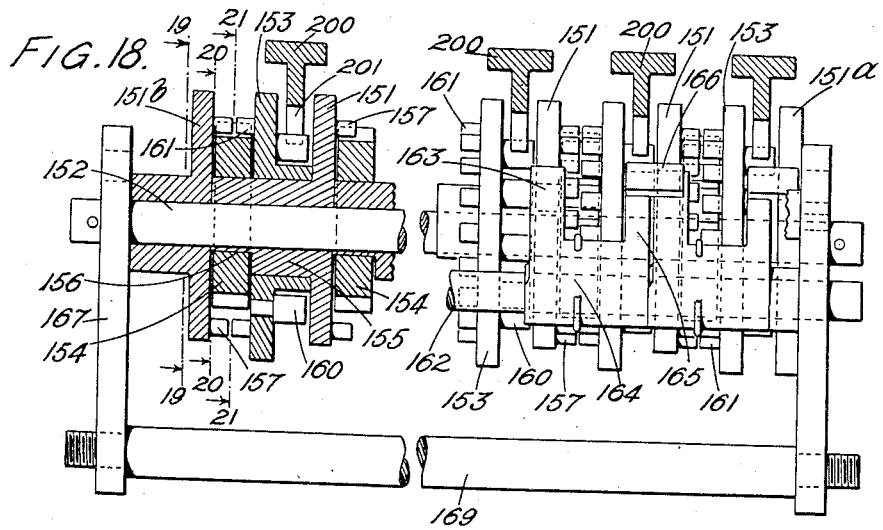

Figure 18 illustrates the adder or totalizer, the righthand part of the figure showing the wheels in side elevation while the lefthand part is a longitudinal vertical section.

Figure 19:
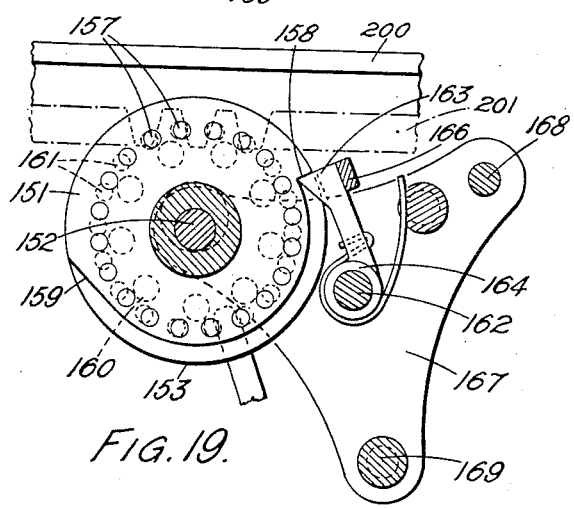

Figure 19 is a transverse section through the adder on the line 19—19 in Figure 18 looking in the direction of the arrows.

Figure 20:
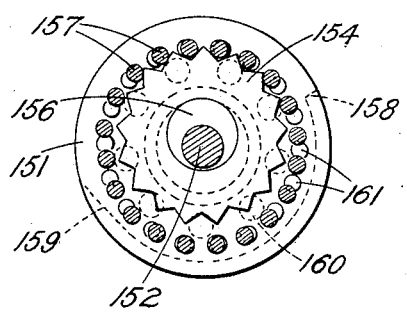
Figure 21:
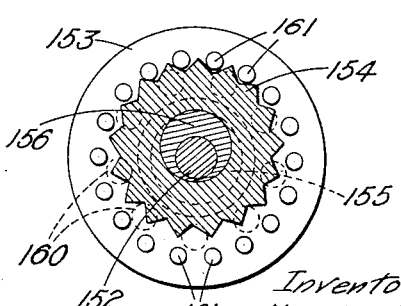

Figures 20 and 21 are similar transverse sections taken respectively on the lines 20—20 and 21—21 in Figure 18.

Figure 22:
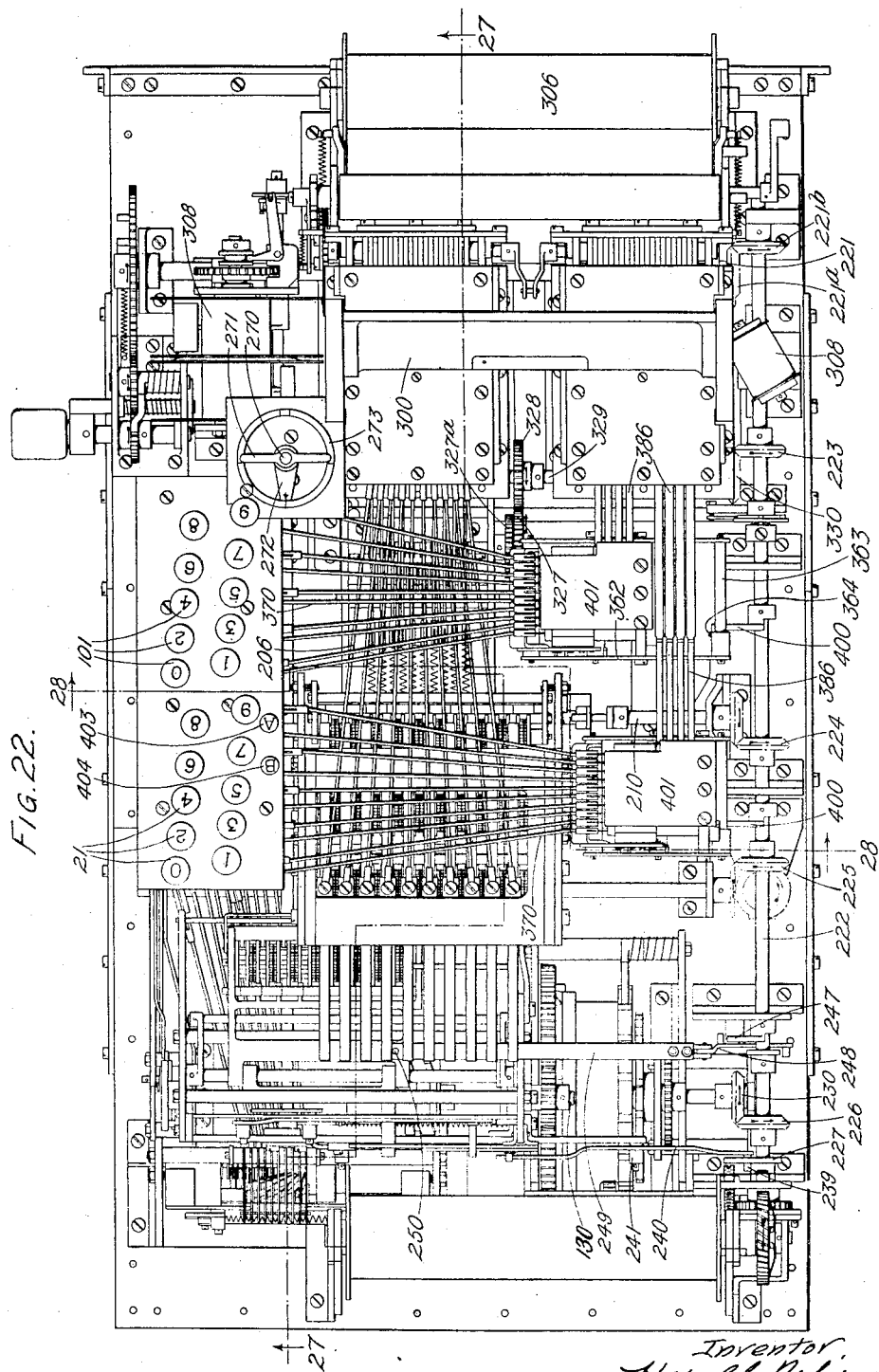

Figure 22 is a plan of the complete machine.

Figure 23:
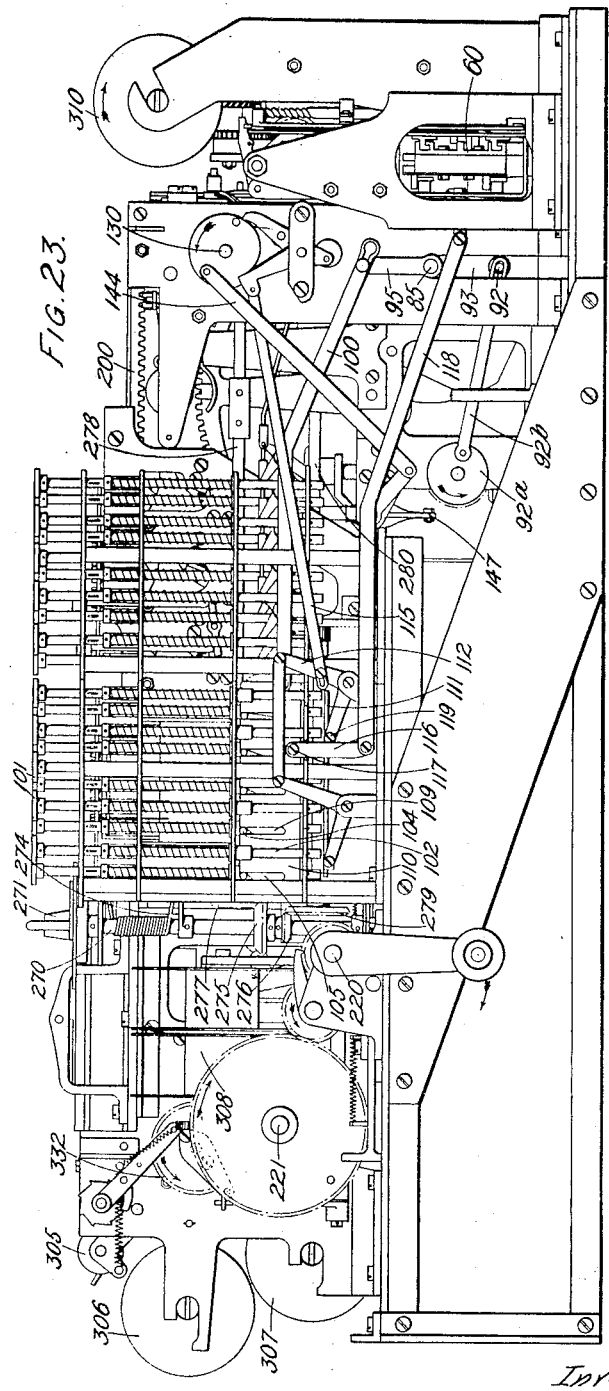

Figure 23 is an elevation showing the righthand side of the machine.

Figure 24:
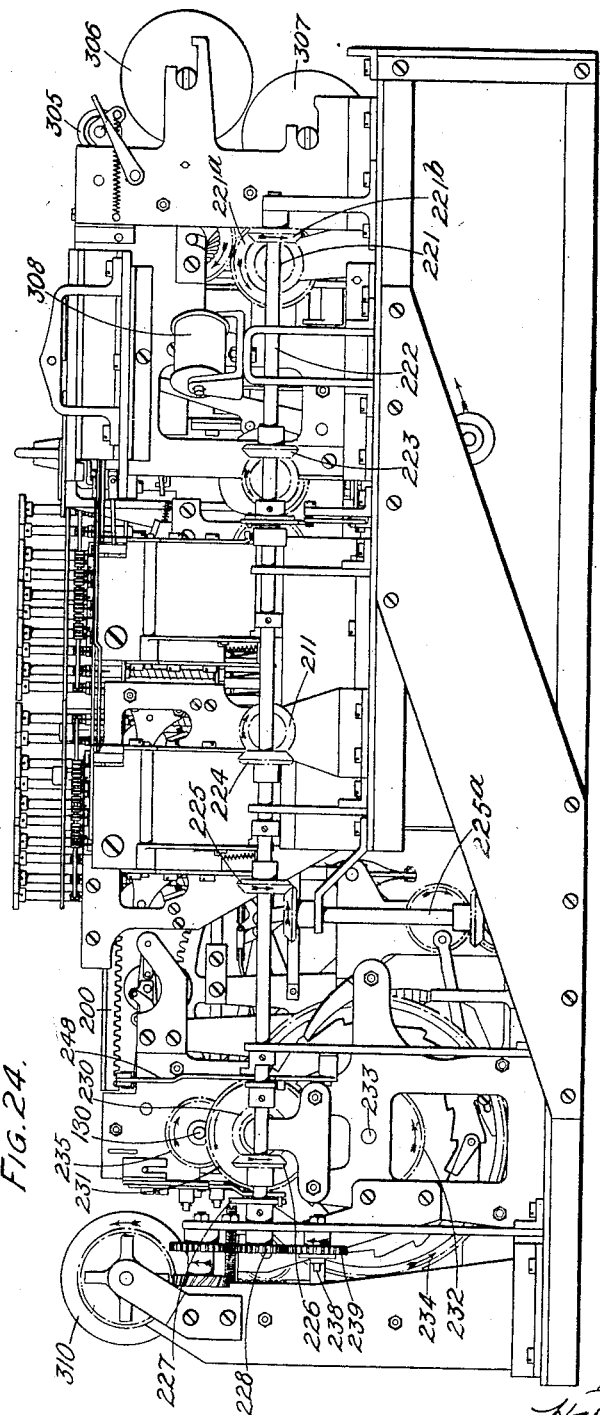

Figure 24 is an elevation showing the lefthand side of the machine.

Figure 25:
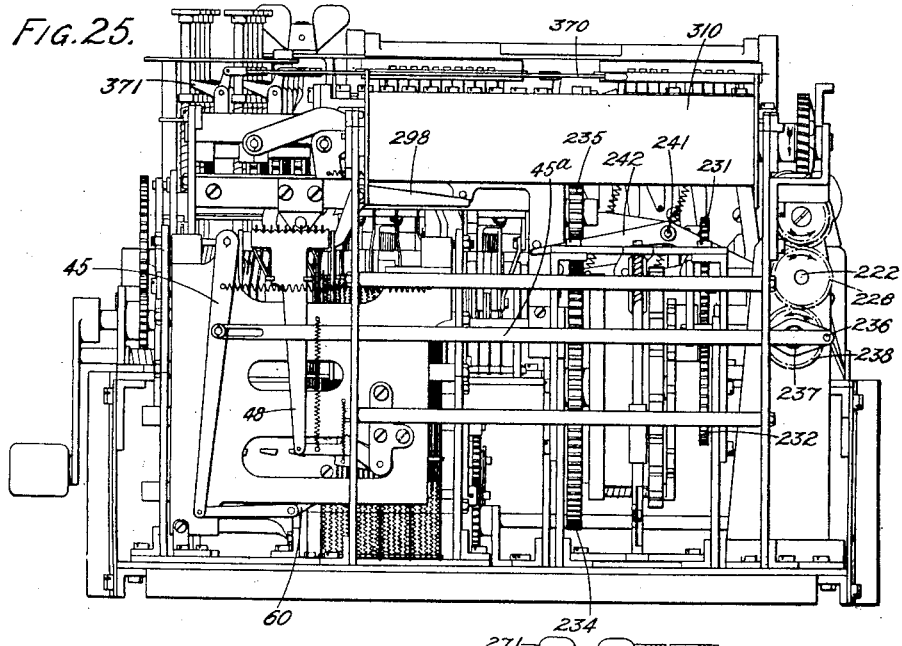

Figure 25 is a rear elevation of the machine.

Figure 26:
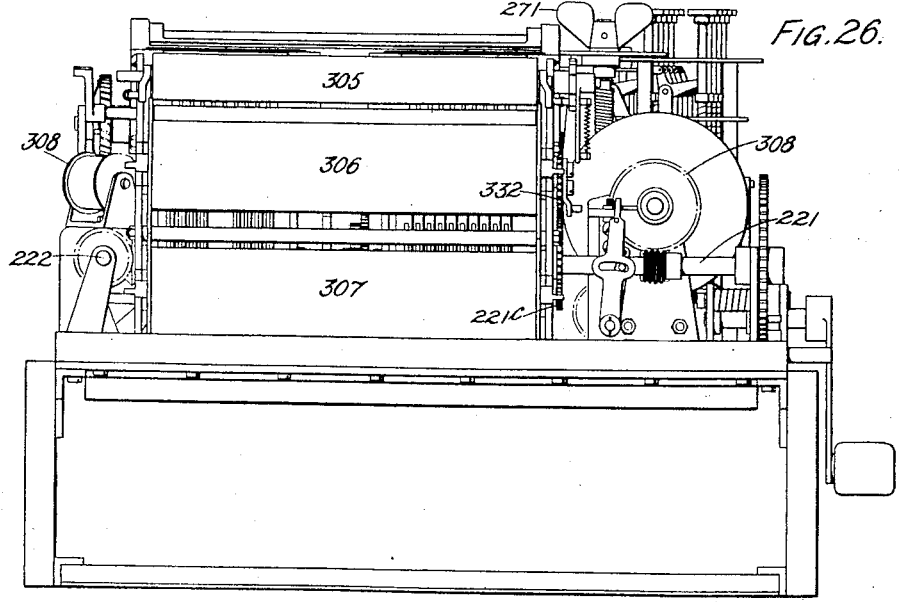

Figure 26 is a front elevation.

Figure 27:
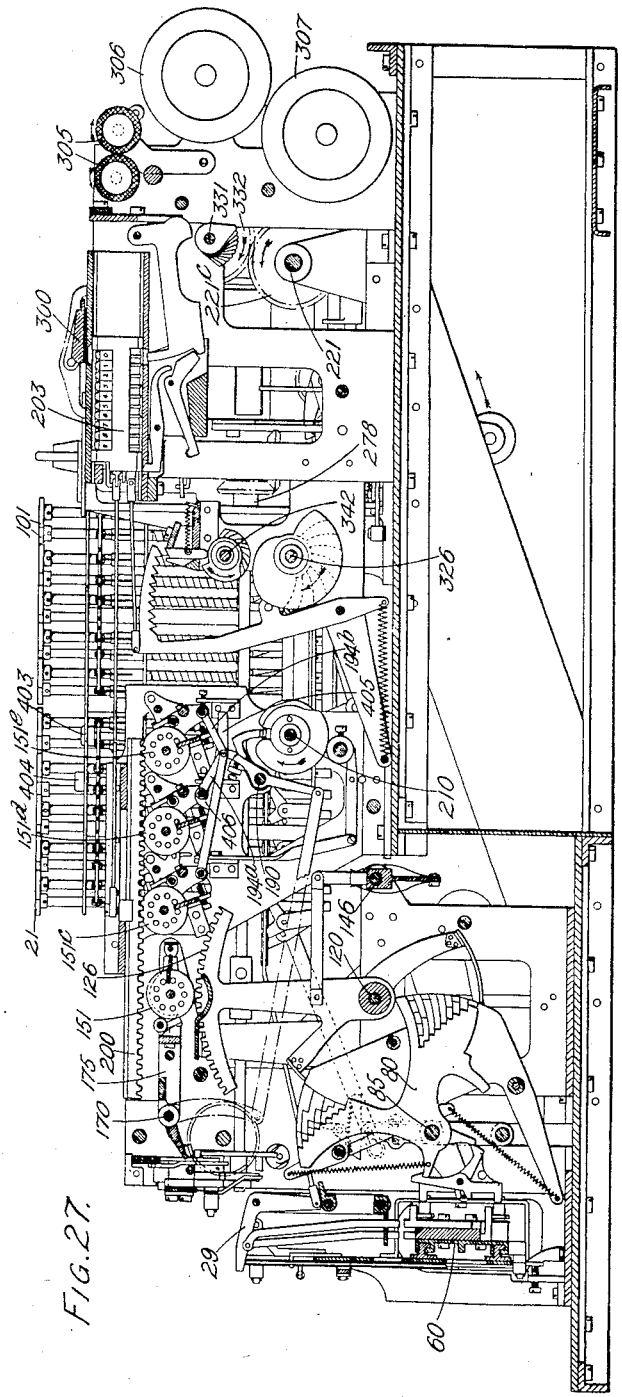

Figure 27 is a vertical longitudinal section of the machine on the broken line 27—27 in Figure 22 looking in the direction of the arrows.

Figure 28:
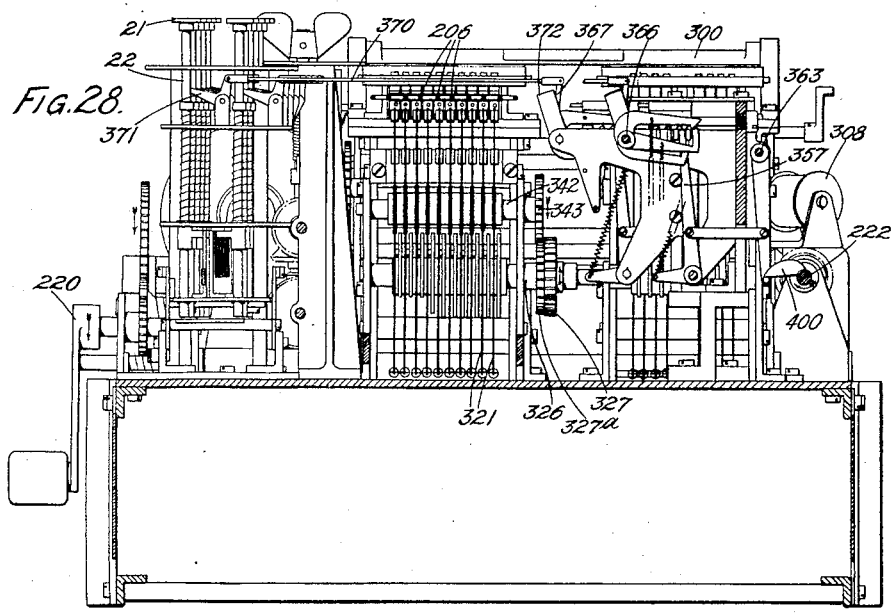

Figure 28 is a vertical transverse section on the broken line 28—28 in Figure 22 looking in the direction of the arrows.

Figure 29:
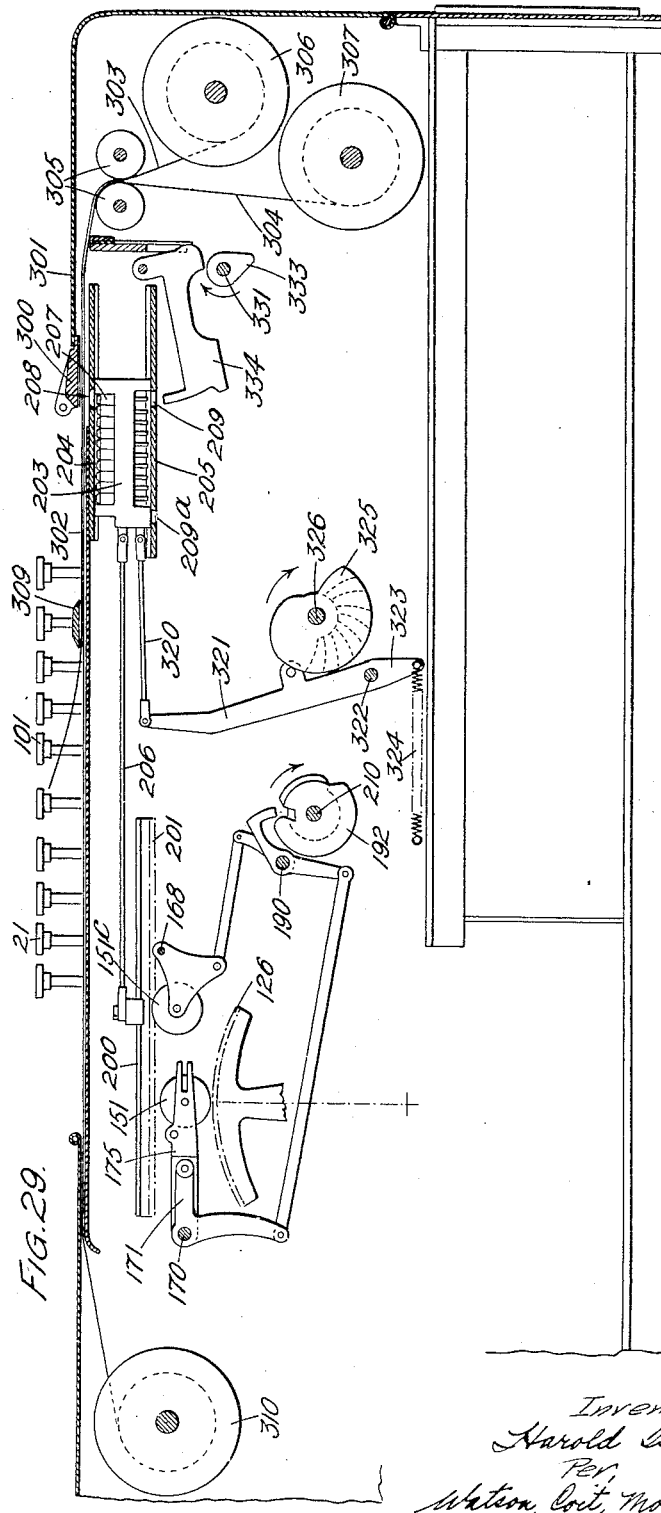

Figure 29 is a longitudinal sectional elevation showing the principal features of the mechanism for setting up type and printing the answers to multiplication sums performed in the machine, parts being omitted and other parts shown in simple form for the sake of clearness and so as to indicate the relationship between the printing mechanism and the adder mechanism whose wheels in the first place are set to indicate the answers.

Figure 30:
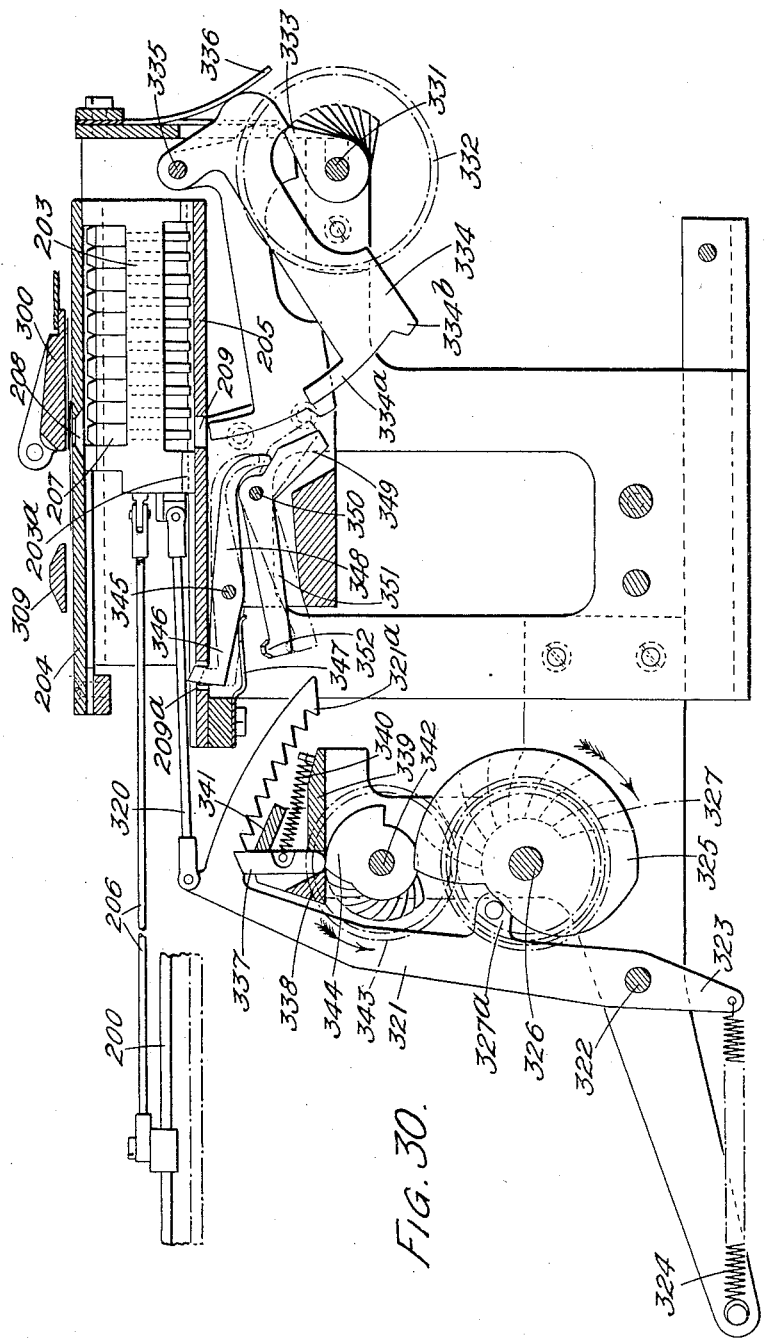

Figure 30 is a sectional elevation of the mechanism for printing the answers as shown in Figure 29 but indicating on an enlarged scale more of the details of the construction than are shown in Figure 27.

Figure 31:
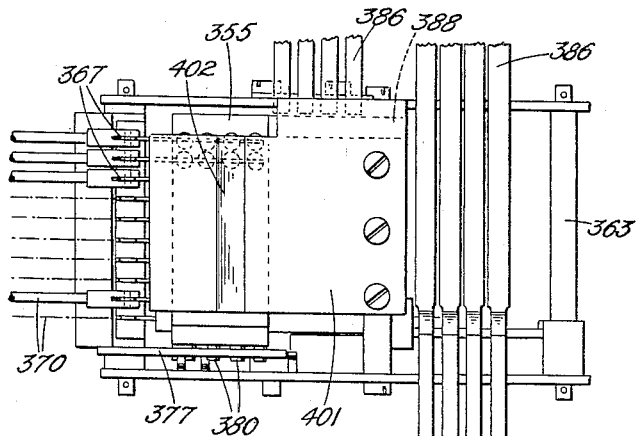

Figure 31 is a plan on an enlarged scale of the key-actuated selecting mechanism associated with the mechanism for printing the figures in the two factors in the sums performed in the machine.

Figure 32:
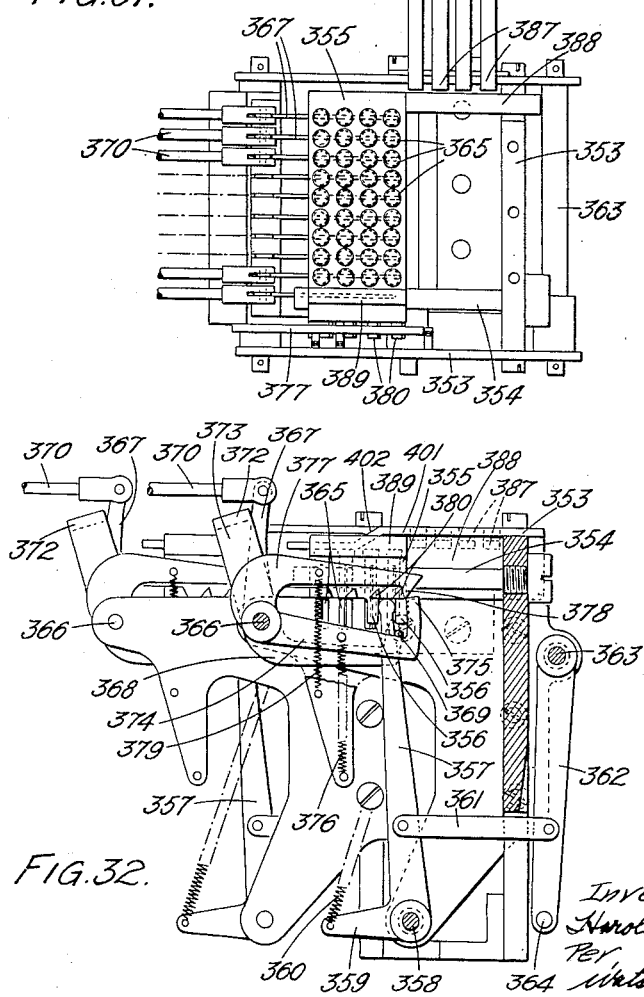

Figure 32 is a part-sectional side elevation of the key-actuated selecting mechanism shown in Figure 31.

Figure 33:
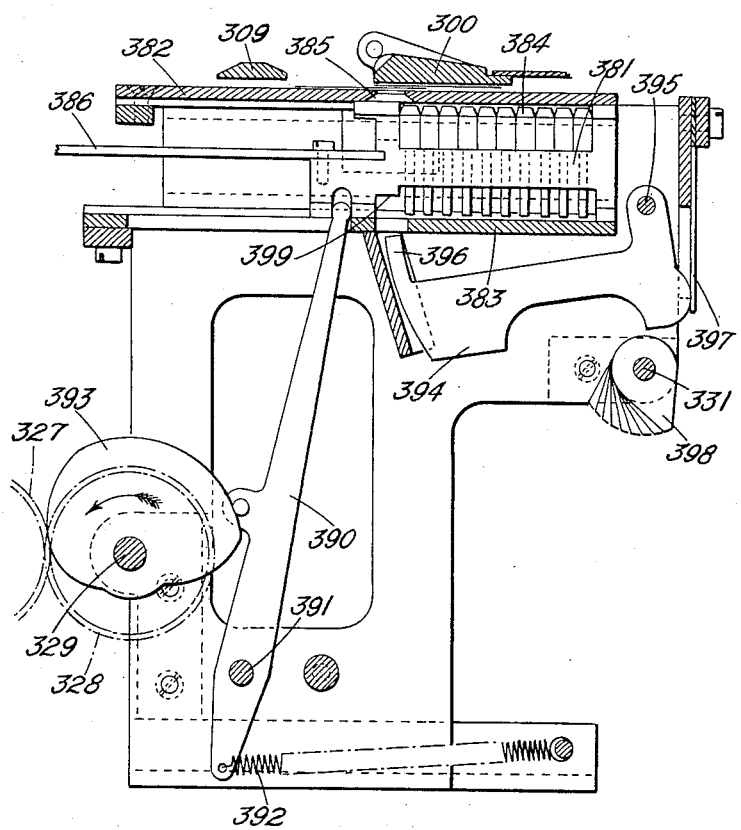

Figure 33 is a sectional elevation of the mechanism for printing the figures in one of the factors, this mechanism being associated with the key-actuated selecting mechanism shown in Figures 31 and 32.

Figure 34:
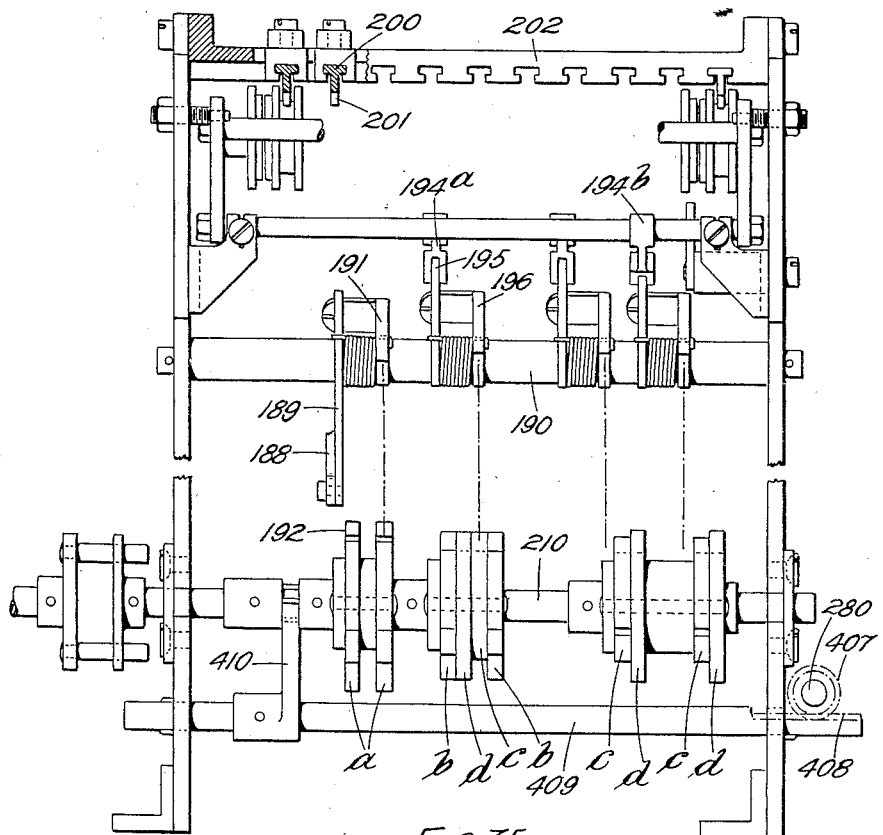

Figure 34 is a transverse sectional elevation on an enlarged scale, the view being taken about the centre of the machine in the neighbourhood of a vertical plane passing between the two sets of keys, as the latter are seen in the plan in Figure 22, and looking towards the rear of the machine. In this figure many parts are omitted and in order to display the mechanism more clearly the camshaft which appears in the lower part of the figure is shown as dropped below its true position in relation to the shaft above it which carries the levers on which the cams act. This figure illustrates the arrangement of the camshaft which when rotated determines the sequence followed in the engagements and disengagements between the sliding rack bars and the main adder and totalizer mechanisms.

Figure 35:
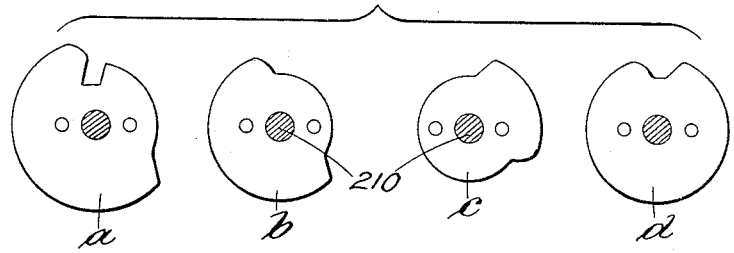

Figure 35 illustrates in elevation the several cams on the camshaft more particularly shown in Figure 34.

Referring to Figure 1, there is a set of ten keys 21 intended to be used solely for feeding into the machine the figures in the first factor in the sum to be performed by the machine. These keys are carried on rods 22 which can slide vertically in frame plates 23 the rods being suitably constructed and arranged and acted on by springs 24. Each rod 22 is operatively connected as by means of a bell crank lever 25 and a coupling rod or link 26 to one arm 27 of a bell crank lever pivoted at 28 whose other arm 29 is connected at 30 to the upper end of a vertically sliding push rod 31. While the upper ends of these push rods 31 are spaced apart laterally, as seen in Figure 2, where they are connected to the arms 29 of the bell crank levers, thus allowing convenient and necessary clearance for the mounting of these bell crank levers on a common axis 28 and for the connections to these levers, the lower parts of these push rods are bent laterally or otherwise shaped so as to bring the lower ends 32 of all of them into close relation. Further, certain of these push rods are bent or shaped in the fore and aft direction, as seen in Figure 1, that is to say otherwise than laterally, so that the lower ends 32 of all the push rods lie in two groups, each conveniently containing five rods. These grouped ends 32 are arranged adjacent, the push rod ends in one group lying behind the push rod ends in the other group, as seen in Figure 3. Conveniently and by way of example the push rods forming the front or inner group 32a may be those which are actuated by the keys bearing numbers 0, 4, 8, 3 and 7, the rods being arranged side by side in this order, taking them from right to left as seen in Figure 3. The rear or outer group 32b of push rods is then composed of the rods actuated by the keys numbered 2, 6, 1, 5 and 9, the rods being arranged in this order.

Each push rod is conveniently formed of a flat strip of metal and while its upper end is connected by a pin 30 to a bell crank lever arm 29, the lower end of the rod can slide freely through a guide plate 33. The lower ends of all the push rods are cut square and in their normal positions of rest the square ends of all these rods lie in the same horizontal plane.

A frame plate 40 is suspended at 41 between the upwardly directed arms of a U-shaped frame 42 of suitable construction so that the plate can swing about a horizontal axis located conveniently near the axis of the shaft 28 on which are loosely mounted the bell crank levers 27, 29 (see Figure 1). This frame plate 40 has mounted on its front or inner face two L-shaped or other guides 43 which lie parallel and horizontal and are suitably spaced apart one above the other. On these guides 43 can slide a carriage 60 of suitable construction. A spring 44, arranged for example so that it acts on a lever 45 which is pivoted at 46 to the plate 40 and at its free end connected by a link 47 to the carriage, tends to move the latter constantly in one direction, say, towards the right as seen in Figure 2, such movement traversing the carriage below the lower ends 32 of the grouped push rods which lie near the upper part of the carriage. This traversing movement of the carriage, which takes place step by step, is controlled by an escapement of suitable type actuated by a T-shaped member 48 disposed with its main part or stem vertical this portion being guided in guides 49 on the plate 40 so that the T-shaped member can slide upwards and downwards through a certain range being drawn constantly upwards by a suitably arranged spring 50. The top 48a of the T-shaped member is serrated as shown in Figure 2 and extends across and below the ends of the arms 29 of the bell crank levers to which the push rods 31 are connected. The arrangement is such that when a key 21 is operated and a rod 31 pushed down towards the carriage 60, the bell crank lever 29 will simultaneously push downwards the T-shaped member 48 and operate the escapement so that the carriage will be traversed on the plate 40 to the extent of one step when the key is released.

The escapement which controls the carriage movement is constructed as follows. On the rear or outer face of the carriage there is a horizontal row of similar projections or teeth 61, equally spaced apart, and at the end of the row there is a stop 61a as shown in Figures 2 and 3. Each tooth 61 is approximately triangular in shape with its upper side lying horizontally. The lower end of the sliding T-shaped member 48 is connected to the free end of a lever 51 pivoted at 52 on the plate 40. The lever 51 has a lateral projection on its inner side, being thus directed towards the face of the carriage 60, this projection 53 being formed and arranged so as to lie in the path of and engage one side of a tooth 61 on the carriage. The spring 50 is connected conveniently to the lever 51 so that the latter together with the T-shaped member will tend to be raised by this spring. A second and separate lever 54 is also pivoted at 52 and pulled upwards by a spring 55 connected to a lateral pin 56 on the lever. The face of the end of this lever 54 lies in the path of and can engage the one side of a tooth 61 on the carriage. The upper edge of this lever is oppositely inclined to form a broad V notch, as shown in dotted lines in Figure 2, this formation being such as to clear the under side of a tooth 61 when the lever 54 is depressed. The depression of this lever will occur when the lever 51 is pressed down by the T-shaped member 48 when a key 21 is depressed, since the lateral projection 53 on the lever 51 lies above the end of the lever 54. The end of the lever 54 will then trip over the angle on the under side of the tooth 61 whose side will then be engaged by the lateral projection 53 on the lever 51. The working face of this lateral projection being at a slightly smaller radius from the centre 52 than is the face of the lever 54, the carriage will make a slight movement to the right, as seen in Figure 2. When the lever 51 is raised again, on release of the key 21 that has been depressed, the projection 53 will move clear of the tooth 61 and the carriage will be released so as to traverse one step to the right, as seen in Figure 2. The carriage will be stopped at the end of this step by the side of the next tooth 61 coming up against the end of the lever 54 which has risen as soon as permitted by the movement of the carriage.

On the carriage 60 are mounted a series of sets of members 70, 71 each of which is separately movable as by sliding on the carriage in a vertical direction, see Figure 4. Each of these members 70, 71 comprises a main straight part which lies and can move in a guide passage formed in the carriage, and a part 70a, 71a which projects forwardly, that is to say on the inner side of the carriage. Each member 70, 71 for example may be formed as a flat strip having a substantially L-shaped appearance in side view. Each member 70, 71 lies and can slide in a vertical passage or groove formed in the carriage 60 the fit of the member in the groove being such that it will be retained by friction in either of the two positions which it is intended to occupy. A convenient arrangement is to form a series of parallel grooves 62 in the opposite sides of a plate 63 of suitable thickness, see Figures 4 and 5, each groove having a depth in excess of its width, these dimensions being determined by the width and thickness of the members 70, 71 which lie and slide in these grooves. This grooved plate 63 is fixed to the inner side of the carriage plate 60. A cover plate 64 is fixed over the exposed face of the grooved plate. In this way the sliding L-shaped members 70, 71 are retained in place, openings being formed in the upper and lower parts of the cover plate 64 through which extend the projecting parts 70a, 71a of the L-shaped members. Each L-shaped member 70, 71 is conveniently built up of two similar metal strips riveted together at their end portions so that these parts lie close together while the intermediate portions of the two strips are slightly sprung apart so that when this main part of the member lies in its groove 62 the double strip will tend to grip the sides of the groove and thus hold the L-shaped member against accidental displacement while allowing it to be pushed along in its groove from one position into another.

The L-shaped members 70, 71 are arranged in sets each set comprising ten members of which five are members 70 whose projections 70a are towards their upper ends while five are members 71 whose projections 71a are towards their lower ends. The sets, of which there are four in this machine, are seen in Figure 5 where they are separated by chain lines, the several sets being indicated as $A^1, A^2, A^3, A^4$. The two groups of five members 70 and five members 71 forming a set lie adjacent and their relative positions are such that the square upper ends of all the ten L-shaped members in a set can register with the similarly grouped square lower ends 32, 32a of the ten key-actuated push rods 31. Thus as the carriage 60 is traversed with a step-by-step movement under control of the escapement each set of L-shaped members commencing with the set $A^1$ will be positioned in succession in register with and adjacent to the lower and similarly grouped ends of the key-actuated push rods 31. Initially all the L-shaped members 70, 71 occupy the uppermost positions into which they can slide and when a key 21 is depressed the push rod 31 actuated thereby will push downwards that L-shaped member whose upper end is then in register with the end of the push rod. By this means as the keys are depressed to feed in the figures in the first factor in the sum, one L-shaped member will be selected and caused to slide into an operative position in each of the sets of L-shaped members as these are successively positioned beneath the set of push rods by the traversing of the carriage. Each set of L-shaped members 70, 71 functions with respect to a denomination, the number of the sets of these members being determined by the capacity of the machine with respect to the number of figures in the first factor in sums with which it is capable of dealing. As mentioned above, in the machine here described by way of example there are four sets $A^1, A^2, A^3, A^4$ of members 70, 71, the machine being thus capable of dealing with sums in each of which there are from one to four figures in the first factor. When all the keys have been depressed which are necessary to feed in all the figures in the first factor in a sum, the carriage will have thereon a corresponding number of L-shaped members, one in each of the different denomination sets of those members, which have been selected respectively in accordance with the values of the figures fed in, and have all been moved into operative positions.

The machine may be provided with a key marked for example with the multiplication sign and if now this key is depressed it will impart a swinging movement about the pins 41 to the frame plate 40 on which is the carriage 60 and this movement will cause the projections 70a, 71a of those L-shaped members which have been selected and moved as above described, to act severally and simultaneously on catch devices with which these projections are then in register. These catch devices will then release and render "alive" corresponding members constituting mechanical representations of partial products. Alternatively, and as in the present construction of machine, the swinging of the carriage frame plate 40 may be brought about when any key is depressed in the second set with which the machine is provided for the purpose of feeding in the figures in the second factor in the sum.

The mechanical representations of partial products are constituted by a series of separately rotatable template members 80. Each of these templates, as shown in Figure 8, is formed conveniently from a disc having certain parts cut away so as to leave two main portions 81 and 82 spaced apart circumferentially with a substantial gap between them, each of these portions being approximately quadrantal in shape and being stepped or notched as at 83 and 84 in the radial direction. Broadly speaking, these two quadrantal portions 81 and 82 are so relatively placed that when a template is in its initial and inoperative or "dead" position, as shown in Figure 1, one portion 81 is directed substantially horizontally, and the second portion 82 upwardly, the first portion 81 extending then from the axis 85 about which the template can turn in a direction opposite to that in which the carriage 60 is placed in relation to that axis. This approximately horizontal portion 81 of the template is provided with a downwardly directed finger 86. The No. 6 template, shown by way of example in Figure 1, is formed also with a projection 87 which extends towards the carriage 60 and to this projection is connected a spring 88 which tends to turn the template about its axis in a clockwise direction, as seen in Figure 1, that is when viewed from the lefthand side of the machine. The projection 87 of each template is initially engaged by one arm 89 of a swinging catch member loose on a shaft 90 and having a tail or second arm 91 so positioned that it will register with the projecting part 70a or 71a of an L-shaped member 70 or 71 on the carriage 60 when that member has been moved in the manner described into its operative position as a result of the operation of a key. When the frame plate 40 supporting the carriage 60 is now swung this member 70 or 71 which has been selected and moved will strike the tail 91 of the catch with which it is in register and by disengaging the catch 89 from the template will permit the latter to be turned about its axis 85 by the spring 88. The template 80 will thus rotate until its downwardly directed finger 86 strikes a universal bar 92 which extends horizontally below all the templates this bar being carried on lever arms 93 fixed on the shaft 85 on which all the templates are freely rotatable.

Owing to the respective positions of the projecting portions 70a, 71a of the members 70, 71 in the upper and lower parts of the inner face of the carriage 60, it is necessary to arrange the catches accordingly so that their tails will register with the upper and lower rows of projections 70a and 71a. Hence, as shown in Figures 1 and 8, certain of the templates have their projections which are engaged by the catches directed downwardly as at 87a, the corresponding catches 89a having their tails 91a directed upwardly so as to be capable of registering with the projections 70a in the upper row. The projections 71a in the lower row will then register with and be able to engage the tails 91 of the catches 89. The templates which have downwardly directed projections 87a are provided with lugs 87b to which are connected the springs 88a. The catches are conveniently arranged and acted on in pairs by springs 94 formed and disposed as shown in Figure 1 so that these springs tend to swing all the catches towards the templates, thus ensuring their engagement with the template projections 87, 87a.

The number of templates 80 corresponds to the number of the L-shaped members 70, 71 on the carriage 60 and like those members the templates are arranged in groups of ten each group corresponding to a different denomination. The catches 89, 89a which respectively control these templates and maintain them initially in their inoperative or "dead" positions have their tails so disposed with respect to the sliding members 70, 71 that as the carriage is traversed with a step-by-step movement the grouped members 70, 71 will be positioned opposite to successive groups of catches so that any member 70 or 71 which has been moved into its operative position by key actuation will register with the tail of a catch and be capable of acting on that catch when the carriage is moved laterally by swinging the frame plate 40. Thus when all the figures in the first factor have been fed in and selective movement thereby imparted to the L-shaped members 70, 71 in the different denomination groups on the carriage, the swinging of the carriage will effect the release of catches in different denomination groups and thereby render "alive" separate tempaltes in the corresponding denomination groups. All these templates which have thus been selected and rendered "alive" will turn about the shaft 85 until their fingers 86 are in contact with the universal bar 92.

Reference may be made hereto the diagrammatic views, Figures 7 and 7a, and the manner in which the traversing of the carriage 60 effects the successive positioning of the selected L-shaped members 70 and 71 in the several sets of these members with respect to the several sets of templates 80 as figures in the first factor are fed into the machine. As already mentioned, the several sets of L-shaped members which function for each denomination may conveniently be designated $A^1$, $A^2$, $A^3$, $A^4$. Similarly, the several sets of templates 80 which function in respect of different denominations may be designated $B^1$, $B^2$, $B^3$, $B^4$. In the initial position of the carriage 60 the first set of L-shaped templates $A^1$ lies to one side of the first set of templates $B^1$. When a key has been depressed to feed in the first figure in the first factor and the lower end 32 of the corresponding push rod has selected and moved an L-shaped member 70 or 71 in the set A¹ with which the end of that push rod is then in register, and the key subsequently rises, the carriage 60 traverses as described to the extent of one step, thereby bringing the set of L-shaped members A¹ opposite and in register with the catches which control the first set of templates B¹. The parts are then in the relative positions indicated diagrammatically in Figure 7. If the first factor contains only the one figure, the carriage frame plate 40 is caused to swing and the L-shaped member which has been selected and moved into its operative position in the set A¹ acts on the catch with which it is then in register and thereby releases the corresponding template in the set B¹. This set of templates functions in respect of units while the other template sets B², B³, B⁴ function respectively for the tens, hundreds and thousands in the figures in the first factors in sums dealt with by the machine.

Referring to Figure 5, the plate 64 attached to the carriage 60, has three projecting lugs 70b on its lefthand end. These lugs occupy positions analogous to the projections 70a when the latter have been lowered into an active position and the three lugs are so placed that when the frame plate 40 is swung the lugs will engage with the tails 91a of catches 89a and will render "alive" the zero templates in those sets of templates which lie to the left of the carriage 60. Therefore if the first factor has only one figure and the carriage has taken the relative position shown at Figure 7, the selected figure template will be released in the set B¹ and zero templates in the sets B², B³ and B⁴ will be released by the lugs 70b on the plate 64. The required template in the unit set B¹ having been thus selected and rendered "alive" it is then possible to position this template in accordance with the number value of a key which is then depressed to feed in the first figure in the second factor, and this template can be felt and the answer thus ascertained can be indicated in the manner to be described hereunder.

If there are, say, three figures in the first factor, then when the corresponding keys are successively depressed the ends 32 of the push rods will select and move into their operative positions an L-shaped member 70 or 71 in each of the sets A¹, A², A³ of these members. Following each key depression the carriage will traverse to the extent of one step so that when the three figures have been fed in, the carriage will have assumed the position indicated in Figure 7a in relation to the sets of templates. For example, if the first factor is 278, the members 70 and 71 which function in respect of these numbers will have been selected and operatively positioned as for 2 in the hundreds in the set A¹, as for 7 in the tens in the set A², as for 8 in the units in the set A³. The frame plate and carriage 60 are now swung, thereby releasing the corresponding template catches so that there will be released and rendered "alive" the zero template in set B⁴, the number 2 template in the set B³, the number 7 template in the set B² and the number 8 template in the set B¹. When the first figure in the second factor is fed in all the four templates which have thus been rendered alive are swung rotationally through an arc determined by the value of the key depressed and the templates are then simultaneously felt and the answer thus ascertained is passed into the answer-indicating mechanism.

It is to be noted that when the templates 80 thus selected are in contact with the universal bar 92, they are only "alive" and not as yet positioned for feeling. This positioning movement is effected by swinging the bar 92 through an arc whose length is determined by the value of a figure in the second factor in the sum which is then fed into the machine by depressing the appropriate key. In the preferred construction a second set of keys 101, see Figure 1, is employed for feeding in the figures in the second factor in the sum this set of keys being distinct from the set 21 which is used to feed in the figures in the first factor in the sum.

Various means may be employed to impart to the universal bar 92, and through it to all the selected templates, a movement in accordance with the value of each key 101 which is depressed for the purpose of feeding in a figure in the second factor. A convenient arrangement, however, comprises the following constructional features. The levers 93 which carry and are connected to the ends of the universal bar 92 are conveniently fixed on and towards the ends of the shaft 85. As mentioned, these levers 93 project downwardly so that the universal bar 92 lies below all the templates 80. Fixed to the shaft 85 and projecting upwardly therefrom is a lever 95 and also a lever 96, the latter having on its end a ratchet toothed quadrant. Pivoted at 97 on some fixed part near this quadrant is a pawl 98 adapted to engage the teeth of the ratchet quadrant and thus hold the bar 92 in the position in which it has been swung with the shaft 85 as the result of the depression of a key 101. The pawl 98 has a tail 99 which when acted upon by escapement mechanism to be described hereafter will lift the pawl and release the bar 92 which will then be returned to its initial position by the action of the template springs 88, 88a. The selected templates will then also return to their "alive" positions so that they are ready to be swung and thereby set again as determined by the numerical value of the next key 101 that is depressed. The swinging of the bar 92 is effected through a link 100 connected at one end to the lever 95 and at the other end to a member to which movement is imparted when each key 101 is depressed.

Each key 101 is mounted on a rod 102 which can slide vertically in the frame plates 23, the key being impelled upwards by a spring 103. Towards its lower end each key rod 102 carries a laterally projecting pin 104. A plate 105 is mounted so that it can slide horizontally in guides suitably disposed below the keys 101 and near to one side of the lower end portions of the key rods 102. This plate 105 is directed upwardly and has cut therein from its upper edge a series of downwardly directed straight slots 106. The upper edge 107 of the plate is parallel to the guide or guides on which the plate can move and each of the slots 106 terminates near the lower edge 108 of the plate on a line which is parallel to the upper edge 107 of the plate. Each of the slots 106 runs otherwise than at a right angle to the upper edge 107 of the plate the slot forming an acute angle with the vertical plane in which a key rod 102 lies and moves. The acute angles thus formed by the slots 106 are all different and increase in definite relation. Each slot is adapted to be engaged by a key rod pin 104 when a key 101 is depressed, each pin 104 engaging also and being guided by vertical slots 109 formed in two fixed plates 110 which lie on either side of and aid in guiding the sliding plate 105 (see Figure 23). Thus when a key 101 is depressed its rod pin 104 will cause the plate 105 to slide through a horizontal distance determined by the angle of the slot 106 engaged by the key rod pin and this horizontal distance bears a definite relation to the numerical value of the key. The end of the link 100 is connected to the plate 105 so that the universal bar 92 will be swung when the plate 105 is caused to slide as a result of the depression of a key 101. The angular movement thus imparted to the bar 92, and through it to the templates 80 which have been selected and are in contact with it, will differ by definite and regular angular increments respectively determined by the inclinations of the slots 106 in the plate 105, which in turn correspond to the numerical values of the several keys 101. By means of this mechanism, when a key 101 is depressed, all the selected templates will be swung simultaneously from a fixed transverse datum plane which may be regarded as extending radially from the axis of the shaft 85, through the universal bar 92 when the latter is in its initial position, the swinging of the selected templates being through an arc the length of which is determined by the value of the key depressed, that is to say the value of the figure in the second factor which is thus fed into the machine. The selected templates which have thus been positioned are now held by the pawl 98 and ratchet quadrant lever 96 and are ready to be felt in order to ascertain the values of the partial products represented by the positioned portions of the selected templates.

As mentioned above, each template member 80 comprises conveniently two substantially quadrantal parts 81 and 82 separated circumferentially by a space, each of these parts being stepped in a radial direction. The first of these quadrantal portions 81 lies initially so that it is directly substantially horizontally and the stepping or notching 83 of this portion is such as to represent the units in a partial product. The second quadrantal portion 82 which in the initial position of the template is upwardly directed is stepped or notched as at 84 in accordance with the tens of the partial product. Thus when selected templates have been finally positioned by swinging as described above in accordance with the numerical value of a figure in the second factor, the partial products represented by these positioned templates can be ascertained as to the units by feeling the lower notchings 83 of the templates and as to the tens by feeling the upper notchings 84. The relative positions, regarded circumferentially, of the two quadrantal portions 81 and 82 are such that related steps or notches in these two parts are approximately 90° apart. The notchings thus referred to as being related are those notches which in the two parts of the template respectively represent tens and units and thus constitute pairs, the notches in any one pair thus together representing a partial product.

In Figure 8 is shown a complete set of these templates. The number marked in this figure on each template indicates its numerical value as constituting a representation of a part of the multiplication table. Thus the template marked 6, represents by the notchings 83, 84 therein all the products of 6 multiplied by the several numbers 1 to 9. The notchings 83 represent the units in these products and the notchings 84 represent the tens. The numerical values of the depths of the notchings are indicated by the numbers marked on the concentric arcs in the view of the No. 6 template, while the numerical values of the several positions into which the templates can be swung, in accordance with the value of a figure in the second factor, are indicated by the numbers placed circumferentially on the curved radiating lines. Thus if this template is swung and angularly positioned in respect of 8, the latter number being a figure in the second factor in the sum performed, and if the two parts 81 and 82 of the template are then felt in the manner described herein, the feeling movements taking place in a radial direction with respect to the template axis, the depth of the notch which is felt in the tens part 82 will be four radial increments while the depth of the corresponding notch in the units part 81 will be eight radial increments, thus giving an indication of the product 48.

The feeling of the templates 80 is effected by two-armed swinging feeler members. These members are mounted and separately movable on a common shaft 120 (see Figure 1) each feeler comprising a somewhat downwardly directed arm 121 having at its end a curved blade-like feeling finger 122, and an upwardly directed arm 123 which at its end is provided with a blade-like feeling finger 124. The feeler arm 123 is formed with an upwardly directed extension 125 on the end of which is formed or mounted a toothed quadrant 126. The construction and arrangement of each of these feeler members 121 and 123 with respect to the templates 80 is such that by swinging the feeler in one direction from a mid or neutral position the step or notch in one quadrantal portion of a positioned template 80 will be felt by one feeler arm 123 and when the feeler is swung in the other direction through its neutral position its arm 121 will feel the positioned notch of the other quadrantal portion of a template in an adjacent set of templates.

The arrangement of the feeling members with relation to the sets of templates is shown in Figure 6 and also in the diagram in Figure 7.

Conveniently the feeler actuating mechanism is so arranged that the feelers are swung first in an anti-clockwise direction as seen in Figure 1 and then in a clockwise direction about their common shaft 120. Thus each feeler by means of its arm 123 feels first the tens portion of a template and then as the feeler swings in a clockwise direction the feeler arm 121 feels the units portion of a template. It is to be noted, however, as shown in Figures 6 and 7, that while the lower arm 121 of each feeler member functions with respect to the units quadrants of selected and positioned templates in one denomination set, such as the set $B^2$ in Figure 7, the upwardly directed arm 123 of the same feeler member functions with respect to the tens portions of templates in the adjacent lower denomination set of templates $B^1$. Three of these feelers have each two arms 121 and 123, while there is a feeler with only one arm 121 and blade 122 for feeling the units in the lowest denomination template set $B^1$, and a feeler with only one arm 123 for feeling the tens in the highest denomination template set $B^4$.

If, for example, the sum or problem to be solved is the multiplication of 396 by 4, then the feeding in of the figures 3, 9, 6 by operation of keys in the first set will result, in the manner described above, in the selection and rendering "alive" of three templates respectively in the three adjacent sets $B^3$, $B^2$, $B^1$ and of the zero template in the set $B^4$. The template in the set $B^3$ will be the No. 3 template shown in Figure 8 which is notched to represent all the products of 3 multiplied by the numbers 1 to 9 inclusive. The template in the set $B^2$ will be the No. 9 template which is notched to represent all the products of 9 multiplied by the numbers 1 to 9. The template in the set $B^1$ will be the No. 6 template which is notched to represent all the products of 6 multiplied by the numbers 1 to 9. The simultaneous positioning of all these templates in respect of the figure 4 is effected when this figure is fed in by actuation of a key 101 so that by feeling the selected template in the $B^1$ set there will be ascertained the first partial product of 6 multiplied by 4=24, the feeling of the second template in the $B^2$ set will give the second partial product 9 multiplied by 4=36, and the feeling of the third template in the $B^3$ set will give the partial product 3 multiplied by 4=12. These partial products may be set out in the following manner:—

24
36
12
_____
1584

As the first or lowest denomination feeler tends to swing in the anti-clockwise direction it will make no movement since there is no lower denomination template whose tens part can be felt. When this first feeler swings in the clockwise direction it will feel the units, that is 4, in the one part of the No. 6 template in the $B^1$ set.

As the second denomination feeler swings in the anti-clockwise direction it will feel the tens portion of the No. 6 template in the $B^1$ set and ascertain the value of the tens, that is to say 2, in the first partial product and subsequently as this feeler swings in the clockwise direction it will feel the units portion of the No. 9 template in the $B^2$ set and ascertain the units, that is to say the 6, in the second partial product. Similarly the third feeler will feel in the No. 9 template in the $B^2$ set the tens in the second partial product, that is to say 3, and subsequently in the No. 3 template in the $B^3$ set the units, that is to say the 2 in the third partial product. The fourth feeler will feel only the tens, namely 1, of the third partial product in the No. 3 template in the $B^3$ set and will be prevented from feeling in the clockwise direction by the zero template in the $B^4$ set. The fifth feeler will be prevented from feeling into tens by the zero template in the $B^4$ set and it is prevented from feeling in a clockwise direction by a permanent stop because it is never required to feel units.

The depth measured in the radial direction of each notch in the template has a distance value in accordance with the numerical value which it represents, this depth being based on some convenient unit of radial distance. These units are indicated by the concentric arcs in the view of the No. 6 template in Figure 8. Hence in the cases instanced above, when the second feeler moves in the anti-clockwise direction, it will have swung from its neutral or mid position through an arc measuring 2 units of distance. When, however, this same feeler swings in the clockwise direction, it will move past its neutral position through an arc whose length is equal to 2+6 units of distance. This the total swing of the feeler in the clockwise direction will represent the sum of the tens, that is to say 2 in the first partial product and the units, that is to say 6 in the second partial product, so that the feeler will have moved through a distance representing 8. Similarly, the third feeler above referred to when it swings in the clockwise direction will move through a total distance equal to the sum 3+2=5.

By this means all the feelers which are swung simultaneously first in the anti-clockwise direction and then in the clockwise direction by mechanism to be described hereunder will move respectively in the clockwise direction through distances of arc corresponding to the several values of the figures in the units, tens, hundreds and thousands in the final answer to the sum.

The swinging of the feeler members 121, 123, first in one direction and then in the other may be effected by various means and may be controlled in different ways so as to ensure the correct timing of the feeling movements in relation to the positioning of the templates. In the preferred arrangement the source whence power is derived for the feeling movements is constituted by a horizontally disposed shaft 130 acted on by a spring which tends to rotate this shaft, the spring being rewound as and when the mechanism is reset. The rotation of this shaft 130 is controlled by an escapement or other catch mechanism such as that shown in Figures 10 and 11 which is operated so as to release the shaft when a key 101 is depressed. The arrangement is such that it is the last part of the downward movement of the key which brings about the release of the shaft 130, the first part of the downward movement of the key having caused the rotational positioning of the templates 80 in accordance with the number value of the key in the manner described above. Thus the mechanism ensures that the selected templates will be first positioned and then movement will be imparted to the feeling members. A yielding connection is interposed between the shaft 130 and each feeling member so that while the movements imparted from the shaft to each feeler will tend to swing the feeler in each direction in turn through the maximum distance necessary to feel the deepest radial notch or step in any template, at the same time the movement of the feeler in either direction can be checked, without straining of the mechanism, by the different portions of the template which are of less depth than the maximum. It is necessary also to ensure that each feeler member is always returned to its central or neutral position after it has been swung. As indicated above, the structures of some parts of the templates are such that the feelers acting thereon will be prevented from making any swinging movement in either one direction or the other.

The following may be instanced as an example of a construction that may be adopted for the spring driven shaft 130, the means by which its rotation is controlled, and the connections between this shaft and the several feeler members.

In some suitable position below the rods 102 of the keys 101 is a horizontally arranged plate 111 carried by bell crank levers 112 pivoted at 113 and connected by a link 114 so as to constitute a parallel movement whereby the plate 111 as a whole can move downwardly while remaining horizontal. The lower ends of all the key rods 102 lie above this plate 111 and the ends of these rods terminate at such a distance from the plate that when any key is fully depressed, the last part of the downward movement of the key rod will bring its end into contact with the plate and the latter will be pressed downwards. This downward movement of the plate will occur just as the lateral pin 104 carried by the key rod reaches the lower end of the inclined slot 106 in the plate 105 whose sliding movement thus imparted to it effects the rotational positioning of the selected templates in the manner described above. The downward movement of the plate 111 effects the release of a catch forming part of an escapement which controls the rotation of the shaft 130, a link 115 or other suitable connection extending for this purpose between one of the levers 112 and the catch member.

This escapement mechanism cooperates with the pawl 98 adapted to engage the ratchet teeth on the quadrant 96 mounted on the rock shaft 85 which carries the universal bar 92. The arrangement is such that when a key 101 is depressed and this bar 92 is swung to rotationally position the templates 80 in the manner described, the pawl 98 will hold the bar in the position into which it has been swung, thus retaining the templates after the key has been released and while the templates are being felt. The pawl 98 is automatically tripped by the escapement when the feeling of the templates is completed and the spring driven shaft is completing its rotation which imparts swinging movement to the feelers.

The shaft 130 is suitably disposed and the spring so arranged that it tends to rotate this shaft in a clockwise direction, as seen in Figure 1. On this shaft (see Figures 1, 6, 10 and 11) are fixed a crank disc 131 with pin 132, a cam 133 adapted to impart a lift to a lever acting thereon as the shaft rotates, and a drum or cylinder 134 in whose periphery is formed a somewhat helical cam groove 135. The function of this cam groove is to impart movement to certain portions of the mechanism in a direction parallel to the shaft axis. The mechanism associated with this lift cam 133 and cam cylinder 134 will be described hereafter.

The crank disc 131 is disposed at one end of the shaft 130, see Figure 6, and has the crank pin 132 projecting from its outer face while on its inner face projects a short pin 136 located angularly at a determined distance from a notch 137 formed in the periphery of the disc. Actually the peripheral portion of this disc operates somewhat as a cam in conjunction with the notch and acts on a pawl 138 forming part of the escapement which is connected by the link 115 to the horizontal plate 111 which can be pressed down by the keys 101. The downward movement of this plate 111 when a key 101 is depressed will withdraw the pawl 138 out of engagement with the notch 137 so that the crank disc can then be rotated by the spring acting on the shaft 130 until on completing its rotation the pawl again enters into engagement with the notch. The pin 136 on the inner face of the crank disc cooperates with a detent member 139 of the escapement so as to ensure the reengagement of the pawl with the notch 137. The pawl 138 and the detent member 139 extend from a boss 140 carried on a stud 141. Formed on or connected to this boss is a lever 142 directed downwards and constituting a tail to the escapement, this tail having a lateral pin 143 adapted to strike the tail 99 of the pawl 98. By this means this pawl can be disengaged from the ratchet toothed quadrant 96 so as to release the universal bar 92. Thus at the completion of the rotation of the shaft 130 when the swinging movements of the feelers are finished, the selected templates will all be released and can fall back once more into the positions occupied by them when first selected and rendered "alive".

The pin 132 of the crank disc 131 is connected by a link 144 to a lever arm 145 on a horizontal rock shaft 146 which has fixed radially thereon a plate 147 conveniently downwardly directed (see Figure 1). Loosely mounted on this rock shaft are a series of levers 148 which in their initial positions are directed oppositely with respect to and substantially in line with the radial plate 147 fixed on the shaft, that is to say while the plate is downwardly directed these levers are directed upwardly. Each of the levers 148 is connected by a link 149 to a pin 127 on the side of the arm 123 of a feeler member. The radial plate 147 on the rock shaft has fixed thereto towards its outer edge and on the opposite sides thereof a series of pairs of leaf springs 150. Each spring in one of these pairs extends inwardly over the plate 147 and past the one side of the shaft 146, the intermediate portion of the spring being bowed, as seen in Figure 1, so as to clear the shaft while its end portion is directed inwardly and curved so that it bears against one face of one of the levers 148. Thus the two springs 150 in each pair extend from opposite sides of the outer edge of the plate 147 and bear against the opposite faces of the same feeler lever 148. The arrangement constitutes a yielding connection between the rock shaft 146 and the several feeler levers 148 such that as the shaft is rocked in one direction or the other it will tend to move with it in one direction or the other all the feeler levers, but if resistance is offered to the movement of any feeler lever, as when a feeler is in contact with a notch in a template, the rocking of the shaft can continue to the full extent without straining of the parts. The pairs of springs 150 are so arranged that when the rock shaft 146 is in its initial position the feeler levers 148 are so held by the springs that the feelers 121, 123 will be in their neutral positions with the fingers 122, 124 of each feeler member just clear of the peripheral portions of the quadrants 81, 82 of the templates.

The whole arrangement is such that as the spring driven shaft 130 makes one complete rotation the rock shaft 146 will be rocked first in one direction and then in the other, thereby imparting through the yielding connections the necessary swinging movement first in the anticlockwise direction (as seen in Figure 1) and then in a clockwise direction to all the feelers, the actual swinging movements of these feelers from their mid or neutral positions and the extent of such movements being determined as above described by the positioned portions of the selected templates which are thus felt by the feeler members.

The swinging movements of the feeler members in the clockwise direction which, as above described, will take place through distances determined by the value of the partial products ascertained by feeling the two parts of the selected and positioned templates, are passed into adding mechanism by suitable means and, for example, in the following manner.

As mentioned, each feeler member is provided with an arm 125 which is conveniently directed upwardly and carries a toothed quadrant 126. A series of toothed adder or answer wheels 151 are so mounted on a shaft 152 that they can be either lowered to bring an adder wheel into engagement with a feeler quadrant 126 or raised when these adder wheels will be disengaged from and clear of the feeler quadrants. The mechanism controlling the raising and lowering of these adder wheels is arranged and operated so as to maintain these wheels in their raised position when the feeler members swing in the anticlockwise direction, but the adder wheels are lowered into engagement with the quadrants and maintained in engagement with them when the feelers are swung in the clockwise direction. Thus as a feeler makes its swing in the clockwise direction, it will rotate an adder wheel through an arc corresponding to the numerical value represented by the distance through which the feeler makes this clockwise swing.

The following mechanism may conveniently be employed to effect the raising and lowering of the adder wheels 151, and also to traverse these wheels across the several feeler quadrants 126 so that the adder wheels can be caused to engage in succession the quadrants of the several feelers of different denominations. This is necessary as the keys 101 are depressed in succession for the purpose of feeding in the figures in the second factor. In the sum given above by way of example, only a single figure 4 is instanced as appearing in the second factor and the answer to this sum, namely the total product 1584, is indicated by the adder or answer wheels 151 when the feelers have completed their clockwise swings. The answer wheels are then lifted clear of the feeler quadrants 126 while the latter return to their initial neutral positions.

If now there is a second figure, for example 6, in the second factor, this figure is fed in as before by depressing the corresponding key 101 when the selected templates will be positioned and subsequently felt, thus ascertaining the answer to the sum performed 396×6. The distances moved by the several feelers will then represent the partial products which may be set out as previously in the following manner:—

```
      36
      54
      18
    2376
```

This total has now to be fed into the answer wheels 151 and added to the product already carried in these wheels:—

```
    1584
    2376
   18216
```

The answer wheels, however, have now been traversed across the feeler quadrants 126 so that a wheel 151 which in the previous operation was not engaged with a feeler quadrant is now brought into engagement with the first feeler quadrant and this wheel will be then rotated to indicate 6, the unit figure in the second product. The next answer wheel which carries the unit figure 4 of the first product is now engaged with the second feeler quadrant so that 7, the tens figure in the second product, is fed into this answer wheel. The carry resulting from this addition is duly passed into the next answer wheel of higher denomination which is being rotated as the 3 in the second product is transmitted into it. In the same way the carry from this wheel is passed into the answer wheel of next highest denomination and this latter wheel is also turned as the 2 from the second product is passed into it. In this way five wheels 151 will indicate the answer to the sum 396×46=18216.

If there is a third figure in the second factor, this is fed in and the partial products dealt with in the same way, the third product thus obtained being added into the above-mentioned total which is already carried in the answer wheels. The latter have been traversed as before across the feeler quadrants so as to ensure the third product being passed correctly into the answer-indicating mechanism.

A shaft 170 (Figures 1, 9 and 14) mounted in suitable bearings is disposed horizontally near the spring driven shaft 130 and has fixed thereon towards its ends two levers 171 whose ends are connected by a rod 172 which lies parallel to the shaft. This shaft 170 with the levers 171 and rod 172 connecting them constitutes a frame which can be rocked about the shaft axis by means of an arm 173 which projects downwardly from the shaft with its end bearing against the periphery of the cam 133 described above as being mounted on the spring driven shaft 130. This frame has another downwardly directed arm 174, shown in Figure 14, whose function will be explained hereafter. On the rocking frame 171, 172 is carried a frame comprising side members 175 and transverse members 176, 177 which can slide along the shaft 170 and along the bar 172 which passes through the side members 175. This sliding frame 175 projects beyond the rocking frame 171, 172, as seen in Figures 1 and 9, and its overhanging part supports the shaft 152 with the adder or answer wheels 151 which are thus carried over the feeler quadrants 126.

Mounted conveniently loosely on the shaft 170 of the rocking frame are two bosses 178 connected by a longitudinal part 179, one boss having an arm 180 which projects from the shaft 170 rearwardly (see Figures 6 and 9), that is away from the rocking frame 171, 172 and the sliding frame 175 thereon. The bosses lie between and against the side members 175 of the sliding adder wheel frame and thus engage this frame in such a manner that movement imparted to the arm 180 in the direction of the axis of the shaft 170 will cause the arm to carry with it the adder wheel frame 175 and slide this frame along the rocking frame 171, 172. Towards its end this arm 180 is formed on its underside with a series of four similarly downwardly directed tooth-like projections 181 (see Figure 6) which are spaced at equal distances apart in a horizontal direction parallel to the axis of the shaft 170. These teeth 181 are so disposed that they can enter successively into engagement with the peripheral groove 135 in the cylindrical cam 134 on the spring driven shaft 130 as this shaft is rotated. The cam will thus impart to the arm 180 a movement in the direction of the axis of the shaft 170 and thus through the arm the adder wheel framing 175 will be caused to slide along the rocking frame 171, 172. The connection between the arm 180 and the adder wheel framing 175 is in effect an articulated connection such that the adder wheel framing can be raised and lowered by rocking the frame 171, 172 without affecting the engagement of the teeth 181 with the cam groove 135.

The cam groove 135 is so formed in the periphery of the cam cylinder 134 that it extends completely around this cylinder with the end portions of the groove overlapping but both laterally inclined in opposite directions so that these end portions are spaced apart with each end of the groove opening out finally through the end of the periphery of the cylinder. The formation and disposition of this cam groove and also of the teeth 181 which successively engage this groove, are such that as the shaft 130 on which the cam 134 is mounted makes one complete rotation, one of the teeth 181 being then in engagement with one end of the cam groove 135, a sliding traversing movement will be imparted to the adder wheels 151 relatively to the toothed quadrants 126 of the feelers. This traversing movement is sufficient to move the adder wheels from planes intermediate between the planes of the feeler quadrants 126 into the planes of these quadrants so that the adder wheels can be lowered into engagement with the feeler quadrants (see Figure 6). The adder wheel frame 175 is then held in that position by the cam 134 and the tooth 181 which is in engagement therewith until the desired moment when after the adder wheels have been raised so as to disengage them from the feeler quadrants an inclined part of the cam groove 135 imparts a further traversing movement to the adder wheel frame, thereby moving the adder wheels again into planes intermediate between the planes of the feeler quadrants. At this stage the second tooth 181 enters into engagement with the cam groove 135 the shaft 130 having now completed one rotation. When this shaft makes its next rotation, following the feeding in of another figure in the second factor, the first tooth 181 emerges from the cam groove 135 while the second tooth functions to transmit from the cam the necessary traversing movement to the adder wheel frame 175 in the same way as before. This cycle of operations is repeated as may be necessary in accordance with the structure and capacity of the machine with respect to the number of the figures in the second factor with which it can deal. As will be apparent, the detail formation of the cam groove 135 and its rotational position on the spring driven shaft 130 are determined so as to time the movements brought about by the cam in proper relation to the movements brought about by the lift cam 133 and crank pin 132 on the shaft, thus ensuring proper coordination between the feeling movements, the raising and lowering of the adder wheels with respect to the feeler quadrants and the traversing of the adder wheels across the feeler quadrants.

It is to be noted that when a figure in the second factor has been fed into the machine by depressing the appropriate key 101, the functions directly performed by the depression of this key are to position rotationally the selected templates 80 in accordance with the value of this key, and as this positioning is completed to release the spring driven shaft 130. Subsequent operations are, however, automatic, namely the feeling of the templates, the lowering and raising of the adder wheels 151 so that they may be rotated to the extent determined by the partial product values ascertained by feeling, and the traversing of the adder wheels in readiness for receiving the partial products resulting from feeding in of the next figure in the second factor.

The adder wheels 151 may be constructed and associated with such mechanism as may be convenient in order to provide for the transmission of the carry both when partial products are passed into the adder mechanism initially and when successive products are obtained from feeding into the machine successive figures in the second factor in the sum. If desired, means may be provided for locking the adder wheels when lifted and disengaged from the feeler quadrants thus obviating the risk of accidental rotation of these wheels.

The adder wheels may be constructed and arranged to present directly in a visible manner the answer thus obtained or mechanism may be provided whereby when a complete product has been fed into the adder mechanism and the whole mechanism is to be reset in order to feed into it a fresh sum, the product already in the adder mechanism may be transferred and otherwise dealt with. For example, such other mechanism may provide means whereby each product as thus ascertained is printed and successive products totalized and this total presented.

The construction of adder mechanism preferably employed is that shown in detail in Figures 18 to 21. Several of these mechanisms are used, all of them being substantially similar in their construction.

The mechanism comprises a series of groups of wheels each group consisting of three wheel members and the number of groups corresponding to the number of denominations or figures that may appear in the answer or total. The three wheel members may be conveniently designated as the indicating wheel 151, the feed wheel 153 and the intermediate wheel 154, all of which are directly or indirectly rotatable on the shaft 152. The indicating wheel 151 is formed as a disc carried on one end of a sleeve or hub 155 of suitable length that end portion of the sleeve which is remote from the disc being formed as an eccentric 156. The outer face of the disc, namely that which lies remote from the sleeve 155, carries a series of teeth 157 formed conveniently as pins projecting from the face of the disc. In the preferred construction this disc is provided with twenty of these pin teeth 157. In the periphery of the disc 151 is formed a notch or step 158 adapted to be engaged by a pawl, the rotational position of the wheel when the pawl is engaged by this notch being the zero position of the wheel. As the wheel turns from its zero position, the pawl, which at first bears on a part of the wheel periphery of less diameter as shown in Figure 19, will later be lifted by an increase in the diameter of the wheel which occurs at 159, this part of increased diameter extending through a substantial arc which may approximate to 180° to the point where the notch 158 is formed. Thus if the wheel 151 has been turned through nine units of distance in the course of transmitting into the answer mechanism the figures of a product, the pawl will then lie on the raised part of the periphery of the wheel adjacent to the notch 158. When now this wheel is turned back to its zero position, the pawl will rest on this raised periphery until the wheel has turned past the place 159 where the diameter of the wheel decreases, when the pawl will move inwards until it butts up against the radial face of the notch 158. The object of this construction will be explained hereafter.

The feed wheel 153 is formed as a disc mounted on one end of a short sleeve which is carried and freely rotatable on the sleeve 155 of the indicating wheel 151, the sleeve of the feed wheel serving as a distance piece between the one face of this wheel and the adjacent plain face of the wheel 151. On this face of the feed wheel which lies opposite to the plain face of the wheel 151, the feed wheel is provided with a series of laterally projecting teeth 160 formed conveniently by pins, there being nine of these teeth. On the other face of the feed wheel 153 are a series of teeth 161 also constituted conveniently by pins, the number of these teeth being eighteen.

The intermediate wheel 154 is formed on its periphery with teeth of V-section, as shown in Figures 20 and 21, the number of these teeth being conveniently seventeen. This wheel is carried and is freely rotatable on the eccentric portion 156 of the sleeve or hub of the wheel 151. When the parts are assembled on the shaft 152 as seen in Figure 18, the intermediate wheel 154 lies between that face of the indicating wheel 151 which is provided with the teeth 157 and that face of the feed wheel 153 which carries the teeth 161, these three wheels forming a group functioning in respect of one and the same denomination. The teeth 157 of the wheel 151 and the teeth 161 of the wheel 153 can both engage the teeth of the intermediate wheel 154 between them, but this engagement can only occur over a small arc as seen in Figure 20, owing to the eccentric mounting of the intermediate wheel 154. The arrangement is such that if the feed wheel 153 has been rotated to the extent of ten units, it will act through the intermediate wheel 154 to rotate the indicating wheel 151 of the group of the next highest denomination through one unit.

The nine teeth 160 on the one face of each feed wheel 153 are the teeth which when the answer mechanism is lowered in the manner described enter into engagement with the toothed quadrant 126 of a feeler member. When the answer mechanism is raised about its neutral position, the same teeth 160 are brought into engagement with a sliding bar 200 provided with teeth 201. Owing to the connection between the wheel groups, it is possible to rotate simultaneously either in one direction or the other two or more feed wheels 153, as when a product is fed into them by the feeler quadrants 126, or when these wheels are subsequently turned back into their zero positions by sliding of the racks 200. The connection between wheels in adjacent groups is by way of the sleeve 155 of each indicating wheel 151 and the eccentric 156 on this sleeve.

All the wheel groups are mounted side by side and severally rotatable on the shaft 152. At the end of lowest denomination there is an indicating wheel 151a (see Figure 18) but it has no teeth on its outer face but merely a single pin which engages a hole in the frame plate which serves as a bearing for one end of the shaft 152, the wheel being thus held against rotation. At the other end of the series of wheel groups there is a freely rotating indicating wheel 151b with teeth 157 on its inner face, but the sleeve of this wheel carries no feed wheel and has no part which is formed eccentric.

Extending parallel to the shaft 152 and adjacent to the peripheries of the wheels thereon is a shaft 162 on which are mounted a series of pawls 163 each of which is adapted to engage the notch 158 in the periphery of an indicating wheel 151. Owing to the nature of the answer mechanism and the manner in which the indicating wheels 151 in the groups of higher denomination may receive movements resulting from carrys, such rotations may be through small arcs, and if one of these indicating wheels should happen to be near its zero position, there may be a tendency for this wheel to be engaged by its pawl 163 before the wheel has been rotated, as it should be, through nearly 360° back to its actual zero position. To obviate this, the racks 200 are caused to slide in succession and not simultaneously, when these racks are restoring the wheels of the answer mechanism to their zero positions. Further, the pawls 163 of the several answer wheel groups are so interconnected that a pawl when it functions with respect to the wheel group of one denomination is held back until the pawl which functions with respect to the group of next lowest denomination is about to engage with the notch 158 in the indicating wheel 151 of that group. This interconnection is conveniently effected by forming each pawl 163 as an arm projecting from one end of a short sleeve 164 on the other end of which is a second arm 165 provided with a lateral projection 166 which overlaps the pawl arm 163 of next lowest denomination. As above described, the periphery of each answer-indicating wheel 151 is so formed that the pawl 163 cannot move inwards until the wheel has turned back through a substantial arc measured from its notch 158 when this wheel is being restored to its initial position. While thus held outwards, this pawl, through the overlapping part 166, is holding in the "off" position the pawl which functions in respect of the indicating wheel 151 in the group of next highest denomination.

The construction is such that it is possible to set rotationally and simultaneously two or more of the wheels 151 when the teeth 160 of the wheels 153 are engaged with the feeler quadrants 126, while at the same time the necessary carry can be passed on from one adder wheel group to the next. Similarly, it is possible with this mechanism when in engagement with the toothed racks 200 to have all its wheels turned back towards their zero points and finally to these zeros as the racks slide in the direction necessary to effect this. The settings of the several wheels of the adder mechanism will then have been transferred into these sliding racks whose respective horizontal positions into which they have moved from their several zero points will correspond to the numeral settings of the adder wheels with which they were in engagement when the racks were moving from these zero points. In the same way, if one or more other adder mechanisms are brought into engagement with these racks and the latter are caused to move back to their zero points, then these other adder mechanisms will have their wheels set rotationally to the number values represented by the positions from which the individual racks have to move back to zero.

The adder mechanism carried on the sliding frame 175 is constructed in the same way as shown in Figures 18 and 19 but the mounting illustrated in these figures is the mounting employed for certain of the other adder mechanisms to be described hereafter.

In the case of the adder mechanism carried by the sliding frame 175, it will be seen from Figure 1 that the shaft 162 which carries the pawls 163 is mounted in the sliding frame 175. A locking device illustrated in Figures 1, 9, 12 and 13 is provided for the adder wheels so as to prevent accidental rotation of these wheels when the frame 175 has been lifted into a position such that the adder wheels are in an intermediate position wherein they are clear of and cannot enter into engagement with either the feeler quadrants 126 or the teeth of the sliding rack bars 200. This locking mechanism is conveniently arranged and operates in the following manner. A fixed part of the framing 182 carries a transverse bar 183 (see Figure 9) which passes through the arms of a wide U-shaped member 184 which is thus free to turn on the bar 183. The ends of the arms of the U-shaped member 184 are pivotally connected to a plate 185 whose ends are carried so that they can slide in slots 186 formed in the ends of the sliding frame members 175 (see Figures 12 and 13). The plate 185 has a series of teeth 187 projecting from its inner edge these teeth being adapted to engage the teeth 160 of the wheels 153. When the adder frame 175 is lowered, as shown in full lines in Figure 12, so that the teeth 160 can engage with the teeth of the feeler quadrants, the locking plate 185 will be drawn outwards by the swinging of the U-shaped member 184 thus leaving the adder wheels free to be rotated as the feelers and their quadrants 126 are swung. When, however, the adder frame 175 is raised into its mid or neutral position in which it is shown in chain lines in Figure 12, the locking plate 185 is caused to slide inwards so that its teeth engage the teeth of the adder wheels. The locking plate will be withdrawn in the same manner and the adder wheels will be released if the frame 175 is raised from its neutral position so as to bring the adder wheels into engagement with the teeth of the sliding rack bars 200.

The movements of the rack bars 200 may be utilized in various ways. As indicated, when the adder wheels 151 are raised and in engagement with these bars, the latter by sliding will reset all the adder wheels to zero. When they thus move the rack bars may serve to set up type by means of which it is possible to print the numerical values represented by the position into which the rack bars can slide. The rack bars may also serve to transfer the successive answers from the adder wheels 151 into other counting wheel mechanisms wherein these answers may be added together or otherwise dealt with as desirable.

Figure 14 illustrates a part of the mechanism comprising a set of adder wheels which function with the sliding rack bars 200 in association with the presentation of the answer either in printed or other form. This set of answer wheels 151c is mounted on a frame 167 comprising triangular side plates which carry the adder wheel shaft 152a and can swing as a whole about a shaft 168, a similar frame being shown also in Figure 19. A link by means of which the frame 167 can be swung is connected to the frame at 169. The frame 171 which, as described, is rocked about the shaft 170 for the purpose of raising or lowering the main set of adder wheels 151 is provided with a downwardly directed lever arm 174 which is connected by a link 188 to one arm 189 of a two-armed lever pivoted at 190. The second arm 191 of this lever has a finger which extends towards a cam 192 mounted on a rotatable shaft 210. At one point in the periphery of this cam is a radial recess 193 into which the finger of the lever 191 can enter when the adder wheel frame 171 is rocked downwardly to bring the answer wheels 151 into engagement with the feeler quadrants 126. One portion of the cam 192 is formed so as to clear or carry the end of the finger lever 191 when the adder wheels 151 have been raised into their mid or neutral position and the other portion of the cam is formed so as to act on this finger in such a manner as to rock the adder wheel frame 171 in the upward direction, thus bringing these wheels into engagement with the rack bars 200.

A link 194 extends from the triangular frame 167 which carries the wheel set 151c to a lever 195 on the shaft 190. A second arm 196 of the lever 195 has a finger which lies behind the lever 191 as seen in Figure 14 and is adapted to bear on a second cam 197 on the shaft 210. This cam is so formed that the adder wheel mechanism 151c which may function as a totalizer will be raised into engagement with the racks 200 when the latter are about to slide back into their zero positions after having moved in the opposite direction for the purpose of turning to their zero positions the main adder wheels 151. As the racks 200 then slide back into their zero positions, the totalizer wheels 151c will be set rotationally, their settings being in effect those transferred by the racks from the main adder wheels 151 when the latter were set to zero. A locking device is provided for the totalizer wheels 151c when these wheels are lowered and disengaged from the racks.

The resetting of the mechanism may be effected in various ways. Conveniently the resetting is brought about when a member such as a wheel and shaft is rotated by hand or power at the conclusion of the operations of feeding in figures, the rotation of this wheel shaft bringing about the movements of parts which perform certain functions before resetting is completed, while at the same time there is effected the rewinding of the spring which acts on the shaft 130. The hand-operated shaft 220 (see Figure 23) lies horizontally with a handle on that end of the shaft which is situated at the righthand side of the machine. This shaft rotates through gearing the transverse shaft 221. On that end of the shaft 221 which lies at the lefthand side of the machine is a bevel wheel 221a meshing with a bevel wheel 221b on a shaft 222 which lies horizontally in bearings along the lefthand side of the machine (see Figure 24). On this shaft 222 are a series of bevel wheels 223, 224, 225, 226 suitably spaced apart, and towards its rear end is a cam 227 and a pinion 228. The bevel wheel 224 meshes with a bevel wheel 211 on the transverse camshaft 210. The bevel pinion 226 meshes with a bevel pinion 230 on a shaft which carries a toothed wheel 231 meshing with a toothed wheel 232 on a shaft 233. On this shaft 233 is mounted the drum which contains the main spring. This spring is so arranged that while it can be recoiled by rotation of the wheel 232 when the hand wheel and shaft 222 are turned, the other end of the spring tends to rotate the gear wheel 234 which meshes with a toothed wheel 235 on the end of the shaft 130. The spring is so disposed inside the drum cooperating with ratchet mechanism of suitable structure that rewinding can only take place through the extent to which the spring has unwound, though the shaft 222 will always be rotated through a predetermined arc when the resetting hand-operated shaft 220 is rotated.

As will be apparent from the above description, many of the parts of the mechanism return automatically to their initial positions, but other parts require to be moved positively back to their zero positions. Such parts in particular comprise the selector carriage 60 and the sliding frame 175 carrying the main adder wheels 151. These parts are reset when the shaft 222 is rotated.

The selector carriage 60 is moved back into its initial position through a link 45a (see Figure 25) connected at one end to the swinging lever 45 whose free end is connected to the carriage 60, the other end of the link 45a being connected to the pin 236 of a crank rotatable on a stud 237, the crank being carried by a toothed wheel 238 which meshes with the toothed wheel 228 on the rear end of the shaft 222 (see Figure 24).

As the carriage 60 is thus caused to slide back into its initial position, the L-shaped members 70 and 71 which have been selected and pushed downwards as a result of key actuation, are pushed up again into their initial positions. This is effected by the following means. Over that side of the key-actuated selector mechanism which lies towards the templates is a bracket plate 57 carried by the selector frame 40 (see Figures 1, 3 and 4). On the inner side of this bracket plate are mounted two horizontally extending bars 58 which lie parallel and are so positioned and spaced apart above each other that the upper edge of each bar can pass beneath the lateral projection 70a or 71a of each sliding member 70, 71, when these sliding members are in their initial and raised positions. The free or lefthand end of each of these bars, as seen in Figure 3, is bevelled off as at 59 from its upper edge, and the extreme end of the bar lies in a position where it will be clear of a set of sliding members 70, 71 when the latter are positioned in register with template catches 91, 91a. When in the process of resetting the mechanism the carriage 60 is caused to slide back towards its initial position, the bevelled ends 59 of these fixed bars 58 will come into contact with those members 70, 71 which have been selected and pushed down so that these members will again be pushed up. The distance through which the carriage is caused to slide in the process of resetting is such as to carry it past the position in which it is retained initially by the escapement, so that the fixed resetting bars 58 can act on and push up into their initial positions all the members 70, 71 in all the sets of these members. The carriage is subsequently allowed to move to a small extent in the direction in which its step-by-step traversing takes place, thus locating the first set of sliding members 70, 71 below the key-actuated members 32.

Resetting of the selected templates 80 is conveniently effected by giving to all these templates a rotational movement in an anti-clockwise direction as these templates are seen in Figure 1, this movement being effected by swinging the universal bar 92 through an arc in excess of the maximum arc through which it will swing when positioning the templates as a result of the depression of a key 101. This swinging of the templates will be sufficient to cause them to be once more engaged respectively by their catches 89, 89a which will then hold the templates in their initial "dead" positions. This resetting swinging of the bar 92 is conveniently effected by movement derived from the resetting rotation of the shaft 222. The bevel wheel 225 on this shaft (see Figure 24) meshes with a bevel wheel on a vertical shaft 225a whose lower end through bevel gearing and shafting imparts rotation to a wheel 92a (see Figure 23) on which is a crank pin connected by a link 92b to the end of the swinging bar 92 or to a lever connected to the shaft 85 on which this universal bar is mounted. Thus when the shaft 222 is rotated, the wheel 92a will make a complete rotation and the universal bar 92 will be swung through a substantial arc carrying with it all the templates that have been selected and rendered alive, these templates being thus restored to their initial "dead" positions where they are retained by the catches.

When resetting the parts it is necessary to restore the sliding adder frame 175 to its initial position on the rocking frame 171. This is brought about by the following means. The cam 227 on the shaft 222 (see Figure 22) acts on a pin 239 on the end of one arm of a lever 240 which is pivoted at 241 on an arm extending from the fixed frame member 182 (see Figures 9 and 15). The other arm 242 of this lever rests against the under side of a pin 243 which projects from the vertical portion of an L-shaped frame 244 which can slide on a vertical guide on the framework 182 which supports the adder mechanism. In the horizontal arm 245 of this sliding frame is a slot 246 in which lies the end 180a of the toothed lever which engages the groove 135 in the cam cylinder 134 by rotation of which the adder frame 175 is traversed. When the L-shaped frame 244 is raised the adder frame is free to slide along the rocking frame 171 and this sliding is effected by the action of a cam 247 on the shaft 222 (see Figure 22) which acts on a lever 248 connected by a link 249 to a pin 250 on the sliding adder frame 175 (see Figure 9).

Where, as is preferred, a separate key is not provided to bring about the swinging of the carriage 60 which renders alive the templates 80, this swinging movement is derived from movement due to the depression of any one of the keys 101. A convenient arrangement, shown in Figure 1 and also in the side elevation Figure 23, comprises a link 116 pivoted at 117 and having its free end connected by a link 118 to the bracket plate 57 on the swinging frame 40 which supports the selector carriage 60. The swinging link 116 lies adjacent to a stud 119 on one of the arms of one of the bell crank levers 112 which are connected to the plate 111 this plate being moved downwards and the bell crank levers 112 turned whenever a key 101 is depressed. When this occurs the stud 119 imparts a swinging movement to the link 116 and through the link 118 swings the carriage frame 40.

The machine is conveniently provided with mechanism which enables the transverse position of the adder wheels 151 on the sliding frame 175 to be adjusted according to whether the figures with respect to which these adder wheels are set rotationally are to be dealt with in various ways, for example when these figures are to be added into a bill total or day's total or if a discount is to be subtracted. The transference of the figures represented by the rotational settings of the adder wheels 151 is effected in a manner already indicated by means of the sliding rack bars 200 cooperating with appropriate sets of adder wheels similar to the set 151c, which sets of adder wheels or totalizers can be raised into engagement with or lowered clear of the sliding racks 200 after the manner indicated in Figure 14. Such totalizers are shown in Figure 27.

The mechanism for controlling the transverse position of the adder wheels 151 is indicated more particularly in Figures 15, 16 and 17, reference being made also to Figures 22 and 23.

In the plan of the machine shown in Figure 22, there will be seen the upper end of a vertical shaft 270 which carries a cross-piece 271, by means of which the shaft can be rotated by hand, and an indicating arm 272, which as the shaft is rotated moves over a suitably marked dial plate 273. On the shaft 270 there is fixed a lever arm 274 (see Figure 23) and lower down a bevel wheel 275 and a bevel pinion 276. The bevel wheel 275 meshes with a bevel wheel 277 on the end of a horizontal shaft 278. The bevel pinion 276 meshes with a bevel wheel 279 on the end of a horizontal shaft 280. By means of a pinion on this shaft and rack, shown in Figure 34 and described in more particularity hereinafter, there is effected a transverse adjusting movement of a camshaft which controls the sequence of movements of several adder or totalizer mechanisms with respect to their engagement with the sliding rack bars 200, these several totalizer mechanisms being seen in Figure 27.

The shaft 278, seen in Figures 15, 16 and 17, carries towards its rear end a disc 281 on the face of which is a pin 282, and also a cam 283. A horizontal bar 284 is carried by the fixed frame members 182 so that this bar can slide transversely. The bar has a downwardly directed arm 285 in which is a slot 286 adapted to be engaged by the pin 282 on the disc 281 when the shaft 278 is rotated. By this means the bar 284 can be caused to slide a definite distance to the left. Pivoted at 287 to the bar 284 is a lever 288 in the under side of which is a series of notches 289 adapted to engage the end 180a of the lever 180 which, as described, is pivoted on the transverse shaft 170 and on the one hand enables transverse sliding to be imparted to the adder frame 175 while when this lever 180 is raised the teeth on its under side are lifted out of engagement with the cam groove 135. The notched lever 288 is provided with a laterally projecting pin 290. Pivoted at 291 on the sliding bar 284 is a two-armed lever one of whose arms 292 is adapted to engage the lateral pin 290 on the lever 288 while the other arm 293 which is downwardly directed has a slot 294 therein adapted to be engaged by the pin 282 on the disc 281. A spring 295 acts on the lever 292, 293 in the manner indicated in Figures 16 and 17 so that this lever normally tends to raise the lever 288 into the position shown in Figure 16 when the notches 289 therein are clear of the end of the lever 180a. When the shaft 278 has been rotated so as to bring the pin 282 into engagement with the notch in the lever 293 and the notch in the arm 285 of the sliding bar 284, the notched lever 288 is allowed to fall into the position shown in Figure 17 so as to engage the end of the lever 180a and as the shaft 278 rotates the bar 284 will slide, carrying with it the adder wheels 151 into a transverse position where they will be held according to the rotational setting of the vertical shaft 270. At this time the cam 283 on the shaft 278 has engaged the end of one arm 296 of a lever pivoted at 297 on a fixed transverse frame member, the other arm 298 of this lever engaging a lateral pin 251 carried on the vertically sliding member 244 (see Figure 15). This raises the member 244 and with it imparts a lift to the end of the lever 180a so as to disengage the teeth of this lever from the cam groove 135 in the cam 134 in the same way as the disengagement of these teeth is effected when resetting takes place in the manner described above.

The setting of type in accordance with the figures in the product obtained by the operation of the machine as each product is indicated by the rotational setting of the adder wheels 151, is brought about as and when these adder wheels are turned back into their zero positions, in the manner indicated, by bringing these wheels into engagement with the rack bars 200 and then sliding these rack bars until the adder wheels reach their zero points. Each rack bar will then have been caused to move through a horizontal distance corresponding to the angular distance through which must be turned the answer wheel that is in engagement with this rack bar in order to restore that wheel to its zero position. Thus the horizontal distance through which a rack bar is permitted to slide will be a measure of the value of a figure in one denomination of the product.

The rack bars 200 are arranged side by side horizontally and are moved parallel to each other in the fore and aft direction in the machine, being carried by a suitably formed transverse frame member 202 (see Figure 34). The arrangement of the printing mechanism is shown in somewhat diagrammatic form in Figure 29 and illustrated in more detail in Figure 30, while parts are also to be seen in the plan Figure 22 and in the sectional elevation of the machine, Figure 27.

In suitable positions in relation to the rack bars 200 there are a corresponding number of type carriers 203 which can slide in horizontal upper and lower guides 204, 205, each type carrier being connected by a rod 206 to a rack bar 200. Thus as each rack bar slides to the limit determined by the answer wheel 151 with which it is in engagement, one of the type 207 will be positioned below an opening 208 in the upper guide member 204, this type being simultaneously located over an opening 209 in the lower guide plate 205. The opening 208 lies below an anvil plate 300 which extends transversely across the machine, being carried by the outer casing 301. Between the opening 208 and the anvil plate 300 one or more strips of paper are passed together with one or more inked ribbons or the like, so that when the positioned type is struck upwards by a hammer against the anvil plate 300, the impress of the figure represented by the type will appear on the paper.

Each type carrier 203 is connected by a rod or link 320 to one arm 321 of a two-armed lever pivoted at 322, the second arm 323 of this lever having connected thereto one end of a spring 324 which thus tends to cause the type carrier 203 and with it the rack bar 200 connected thereto to slide towards the front of the machine, that is to say in the direction necessary to turn back into its zero position one of the adder wheels 151 when the frame 175 has been raised so as to bring these wheels into engagement with the sliding rack bars. Each lever 321 is acted on by one of a series of cams 325 mounted on a horizontal shaft 326 to which rotation is imparted through a gear wheel 327 meshing with a gear wheel 328 on a shaft 329 on the outer end of which is a bevel wheel 330 in engagement with the bevel wheel 223 on the shaft 222 (see Figure 22). Thus when the shaft 222 is rotated as already described for the purpose of completing the operations and resetting the mechanism, rotation will be imparted to the camshaft 326.

Each of the cams 325 is so formed that while the shaft 326 is stationary in a certain angular position, the type carrier 203 and rack bar 200 to which the corresponding lever 321 is connected will be held stationary in their zero positions in which these parts are respectively shown in Figure 29, the type 207 then positioned for printing being 0. When, however, the shaft 326 has been rotated through a certain angle, each cam 325 will release its lever 321 so that the spring 324 acting through the lever will impart sliding movement to the corresponding rack bar and type carrier. As shown in Figures 29 and 30, the cams 325 are preferably arranged with their operative surfaces in such angular relation that as the shaft rotates the levers 321 will be released, not all of them simultaneously, but in succession, so that the adder wheels will be correspondingly turned in succession back into their several zero positions. When all the rack bars 200 have been allowed to slide into the positions determined by the adder wheels with which they are in engagement, the type hammers are operated and thereby print the figures of the product from the positioned type.

The operation of the hammers is brought about by rotation of a horizontal shaft 331 through a gear wheel 332 on this shaft which meshes with a gear wheel 221c on the transverse shaft 221 (see Figure 27), the latter shaft being that to which rotation is imparted by hand or power when the machine is being reset. On the shaft 331 is mounted a series of cams 333 (see Figure 30) each of which can engage and draw downwards a hammer lever 334 pivoted at 335 and acted on by a spring 336. The arrangement is such that as the shaft 331 is rotated it will draw one of the hammers 334 downwards and suddenly release it when the spring will cause the hammer to fly up and the projecting finger 334a with which it is provided will pass through the opening 209 in the guide plate 205 and strike the lower end of the type 207 which may then be positioned opposite to this opening. The cams 333 are preferably slightly displaced angularly in relation to each other on the shaft 331 as indicated in Figure 30 so that the cams will act on and release the hammers 334 in succession.

Means are provided whereby each type carrier 203 will be retained for a short time in the position into which it may have been moved when setting the adder wheels to zero so that these wheels may be lowered from their position of engagement with the rack bars 200 and the printing of the positioned type may be effected. The following mechanism may be employed for this purpose. Each lever 321 carries towards its outer end a quadrantal projection 321a on the under side of which are formed ratchet teeth. These teeth are adapted to be engaged by one end of a pawl 337 whose other end is rounded and lies in an opening 338 in a fixed plate 339. The pawl is acted on by a spring 340 which tends to draw the outer portion of the pawl against the edge of a fixed plate 341. The pawls lie substantially radially with respect to a horizontal shaft 342 which is rotated through a gear wheel 343 on this shaft, meshing with a gear wheel 327a on the shaft 326. On the shaft 342 is a series of cams 344 each of which can act on the rounded lower end of a pawl, the cams lying below the fixed plate 339. The arrangement is such that as the shaft 342 rotates, the cams 344, which are suitably disposed angularly on the shaft as shown, will act in succession on the pawls 337 each pawl being pushed up into engagement with the teeth of the quadrantal arm 321a of a lever 321, thus retaining this lever in the position into which it has been moved by its spring. This position, as already described, is determined by the position into which the corresponding rack bar 200 has been permitted to slide when returning one of the adder wheels 151 to zero. The formation and arrangement of the pawls 337 and the ratchet teeth on which they act are such that as the shaft 326 rotates further and the cams 325 thereon act on the levers 321 so as to restore these levers together with the type carriers 203 and the rack bars 200 to their initial positions, the pawls will permit this movement and as the shaft 342 rotates the cams thereon will be positioned so as to allow the pawls 337 to drop clear of the ratchet teeth.

As mentioned the initial position of each type carrier 203 is such that the type for 0 is positioned for printing. It is therefore necessary to provide means whereby the actual printing of the 0 will only occur when it is included in the figures of the product, while the 0 will not be printed on the lefthand side of the figure of highest denomination in the product. Mechanism is shown in Figure 30 which functions for this purpose. Below the guide plate 205 for the type carriers 203 lie a series of two-armed levers pivoted on a transverse shaft 345. One arm 346 of each of these levers is formed with a tooth which when the lever is in the position shown in full lines in Figure 30, projects through a hole 209a in the type carrier guide 205. The hole 209a is positioned where it will be covered by a part 203a of the type carrier when the latter is in its initial or zero position, wherein it is shown in Figure 29. The tooth or projection on the end of the lever arm 346 is bevelled off so that when the type carrier 203 moves into its zero position it can push the lever downwards against the action of a spring 347 which bears against its under side, the lever then occupying the position indicated in chain lines in Figure 30. The second arm 348 of the lever is curved downwardly and can bear on the upper side of one arm 349 of a two-armed lever pivoted at 350. When the type carrier 203 has moved from its initial position, and is consequently clear of the tooth on the end of the lever 346, the spring 347 acting through this lever will maintain the lever 349 in the position in which it is shown in full lines, but when the type carrier is in its zero position the lever 349 can move into the position shown in chain lines, when its end lies in the path of a projection 334b formed on the adjacent hammer 334. Thus when the type carrier is in its initial or zero position, the lever 349 being then in the position shown in chain lines, it will prevent the hammer when it is released from moving far enough to strike the 0 type which at that time is positioned for printing. This occurs with respect to the 0 in each type carrier which functions with respect to denominations higher than the highest figure in the product that is to be printed. Each lever 349 is provided with a second arm 351 of such length and weight as to cause the lever as a whole to occupy by gravity the position shown in chain lines when the lever 346 is pressed down by the type carrier. On the end of the lever arm 351 is a laterally projecting lug 352 which lies over the end of the corresponding lever 351 associated with the type carrier of next highest denomination. The effect of this is to cause the lever 346 associated with the type carrier of one denomination not only to move into the position shown in full lines the lever 349 on which it acts directly but to move also into the position similarly shown the lever 349 which would otherwise inhibit the action of the hammer acting on the type in the carrier of next lowest denomination.

Mechanism is provided whereby as keys are depressed to feed in in succession the figures in the two factors, type corresponding to these figures are selected and set up and the figures of these selected type are printed. The machine thus enables the two factors to be printed as well as the product of the sum obtained by multiplying these two factors. This key-actuated printing mechanism comprises the following features which are shown more particularly in Figures 31, 32 and 33. For the sake of clearness the cover plate is removed from the mechanism as shown in the lower part of Figure 31. The general disposition of the mechanism in the whole machine is seen in the plan in Figure 22. A similar mechanism is actuated by each of the sets of keys 21 and 101 and the type is preferably set up so that the printing of the figures will occur in the same line as the printing of the figures of the product.

A fixed frame 353 of suitable construction is provided with guides 354 on which can slide in the horizontal direction a carriage 355. The under side of this carriage has two downwardly directed lugs 356 between which lies the end of a lever 357 pivoted on a horizontal shaft 358 and having a second arm 359 to the end of which is attached a spring 360 which thus tends to cause the carriage 355 to slide towards the right, as seen in Figures 31 and 32, that is to say actually towards the left of the whole machine as viewed in plan in Figure 22. The lever 357 is connected by a link 361 to a lever 362 pivoted at 363 and by movement imparted to a stud or pin 364 at the end of this lever the carriage can be restored to its initial or zero position when resetting of the mechanism takes place. The movement of the carriage is controlled by an escapement so that the carriage movement takes place step by step.

The carriage 355 is perforated with a series of vertical holes in each of which lies and can slide a stop pin 365. Each of these pins is conveniently constructed somewhat after the manner of a split pin with the two parts slightly sprung apart so that while the pin can slide in the hole in the carriage in which it lies and can be pushed up so that its upper end will project appreciably above the upper surface of the carriage, the pin will then remain in this position until it is again pushed down. Each pin is conveniently formed with a head at its upper end so as to limit its downward movement. The stop pins are arranged in parallel rows as shown in the lower part of Figure 31, there being nine pins in each of the rows which extend transversely across the carriage while the number of the rows is determined by the number of figures in a factor with which the machine is constructed to deal. The pins in each row function for a different denomination while each pin in a row functions for a different number from 1 to 9. The pins which function for the same number in the different rows lie in line in the direction in which the carriage can slide.

There is a series of bell crank levers mounted and capable of rocking on a shaft 366 which runs transversely below the carriage 355. One arm 367 of each of these levers extends upwardly while the other arm 368 extends horizontally and is formed at its end with an upwardly directed finger 369 whose extremity lies below and in register with the lower end of a stop pin 365 in one of the rows on the carriage. The lower ends of all these stop pins project initially to a suitable distance below the under side of the carriage as seen in Figure 32. The arm 367 of each bell crank lever is connected by a rod 370 to one arm of a bell crank lever 371 whose other arm is engaged by a key rod 22 or 102 (see Figure 28). The arrangement is such that when a key 21 or 101 is depressed, the corresponding bell crank lever 367, 368 will be moved and the finger 369 on the end of the lower arm of this lever will push upwards a corresponding stop pin 365 in one or other of the rows of these pins on the carriage 355. The step-by-step sliding movement of the carriage 355 which is controlled by the escapement, brings the rows of pins 365 successively into register with the finger ends of the bell crank levers 368 so that as the keys are successively depressed, so will stop pins 365 be selected and pushed up in successive rows, these pins having position values on the carriage corresponding to the numerical values of the keys depressed.

It will be noted and seen from Figures 22, 28 and 31 that there is associated with each set of keys 21 and 101 stop-setting mechanism as described. These stop-setting mechanisms are located near each other and in positions convenient, on the one hand, for their actuation by the two sets of keys, and on the other hand for the setting up of the type so that printing may be effected on the required line.

A horizontally arranged universal bar 372 lies adjacent to the upwardly directed arms 367 of the key-actuated bell crank levers, this bar 372 being carried at its ends on levers 373 pivoted on a shaft 366. The position of this universal bar in relation to the levers 367 is such that whenever a key is depressed and a bell crank lever 367, 368 moved, movement will be imparted simultaneously to the levers 373 carrying the universal bar 372. One of the levers 373 is formed with its second and horizontally extending arm 374 whose end is formed with an upwardly directed finger 375 which forms part of the escapement mechanism controlling the sliding movement of the carriage 355. A spring 376 connected to the lever 374 tends to pull it downwards and maintain the universal bar 372 near the key-actuated levers 367. A pawl 377 pivoted on the shaft 366 lies above the lever 374 the end of the pawl being bevelled off and formed with a downwardly directed tooth as at 378. The pawl is drawn downwards by a spring 379. The end 378 of the pawl and the finger 375 on the end of the universal bar lever 374 cooperate with a series of tooth-like propections 380 having a somewhat triangular shape, as seen in side view in Figure 32, these projections being spaced apart on the lower part of one side of the carriage 355. These parts constitute the escapement which controls the sliding movement of the carriage. Whenever a key is depressed and a stop pin 365 pushed up, the universal bar 372 will be acted on and will raise the lever 374, the end 375 of this lever then acting on and lifting the pawl 377 until the nose 378 of this pawl is above and clear of a carriage tooth 380. This tooth is then engaged by the side of the finger 375 on the end of the universal bar lever, but as soon as the key which has been depressed is released and the universal bar lever 374 is drawn down by its spring, the nose of the pawl 377 will catch on the rear side of the upper angle of the tooth 380 and as soon as the end of the lever 374 has dropped clear of this tooth, the carriage will slide to the extent of one step being then held by the pawl 377 whose end will now engage the next tooth 380. Another row of stop pins 365 will now be positioned above in register with the finger ends of the key-actuated levers 368.

In a suitable position laterally in relation to each stop pin carriage 355 is a series of sliding type carriers which are constructed and arranged in their general respects in a manner similar to the type carriers 203 described above as cooperating with the sliding rack bars 200. Each of these type carriers 381 (see Figure 33) can slide in a horizontal direction between upper and lower guide members 382 and 383. In the carrier 381 are a series of loose type 384 each of which is adapted to be separately struck upwards by a hammer whose head lies below an opening 385 positioned opposite to a part of the anvil plate 300 which extends transversely across the machine and functions for the printing of the figures in the two factors and those in the product. The number of type carriers 381 in each set or series corresponds to the number of rows of stop pins 365 in a sliding carriage considering those rows of these pins which extend transversely to the direction in which the carriage slides. The number of these rows of pins is, as already mentioned, determined by the number of figures in one factor with which the machine is capable of dealing. From one end of each type carrier 381 extends a rod 386 whose squared end 387 lies in a position where it will be close to the side of the carriage 355 when the latter has moved from its initial position (see Figure 31). On that side there projects from the front of the carriage a plate 388 so arranged that when the carriage is in its initial position, as shown in the lower part of Figure 31, this plate lies across the ends 387 of all the type carrier bars 386. This plate will thus prevent the type carrier bars from sliding from their initial positions until the ends of the bars are severally unmasked by the sliding of the carriage when each unmasked bar lies in line with a row of stop pins 365. Each bar 386 whose end is thus unmasked can slide and feel any stop that may have been set up on the carriage in the row with which the type bar is then in line. When thus feeling a stop pin, the type carrier 381 connected to the feeler bar will move so as to position the corresponding type opposite the printing opening 385.

Since, as mentioned, there are only nine stop pins 365 in each row, these pins functioning for the numbers from 1 to 9 inclusive, the positioning of each type carrier with respect to 0 is conveniently effected by providing a raised flange or rib 389 along that side of the carriage which is remote from the ends 387 of the feeler bars (see Figure 31). If a 0 is included in the figures in one of the factors, no stop pin 365 will have been set up in the corresponding row, but the carriage 355 will have moved into a position such that this row will register with one of the feeler bars 386. When this bar then makes its feeling movement, it will slide until the end 387 of the bar butts up against the flange 389 when the type 384 for 0 will be positioned for printing.

Movement is imparted to each type carrier 381 and its feeler bar 386 by means of a lever 390 (see Figure 33) the end of which engages a recess formed in the under side of the type carrier, a slot being provided in the lower guide plate 383 in which the lever can move. This lever 390 is pivoted at 391 and projecting beyond this pivot the lever has an arm to which is connected a spring 392. This spring acting through the lever imparts the requisite movement to the type carrier. The levers 390 are respectively held in their zero positions by a corresponding series of cams 393 mounted on the shaft 329, rotation being imparted to this shaft when the resetting shaft 221 is rotated by hand to complete the operations. The formation of the cams 393 is such that when the shaft is rotated the levers 390 are released and the type carrier bars 386 can then feel the several stops 365 which have been set up by the keys when depressed to feed in the figures in the two factors in the sum. The type carriers remain in the positions into which they are permitted to move by the stops set up while printing of the positioned type takes place. This printing is brought about by mechanism similar to that described above in connection with the mechanism for printing the figures in the product of the sum. There is a series of hammers 394 pivoted at 395 and each provided with a projecting nose or head 396 adapted to pass through an opening in the guide plate 383 and strike the lower end of one of the type 384. The hammers are acted on by springs 397 and are severally withdrawn and suddenly released in succession by a series of cams 398 mounted on the shaft 331 which, as described above, is rotated when rotation is imparted to the resetting shaft 221. In this case, as distinct from the arrangement of the product-printing mechanism described above and illustrated in Figure 30, no one of the type 384 is positioned initially opposite to the corresponding hammer head 396, but if a type carrier has not been permitted to move, owing to the masking of the end of its feeler bar 386 by the carriage plate 388, the corresponding hammer 394 when operated will merely strike against a suitably formed part 399 of the type carrier.

When resetting takes place the transverse shaft 221 is rotated as described above and causes rotation of the longitudinal shaft 222. Suitably positioned on this shaft are two wiper cams 400 (see Figures 22 and 28) each of which acts on the lateral projection 364 on the end of the lever 362 connected to the spring-actuated lever 357 through which sliding movement is imparted to a stop pin carriage 355 (see Figure 32). Thus as the shaft 222 is rotated, each carriage 355 is pushed back into its zero position. A cover plate 401 is arranged so as to lie over each carriage 355 and the track along which this carriage can slide. At a suitable point this cover plate is inclined downwards as at 402 (see the upper part of Figure 31 and Figure 32) so that a part of this plate lies in a plane just over the heads of the stop pins 365 when the latter are in their lower positions. When the carriage 355 is pushed back for resetting, the heads of those stop pins 365 which have been pushed up strike the inclined part 402 of the cover plate and the pins are thereby pushed down again and thus reset. The resetting movement imparted to the carriage through the cam 400 and lever 362 is such as to cause the carriage to be moved back a short distance beyond the position in which it is normally held initially by the escapement. This ensures the pushing down of any stop pin that has been set up in the first row after which the carriage will make a slight forward movement so as to leave this first row of stop pins clear of the inclined resetting plate 402. Thus the first row of stops is positioned so that any stop in this row can be pushed up when the machine is next operated. As the carriage is reset the inclined face of the nose 378 of the pawl 377 will cause the latter to be lifted and trip successively over the teeth 380 on the carriage.

Conveniently two broad strips of paper 303, 304, seen in Figure 29, are fed between and by rollers 305 the paper strips being drawn off suitably arranged rollers 306 and 307 disposed towards the front of the machine within the casing 301. The paper is of such width as to enable the figures of the two factors and of the product to be all printed thereon in a line when the type are struck up against the anvil member 300. Inked ribbons carried by spools 308 (see Figures 22, 23, 24 and 28) are led over suitably disposed carriers between the paper strips and beneath the anvil plate 300. A knife-edged bar 309 (see Figure 29) may be arranged transversely across the paper after it has left the printing line so as to enable pieces to be torn off the upper paper strip 303. The lower paper strip 304 passes on and is wound on a roll 310 disposed towards the back of the machine.

The paper is conveniently fed forward automatically after each complete operation of the machine. The part of the paper which previously lay below the anvil plate 300 then passes over a plate 302 and appears beyond the edge of the anvil 300 where the printed figures can be read and, if necessary, further matter can be written on the paper in association with the printed figures.

As will be seen in Figure 27, in addition to the main set of adder wheels 151 the machine is provided with three other sets of adder or totalizer wheels 151c, 151d and 151e, all arranged on parallel axes. Each of these totalizer mechanisms is carried on a swinging framing similar to the frame 167 described with reference to Figure 14 so that the mechanism can be raised from an inoperative position into a position wherein the wheels of the totalizer are in engagement with the corresponding sliding bars 200 which lie and move above all these totalizer mechanisms. By suitably raising each totalizer mechanism, there can be passed into or deducted from the amount recorded in such mechanism the sums represented by the distances through which the rack bars 200 move, either when these bars are being restored to their zero positions or when they move forwards into the positions determined by the rotational settings of the adder wheels 151, this forward movement of the rack bars, as described above, turning these adder wheels 151 back to their zero positions.

Of the three sets of totalizer wheels, that set 151c which lies nearest to the main set of adder wheels 151 is conveniently employed in obtaining a bill total while the other two totalizer mechanisms 151d and 151e serve for day totals. The swinging of the triangular frames carrying these totalizer wheels is effected by mechanism similar to that described above and shown in Figure 14 these mechanisms being also seen in Figure 27. The cams which control the swinging of these totalizer frames are all mounted on the rotatable shaft 210.

In the case of the two wheel sets 151d and 151e, it is convenient to provide means whereby one or the other of these may be prevented from being raised into engagement with the sliding rack bars when the other of these two totalizers is so raised. This may be effected by the following mechanism. Two keys 403 and 404 are provided (see Figures 22 and 27) these keys being disposed adjacent to the set of numeral keys 21. The lower ends of the rods of these two keys bear on the oppositely disposed arms of a rocking piece connected to a lever having two arms, seen in Figure 27, the one arm 405 of this lever having a squared end while the end of the other lever arm 406 is hook-shaped. By pressing down either the key 403 or the key 404, one arm or the other of the lever 405, 406 will be raised and the raised end of this lever will engage a stud on the swinging frame of an adder mechanism 151d or 151e to which stud is connected the end of a link 194a or 194b through which swinging movement is communicated from the cam-actuated levers to the swinging frames. The cam-actuated levers associated with these swinging frames are formed in some convenient manner with a yielding connection between the parts to which the links 194a and 194b are connected and the lever fingers on which act cams mounted on the shaft 210. This yielding connection is shown in Figure 34 where it will be seen that the part 196 on which the cam acts is connected through a spring coiled around the shaft 190 to the arm 195 to which the end of the link 194 is coupled. Thus when the lever 196 is raised by cam action, the lever 195 will normally be caused by the spring to follow it, but if movement of the lever 195 is inhibited, this lever will be left behind when the lever 196 is raised by the cam. In this way is prevented the swinging or raising of one or the other of the totalizer mechanisms as the camshaft 210 rotates.

In order to enable a change to be effected in the sequence in which the several totalizer mechanisms are raised into engagement with the sliding rack bars 200, cams adapted to vary this sequence are disposed in groups on the shaft 210 and the latter is mounted so that it can be moved in the direction of its axis, as shown in Figure 34. The several cams on the shaft 210 are shown separately in Figure 35. Two cams similar to the cam $a$ are employed with a gap between them, one of these cams actually being the cam 192, seen more particularly in Figures 14 and 29, and functioning to control the raising and lowering of the swinging frame 175 carrying the main adder wheels 151. The next group of cams which controls the raising and lowering of the totalizer wheel set 151c comprises two cams $b$, one cam $c$ and one cam $d$. One of these cams enables the totalizer mechanism 151c, if desired, to be raised into engagement with the sliding rack bars 200 at such a time as will result in a discount being deducted from the bill total.

Each of the next two cam groups comprises one cam $c$ and one cam $d$, these cam groups respectively functioning to control the raising of the totalizer sets 151d and 151e.

The movement in the axial direction of the shaft 210 is brought about by means of a pinion 407 on the horizontal shaft 280 which pinion engages a rack 408 formed on the end of a bar 409 mounted parallel to the shaft 210 and so that it can slide horizontally. The bar 409 is provided with a forked arm 410 which engages a collar on the rotatable shaft 210. As described above, the shaft 280 is rotated when the vertical shaft 270 is turned by the finger piece 271, see Figure 23, so as to set the indicator 272, see Figure 22, over the marked dial with which it is associated, thus determining whether a discount is to be deducted or a bill or day's total obtained.

What I claim as my invention and desire to secure by Letters Patent is:—

1. In a calculating machine of the type indicated the combination of a set of numeral keys by means of which the figures in the first factor are fed into the machine, a second set of numeral keys by means of which the figures in the second factor are fed into the machine, a series of separately rotatable template members constituting mechanical representations of partial products and arranged in sets corresponding to the different denominations of the figures in the first factor, means for initially retaining each template member in inoperative position, selective mechanism actuated by the numeral keys in the first of the said sets of keys for effecting the selection of templates in the said series, means for actuating said selective mechanism to release and render operative said selected template members, means whereby operation of a key in the said second set of numeral keys causes corresponding positioning of all the templates selected as the result of operation of keys in the first set of numeral keys, answer-indicating mechanism and means whereby these selected and positioned templates are felt and the partial products thus ascertained in terms of distances moved are transmitted into the answer-indicating mechanism.

2. In a calculating machine of the type indicated the combination of a set of numeral keys by means of which the figures in the first factor are fed into the machine, a second set of numeral keys by means of which the figures in the second factor are fed into the machine, a series of separately rotatable template members constituting mechanical representations of partial products and arranged in sets corresponding to the different denominations of the figures in the first factor, means for initially retaining each template member in inoperative position, selective mechanism actuated by the numeral keys in the first of the said sets of keys for effecting the selection of templates in the said series, means for actuating said selective mechanism to release and render operative said selected template members, means whereby all the templates thus selected are repeatedly positioned as and when keys in the said second set of numeral keys are successively depressed to feed in figures in the second factor, means whereby after each such positioning the selected templates are felt and the several partial products thus ascertained in terms of distances moved are transmitted in succession into answer-indicating mechanism.

3. In a calculating machine of the type indicated the combination of a set of numeral keys by means of which the figures in the first factor are fed into the machine, a second set of numeral keys by means of which the figures in the second factor are fed into the machine, a series of separately rotatable template members constituting mechanical representations of partial products and arranged in sets corresponding to the different denominations of the figures in the first factor, selective mechanism comprising a plurality of separately movable members arranged in sets corresponding to the different denominations of the figures in the first factor, means whereby members in the sets in the selective mechanism in succession are selected and moved by mechanism actuated as and when keys in the first set are depressed, means whereby all the template members are initially retained in inoperative positions, means whereby the said members in the selective mechanism which have been selected and moved by key actuation can be all moved simultaneously and caused to effect the selection of corresponding templates which are thereby rendered operative, means whereby operation of a key in the said second set of numeral keys causes corresponding positioning of all the said templates which have been selected and rendered operative, and means whereby these selected and positioned templates are felt and the partial products thus ascertained in terms of distances moved are transmitted into answer-indicating mechanism.

4. In a calculating machine of the type indicated the combination of a set of numeral keys by means of which the figures in the first factor are fed into the machine, a second set of numeral keys by means of which the figures in the second factor are fed into the machine, a series of separately rotatable template members constituting mechanical representations of partial products and arranged in sets corresponding to the different denominations of the figures in the first factor, means for initially retaining each template member in inoperative position, selective mechanism actuated by the numeral keys in the first of the said sets of keys for effecting the selection of templates in the said series, means for actuating said selective mechanism to release and render operative said selected template members, means whereby operation of a key in the said second set of numeral keys causes corresponding positioning of all the templates selected as the result of operation of keys in the first set of numeral keys, means whereby these selected and positioned templates are felt and the partial products thus ascertained in terms of distances moved these means comprising separately movable feeler members each having two connected parts with means tending to move each of these members first in one direction so as to feel one part of a template and then in the opposite direction so as to feel the other part of a template, and means whereby such second movement of each feeler member transmits into answer-indicating mechanism the amount represented by the distance then moved by the feeler member.

5. In a calculating machine of the type indicated the combination of a set of numeral keys by means of which the figures in the first factor are fed into the machine, a second set of numeral keys by means of which the figures in the second factor are fed into the machine, selective mechanism actuated by the numeral keys in the first of the said sets, such selective mechanism comprising a set of members actuated by the keys, a carriage with means for traversing this carriage relatively to the key-actuated members and a plurality of individually movable members mounted on the carriage and arranged in sets which function with respect to different denominations, members in each of these sets being adapted to be brought successively into registration with the key-actuated members as the carriage is traversed into successive positions, a series of separately rotatable templates mounted on a common axis and arranged in sets which function with respect to different denominations, means whereby these templates are individually retained initially in inoperative positions such retaining means being adapted to register with the movable members in the sets of these members on the carriage when they have been selected and moved by key actuation and when the carriage is traversed into successive positions, key-actuated means whereby members on the carriage which have been selected and moved are caused simultaneously to act on the template retaining means and thereby release corresponding templates which then move into operative positions, means actuated by the second set of numeral keys for imparting simultaneously to all the said selected and operative templates positioning movements determined by the value of the keys depressed, a series of separately movable feeler members functioning with respect to the different denomination sets of templates, such feeler members having two connected parts with means tending to move each of these members first in one direction so as to feel one part of a template and then in the opposite direction so as to feel the other part of a template, a toothed rack member associated and movable with each feeler member, answer-indicating mechanism comprising toothed wheels, and means whereby toothed wheels in this answer-indicating mechanism can be respectively brought into engagement with or disengaged from the toothed racks of feeler members, the engagement of the toothed wheels of the answer mechanism and the racks being determined so that the answer wheels are turned as the racks move when the associated feeler members severally make their second feeling movements.

6. The combination with the features as claimed in claim 1, of means for retaining while they are being felt the selected templates in the positions into which they are moved by the operation of a numeral key in the said second set, means for subsequently releasing these templates and permitting them to return to the positions previously occupied by them when primarily selected so that the same selected templates will be again positioned when the next key is operated to feed in the next figure in the second factor, the templates thus again positioned being again felt, means for transmitting the successive partial products thus ascertained in terms of distances moved into answer-indicating mechanism.

7. The combination recited in claim 5, in which the means for moving the feeling members includes a shaft with power-actuated means for rotating it, means for controlling the rotation of this shaft actuated by the several keys in the said second set of numeral keys so that when any one of these keys is operated the shaft will be permitted to rotate, an operative connection including a yielding device between the said shaft and the said feeler members, such operative connection as and when the shaft rotates tending to impart to the feeling members movement first in one direction and then in the opposite direction, said shaft being operatively connected with and serving to actuate the means whereby engagement and disengagement of the toothed wheels and racks is effected.

8. In a calculating machine of the type indicated the combination of a set of key-actuated members, a plurality of sets of individually movable members constituting mechanical representations of partial products the number of these members in each set corresponding to the number of the said key-actuated members, a carriage with means for traversing this carriage on the one hand relatively to the key-actuated members and on the other hand relatively to the partial product members, a plurality of sets of individually movable members corresponding in number to the partial product members and arranged in similar sets, these movable members being mounted on the said carriage and in such relation on the one hand to the key-actuated members and on the other hand to the partial product members that as the carriage is traversed the movable members thereon will be brought in successive sets into operative registration with the key-actuated members by means of which carriage members in successive sets can be selected and moved, such selected members being subsequently in operative registration with respect to partial product members, means whereby all these selected carriage members can be moved simultaneously and thereby caused to select and render operative corresponding partial product members, key-actuated means for imparting to the selected partial product members positioning movements determined by the value of a figure in the second factor, means for feeling these partial product members when thus positioned and thereby ascertaining the partial product values in terms of distances moved, and answer-indicating mechanism with means for transmitting these partial product values into this answer mechanism.

9. The combination with the features as claimed in claim 8, of key-actuated means whereby the carriage members selected by the actuation of all the keys when feeding in the figures in the first factor are moved simultaneously and caused to select and render operative corresponding partial product members.

10. In a calculating machine of the type indicated the combination of a set of key-actuated members by means of which the figures in the first factor are fed into the machine, a second set of key-actuated members by means of which the figures in the second factor are fed into the machine, a plurality of sets of individually movable members constituting mechanical representations of partial products the number of these members in each set corresponding to the number of the key-actuated members in the said first set, a carriage with means for traversing this carriage on the one hand relatively to the key-actuated members in the first of the said sets and on the other hand relatively to the partial product members, a plurality of sets of individually movable members corresponding in number to the partial product members and arranged in similar sets, these movable members being mounted on the said carriage and in such relation on the one hand to the said first set of key-actuated members and on the other hand to the partial product members that as the carriage is traversed the movable members thereon will be brought in successive sets into operative registration with the said key-actuated members by means of which carriage members in successive sets can be selected and moved, such selected members being subsequently in operative registration with respect to partial product members, key-actuated mechanism whereby all the selected carriage members can be moved simultaneously and thereby caused to select and render operative corresponding partial product members, means operated by the key-actuated members in the said second set for imparting to the selected partial product members positioning movements determined by the value of a figure in the second factor, means for feeling these partial product members when thus positioned and thereby ascertaining the partial product values in terms of distances moved, and answer-indicating mechanism with means for transmitting these partial product values into this answer mechanism.

11. In a calculating machine of the type indicated the combination of a set of key-actuated members, a plurality of sets of individually movable members constituting mechanical representations of partial products the numbers of these members in each set corresponding to the number of the said key-actuated members in the first set, a carriage with means for traversing this carriage on the one hand relatively to the key-actuated members and on the other hand relatively to the partial product members, a key-actuated escapement controlling the traversing of the carriage so that this traversing takes place with a step-by-step movement, a plurality of sets of individually movable members corresponding in number to the partial product members and arranged in similar sets, these movable members being mounted on the said carriage and in such relation on the one hand to the key-actuated members and on the other hand to the partial product members that as the carriage is traversed the movable members thereon will be brought in successive sets into operative registration with the key-actuated members by means of which carriage members in successive sets can be selected and moved, such selected members being subsequently in operative registration with respect to partial product members, means whereby all these selected carriage members can be moved simultaneously and thereby caused to select and render operative corresponding partial product members, key-actuated means for imparting to the selected partial product members positioning movements determined by the value of a figure in the second factor, means for feeling these partial product members when thus positioned and thereby ascertaining the partial product values in terms of distances moved, and answer-indicating mechanism with means for transmitting these partial product values into this answer mechanism.

12. In a calculating machine of the type indicated the combination of a set of key-actuated members, a plurality of sets of individually movable members constituting mechanical representations of partial products the number of these members in each set corresponding to the number of the said key-actuated members, means whereby each of these partial product members is retained in an inoperative position, a carriage with means for traversing this carriage on the one hand relatively to the key-actuated members and on the other hand relatively to the partial product members, a plurality of sets of individually movable members corresponding in number to the partial product members and arranged in similar sets, these movable members being mounted on the said carriage and in such relation on the one hand to the key-actuated members and on the other hand to the partial product members that as the carriage is traversed the movable members thereon will be brought into successive sets into operative registration with the key-actuated members by means of which carriage members in successive sets can be selected and moved, such selected members being subsequently in operative registration with respect to partial product members, means whereby all these selected carriage members can be moved simultaneously and thereby caused to select corresponding partial product members and by releasing these members to render them operative, a universal bar with means whereby the partial product members which have been selected and rendered operative are caused to move into contact with this bar, key-actuated means for imparting to the universal bar and through it to the selected partial product members positioning movements determined by the value of a figure in the second factor, means for feeling these partial product members when thus positioned and thereby ascertaining the partial product values in terms of distances moved, and answer-indicating mechanism with means for transmitting these partial product values into this answer mechanism.

13. In a calculating machine of the type indicated the combination of a set of key-actuated members by means of which the figures in the first factor are fed into the machine, a second set of key-actuated members by means of which the figures in the second factor are fed into the machine, a plurality of sets of individually movable members constituting mechanical representations of partial products the number of these members in each set corresponding to the number of the key-actuated members in the said first set, means whereby each of these partial product members is retained in an inoperative position, a carriage with means for traversing this carriage on the one hand relatively to the key-actuated members in the first of the said sets and on the other hand relatively to the partial product members, a plurality of sets of individually movable members corresponding in number to the partial product members and arranged in similar sets, these movable members being mounted on the said carriage and in such relation on the one hand to the said first set of key-actuated members and on the other hand to the partial product members that as the carriage is traversed the movable members thereon will be brought in successive sets into operative registration with the said key-actuated members by means of which carriage members in successive sets can be selected and moved, such selected members being subsequently in operative registration with respect to partial product members, means whereby all these selected carriage members can be moved simultaneously and thereby caused to select corresponding partial product members and by releasing these members to render them operative, a universal bar with means whereby the partial product members which have been selected and rendered operative are caused to move into contact with this bar, means operated by the key-actuated members in the said second set for imparting to the universal bar and through it to the selected partial product members positioning movements determined by the value of a figure in the second factor, means for feeling these partial products when thus positioned and thereby ascertaining the partial product values in terms of distances moved, and answer-indicating mechanism with means for transmitting these partial product values into this answer mechanism.

14. In a calculating machine of the type indicated the combination of a set of key-actuated members, a plurality of sets of individually movable members constituting mechanical representations of partial products the number of these members in each set corresponding to the number of the said key-actuated members, a plurality of devices corresponding in number to the number of the partial product members and arranged in similar sets each of these devices serving to retain a partial product member in an inoperative position, a carriage with means for traversing this carriage on the one hand relatively to the key-actuated members and on the other hand relatively to the devices which retain the partial product members, a plurality of sets of individually movable members corresponding in number to the partial product members and arranged in similar sets, these movable members being mounted on the said carriage and in such relation on the one hand to the key-actuated members and on the other hand to the said devices which retain the partial product members that as the carriage is traversed the movable members thereon will be brought in successive sets into operative registration with the key-actuated members by means of which carriage members in successive sets can be selected and moved, such selected members being subsequently in operative registration with respect to the said retaining devices, means whereby all these selected carriage members can be moved simultaneously and thereby caused to act on certain of the said retaining devices thus selecting and releasing corresponding partial product members which are thus rendered operative, a universal bar with means whereby the partial product members which have been selected and rendered operative are caused to move into contact with this bar, key-actuated means for imparting to the universal bar and through it to the selected partial product members positioning movements determined by the value of a figure in the second factor, means for feeling these partial products when thus positioned and thereby ascertaining the partial product values in terms of distances moved, and answer-indicating mechanism with means for transmitting these partial product values into this answer mechanism.

15. In a calculating machine of the type indicated the combination of a set of key-actuated members, a plurality of sets of individually movable members constituting mechanical representations of partial products the number of these members in each set corresponding to the number of the said key-actuated members, a carriage with means for traversing this carriage on the one hand relatively to the key-actuated members and on the other hand relatively to the partial product members, a plurality of sets of individually movable members corresponding in number to the partial product members and arranged in similar sets, these movable members being mounted on the said carriage and in such relation on the one hand to the key-actuated members and on the other hand to the partial product members that as the carriage is traversed the movable members thereon will be brought in successive sets into operative registration with the key-actuated members by means of which carriage members in successive sets can be selected and moved such selected members being subsequently in operative registration with respect to partial product members, means whereby the carriage as a whole with the members thereon can be moved in a direction transverse to the direction in which the carriage moves as it is traversed such transverse movement of the carriage causing the members thereon which have been selected and moved to select and render operative corresponding partial product members, key-actuated means for imparting to the selected partial product members positioning movements determined by the value of a figure in the second factor, means for feeling these partial product members when thus positioned and thereby ascertaining the partial product values in terms of distances moved, and answer-indicating mechanism with means for transmitting these partial product values into this answer mechanism.

16. In a calculating machine of the type indicated the combination of a set of key-actuated members, a plurality of sets of individually movable members constituting mechanical representations of partial products the number of these members in each set corresponding to the number of the said key-actuated members, means whereby each of these partial product members is retained in an inoperative position, a framing mounted so that it can swing, a carriage mounted on this swinging frame so that it can slide thereon in a direction parallel to the axis about which the frame swings the carriage as it slides moving on the one hand relatively to the key-actuated members and on the other hand relatively to the partial product members, means for sliding this carriage on the swinging frame, a plurality of sets of individually movable members corresponding in number to the partial product members and arranged in similar sets, these movable members being mounted on the said carriage and in such relation on the one hand to the key-actuated members and on the other hand to the partial product members that as the carriage slides the movable members thereon will be brought in successive sets into operative registration with the key-actuated members by means of which carriage members in successive sets can be selected and moved, such selected members being subsequently in operative registration with respect to partial product members, means for swinging the frame with the carriage thereon whereby the carriage members which have been selected and moved are caused to select corresponding partial product members and by releasing these members to render them operative, a universal bar with means whereby the partial product members which have been selected and rendered operative are caused to move into contact with this bar, key-actuated means for imparting to the universal bar and through it to the selected partial product members positioning movements determined by the value of a figure in the second factor, means for feeling these partial product members when thus positioned and thereby ascertaining the partial product values in terms of distances moved, and answer-indicating mechanism with means for transmitting these partial product values into this answer mechanism.

17. In a canculating machine of the type indicated the combination of a set of key-actuated members, a plurality of sets of individually movable members constituting mechanical representations of partial products the number of these members in each set corresponding to the number of the said key-actuated members, a carriage with means for traversing this carriage on the one hand relatively to the key-actuated members and on the other hand relatively to the partial product members, a plurality of sets of individually movable members corresponding in number to the partial product members and arranged in similar sets, these members being mounted so that each of them can slide on the said carriage in a direction transverse to the direction in which the traversing movement of the carriage takes place each member having a part adapted to be brought into operative registration with one of the key-actuated members so that as the carriage is traversed members thereon in successive sets can be selected and moved by the key-actuated members, each of the said carriage members having also a part which when the member has been selectively moved and as the carriage is traversed will be brought into operative registration with respect to one of the partial product members, means whereby all these members which have been selected and moved in succession on the carriage can be moved simultaneously and thereby caused to select and render operative corresponding partial product members, key-actuated means for imparting to the selected partial product members positioning movements determined by the value of a figure in the second factor, means for feeling these partial product members when thus positioned and thereby ascertaining the partial product values in terms of distances moved, and answer-indicating mechanism with means for transmitting these partial product values into this answer mechanism.

18. In a calculating machine of the type indicated the combination of a set of key-actuated members, a plurality of sets of individually movable members constituting mechanical representations of partial products the number of these members in each set corresponding to the number of the said key-actuated members, means whereby each of these partial product members is retained in an inoperative position, a framing mounted so that it can swing, a carriage mounted on this framing so that it can slide thereon in a direction parallel to the axis about which the frame swings the carriage as it slides moving on the one hand relatively to the key-actuated members and on the other hand relatively to the partial product members, means for sliding this carriage on the swinging frame, a plurality of sets of individually movable members corresponding in number to the partial product members and arranged in similar sets these members being mounted so that each of them can slide on the said carriage in a direction transverse to the direction in which the carriage as a whole slides on the swinging frame, each member having a part adapted to be brought into operative registration with one of the key-actuated members so that as the carriage slides members thereon in successive sets can be selected and moved by one of the key-actuated members, each of the said carriage members having also a laterally projecting part which when the member has been selectively moved and as the carriage slides will be brought into operative registration with respect to one of the partial product members, means for swinging the frame with the carriage thereon whereby the lateral projections of the carriage members which have been selected and moved are all simultaneously caused to select corresponding partial product members and by releasing these members to render them operative, key-actuated means for imparting to the selected partial product members positioning movements determined by the value of a figure in the second factor, means for feeling these partial product members when thus positioned and thereby ascertaining the partial product values in terms of distances moved, and answer-indicating mechanism with means for transmitting these partial product values into this answer mechanism.

19. In a calculating machine of the type indicated the combination of a set of keys, a series of separately rotatable notched template members mounted on a common axis, means whereby all these template members are retained initially in inoperative positions, key-actuated mechanism whereby certain of these template members are successively selected and simultaneously moved into operative position such selection being in accordance with the figures in the first factor, key-actuated mechanism whereby these selected templates are rotationally positioned in accordance with the value of a figure in the second factor to represent partial products, means for feeling these selected and positioned templates, answer-indicating mechanism, and means whereby the partial product values ascertained in terms of distances moved by feeling these templates are communicated to the answer-indicating mechanism.

20. In a calculating machine of the type indicated the combination of a set of keys, a series of separately rotatable notched template members mounted on a common axis, means whereby all these template members are retained initially in inoperative positions, selecting mechanism actuated by the keys when the latter are operated to feed in the figures in the first factor, means whereby subsequent to the operation by the keys of this selecting mechanism the latter causes template members to be simultaneously selected and moved into operative position key-actuated mechanism whereby these selected templates are rotationally positioned in accordance with the value of a figure in the second factor to represent partial products, means for feeling these selected and positioned templates, answer-indicating mechanism, and means whereby the partial product values ascertained in terms of distances moved by feeling these templates are communicated to the answer-indicating mechanism.

21. In a calculating machine of the type indicated the combination of a set of keys, a series of separately rotatable notched template members mounted on a common axis, means whereby all these template members are retained initially in inoperative positions, key-actuated mechanism whereby certain of these template members are successively selected and simultaneously moved into operative position such selection being in accordance with the figures in the first factor, key-actuated mechanism whereby these selected templates are simultaneously rotationally positioned in accordance with the value of a figure in the second factor to represent partial products, means for feeling these selected and positioned templates, answer-indicating mechanism, and means whereby the partial product values ascertained in terms of distances moved by feeling these templates are communicated to the answer-indicating mechanism.

22. In a calculating machine of the type indicated the combination of a set of keys, a series of separately rotatable notched template members mounted on a common axis, means whereby all these template members are retained initially in inoperative positions, key-actuated mechanism whereby certain of these template members are successively selected and simultaneously rendered operative such selection being in accordance with the figures in the first factor, a universal bar with means whereby the templates which have been selected and rendered operative are caused to move into contact with this bar, key-actuated mechanism whereby there is imparted to the universal bar a positioning movement determined by the value of a figure in the second factor such movement of the universal bar correspondingly positioning rotationally and simultaneously all the selected templates which are in contact with the bar to represent partial products, means for feeling these selected and positioned templates, answer-indicating mechanism, and means whereby the partial product values ascertained in terms of distances moved by feeling these templates are communicated to the answer-indicating mechanism.

23. In a calculating machine of the type indicated the combination of a set of keys, a series of separately rotatable notched template members mounted on a common axis, these template members being arranged in sets corresponding to the several denominations of the figures in the first factor, means whereby all these template members are retained initially in inoperative positions, key-actuated mechanism whereby template members in separate sets are successively selected and simultaneously moved into operative position, such selection being in accordance with the figures in the first factor, key-actuated mechanism whereby these selected templates are rotationally positioned in accordance with the value of a figure in the second factor to represent partial products, means for feeling these selected and positioned templates, answer-indicating mechanism, and means whereby the partial product values ascertained in terms of distances moved by feeling these templates are communicated to the answer-indicating mechanism.

24. In a calculating machine of the type indicated the combination of a set of keys, a series of separately rotatable notched template members mounted on a common axis, means whereby all these template members are retained initially in inoperative positions, key-actuated mechanism whereby certain of these template members are selected in accordance with the figures in the first factor, means whereby a template mmeber thus selected is caused to rotate from its initial inoperative position into an operative position such rotation in the case of all the templates being through the same angle, key-actuated mechanism whereby the selected templates are rotationally positioned in accordance with the value of a figure in the second factor to represent partial products, means for feeling these selected and positioned templates, answer-indicating mechanism, and means whereby the partial product values ascertained in terms of distances moved by feeling these templates are communicated to the answer-indicating mechanism.

25. In a calculating machine of the type indicated the combination of a set of keys, a series of separately rotatable notched template members mounted on a common axis, a series of catch devices each serving to retain a template member initially in an inoperative position, key-actuated mechanism whereby certain of these template members are successively selected and are simultaneously rendered operative by releasing their catch devices, such selection being in accordance with the figures in the first factor, key-actuated mechanism whereby these selected and released templates are rotationally positioned in accordance with the value of a figure in the second factor to represent partial products, means for feeling these selected and positioned templates, answer-indicating mechanism and means whereby the partial product values ascertained in terms of distances moved by feeling these templates are communicated to the answer-indicating mechanism.

26. In a calculating machine of the type indicated the combination of a set of keys, a series of separately rotatable template members mounted on a common axis each of these members having two angularly separated parts which are respectively formed to represent numerical values, the one such part of a template representing units values of partial products and the other part representing tens values of partial products, means whereby all these template members are retained initially in inoperative positions, key-actuated mechanism whereby certain of these template members are successively selected and simultaneously moved into operative position such selection being in accordance with the figures in the first factor, key-actuated mechanism whereby these selected templates are rotationally positioned in accordance with the value of a figure in the second factor, means for feeling these selected and positioned templates such feeling being effected as to the units portion of one template and the tens portion of another template these feeling movements representing in terms of distance the sum of the numerical values of the two template parts thus felt, answer-indicating mechanism, and means whereby the partial product values thus ascertained are communicated to the answer-indicating mechanism.

27. In a calculating machine of the type indicated the combination of a set of keys, a series of separately rotatable template members mounted on a common axis each of these members having two angularly separated parts which are respectively formed to represent numerical values, the one such part of a template representing units values of partial products and the other part representing tens values of partial products, means whereby all these template members are retained initially in inoperative positions, key-actuated mechanism whereby certain of these template members are successively selected and simultaneously rendered operative such selection being in accordance with the figures in the first factor, key-actuated mechanism whereby these selected templates are rotationally positioned in accordance with the value of a figure in the second factor, a series of feeling members each of which can move in either direction from a mid or neutral position the movement of each feeling member in one direction causing it to feel the tens portion of one template while when the member then moves in the other direction it will feel the units portion of another template, the whole distance through which the feeling member moves when making its second feeling movement corresponding to the sum of the numerical values represented by the parts of the two templates thus felt, means for imparting to the several feeling members the said movements in either direction, answer-indicating mechanism, and means whereby the partial product values ascertained by these feeling members in terms of distances moved are communicated to the answer-indicating mechanism.

28. In a calculating machine of the type indicated the combination of a set of keys, a series of separately rotatable template members mounted on a common axis each of these members having two angularly separated parts which are respectively formed to represent numerical values, the one such part of a template representing units values of partial products and the other part representing tens values of partial products, means whereby all these template members are retained initially in inoperative positions, key-actuated mechanism whereby certain of these template members are successively selected and simultaneously rendered operative such selection being in accordance with the figures in the first factor, key-actuated mechanism whereby these selected templates are rotationally positioned in accordance with the value of a figure in the second factor, a series of separately movable feeler members each having two parts adapted respectively to feel the tens portion of one template and the units portion of another template the two parts of each feeler being connected so that they will move together as the feeler is moved in either direction from a mid or neutral position, means for imparting to the several feeling members movements first in one direction and then in the opposite direction whereby the tens and units portions of the selected and positioned templates are severally felt, answer-indicating mechanism, and means whereby the partial product values thus ascertained in terms of distances moved are communicated to the answer-indicating mechanism.

29. In a calculating machine of the type indicated the combination of a set of keys, a series of separately rotatable template members mounted on a common axis each of these members having two angularly separated parts which are respectively formed to represent numerical values, the one such part of a template representing units values of partial products and the other part representing tens values of partial products, means whereby all these template members are retained initially in inoperative positions, key-actuated mechanism whereby certain of these template members are successively selected and simultaneously rendered operative such selection being in accordance with the figures in the first factor, key-actuated mechanism whereby these selected templates are rotationally positioned in accordance with the value of a figure in the second factor, a series of feeling members each of which can move in either direction from a mid or neutral position the movement of each feeling member in one direction causing it to feel the tens portion of one template while when the member then moves in the other direction it will feel the units portion of another template, the whole distance through which the feeling member moves when making its second feeling movement corresponding to the sum of the numerical values represented by the parts of the two templates thus felt, means for imparting to the several feeling members the said movements in either direction, a toothed rack connected to and movable with each feeler member, answer-indicating mechanism comprising toothed wheels adapted to engage with the feeler racks such answer-indicating mechanism being mounted as a whole so as to be movable relatively to all the feeler racks, means for moving the answer mechanism so as to cause the wheels thereof to engage with the feeler racks and maintain them in such engagement while the feeler members are making their said second feeling movements.

30. In a calculating machine of the type indicated the combination of a series of separately rotatable template members mounted on a common axis each template having two angularly separated parts respectively formed to represent the numerical values of units and tens in partial products, key-actuated means for selecting these templates and for rotationally positioning the selected templates, a series of separately movable feeler members each having two connected parts which are adapted when the feeler member is moved in one direction from a neutral position to feel one part of a template and when the feeler is moved in another direction to feel the second part of a template, means for moving the feeler members first in one direction and then in another direction, answer-indicating mechanism, and means for transmitting into this answer mechanism the partial products ascertained in terms of the distances moved as the feelers make their said second feeling movements.

31. In a calculating machine of the type indicated the combination of a series of separately rotatable template members mounted on a common axis each template having two angularly separated parts respectively formed to represent the numerical values of units and tens in partial products, key-actuated means for selecting these templates and for rotationally positioning the selected templates, a series of separately movable feeler members each having two connected parts which are adapted when the feeler member is moved in one direction from a neutral position to feel one part of a template and when the feeler is moved in another direction to feel the second part of a template, means for moving the feeler members first in one direction and then in another direction, answer-indicating mechanism, means for operatively connecting the several feeler members with the answer-indicating mechanism whereby the partial products ascertained in terms of distances moved by the feelers are transmitted into the answer mechanism, and means for interrupting such operative connections when the feeler members move in one direction and for establishing such operative connections when the feeler members move in the second direction.

32. In a calculating machine of the type indicated the combination of a series of separately rotatable template members mounted on a common axis each template having two angularly separated parts respectively formed to represent the numerical values of units and tens in partial products, key-actuated means for selecting these templates and for rotationally positioning the selected templates, a series of separately movable feeler members each having two connected parts which are adapted when the feeler member is moved in one direction from a neutral position to feel one part of a template and when the feeler is moved in another direction to feel the second part of a template, means for moving the feeler members first in one direction and then in another direction, a series of toothed racks movably mounted and each connected to a feeler member so as to be movable therewith, answer-indicating mechanism comprising toothed wheels, and means for bringing the toothed wheels of the answer mechanism into engagement with the toothed racks of the several feeler members so that wheels of the answer mechanism will be turned and set as and in accordance with the movements of the feeler members as they make their said second feeling movements.

33. In a calculating machine of the type indicated the combination of a series of separately rotatable template members mounted on a common axis each template having two angularly separated parts respectively formed to represent the numerical values of units and tens in partial products, key-actuated means for selecting these templates and for rotationally positioning the selected templates, a series of separately movable feeler members each comprising two separated parts rigidly connected to a member mounted so that it can swing about an axis these two parts being adapted when the feeler member is swung in one direction from a neutral position to feel one part of a template and when the feeler is swung in the other direction to feel the second part of a template, a toothed quadrant connected to each feeler member, means for swinging all the feeler members simultaneously first in one direction and then in the other direction, answer-indicating mechanism comprising toothed wheels adapted to engage the toothed quadrants of the feeler members, means for moving the answer-indicating mechanism as a whole relatively to the toothed quadrants so as to bring the wheels of this mechanism into engagement with or disengage them from the quadrants, and means controlling this movement of the answer mechanism relatively to the toothed quadrants so that these parts will be in engagement when the feeler members are swung so as to make their said second feeling movements.

34. In a calculating machine of the type indicated the combination of a series of separately rotatable template members mounted on a common axis and arranged in sets which function in respect of different denominations each template having two angularly separated parts respectively formed to represent the numerical values of units and tens in the partial products, key-actuated means for selecting these templates and for rotationally positioning these selected templates, a series of separately movable feeler members each having two connected parts which are adapted when the feeler member is moved in one direction from a neutral position to feel one part of a template in one denomination set and when the feeler member is moved in another direction to feel the second part of a template in another denomination set, means for moving the feeler members first in one direction and then in another direction, answer-indicating mechanism, and means for transmitting into this answer-indicating mechanism the partial products ascertained in terms of the distances moved as the feelers make their said second feeling movements.

35. In a calculating machine of the type indicated the combination of a series of separately rotatable template members mounted on a common axis and arranged in sets which function in respect of different denominations each template having two angularly separated parts respectively formed to represent the numerical values of units and tens in the partial products, key-actuated means for selecting these templates and for rotationally positioning these selected templates, a series of separately movable feeler members each having two connected parts which are adapted when the feeler member is moved in one direction from a neutral position to feel first the one part representing tens of a template in one denomination set and then when the feeler is moved in another direction to feel the other part representing units of a template in the next adjacent denomination set, this second feeler movement thus being through a distance which represents the sum of the tens figure in one denomination set and the units figure in the next denomination set, means for moving the feeler members first in one direction and then in another direction, answer-indicating mechanism, and means for transmitting into this answer-indicating mechanism the partial product values represented by the said second movement of the several feeler members.

36. In a calculating machine of the type indicated the combination of a series of separately rotatable template members mounted on a common axis each template having two angularly separated parts respectively formed to represent the numerical values of units and tens in partial products, key-actuated means for selecting these templates and for rotationally positioning the selected templates, a series of separately movable feeler members each having two connected parts which are adapted when the feeler member is moved in one direction from a neutral position to feel one part of a template and when the feeler is moved in another direction to feel the second part of a template, a power driven shaft, a key-actuated escapement controlling the rotation of this shaft, an operative connection between this shaft and the feeler members such that as the shaft rotates these feeler members will be moved first in one direction and then in another direction, answer-indicating mechanism, and means for transmitting into this answer mechanism the partial products ascertained in terms of the distances moved as the feelers make their said second feeling movements.

37. In a calculating machine of the type indicated the combination of a series of separately rotatable template members mounted on a common axis each template having two angularly separated parts respectively formed to represent the numerical values of units and tens in partial products, key-actuated means for selecting these templates and for rotationally positioning the selected templates, a series of separately movable feeler members each having two connected parts which are adapted when the feeler member is moved in one direction from a neutral position to feel one part of a template and when the feeler is moved in another direction to feel the second part of a template, a power driven shaft, a key-actuated escapement controlling the rotation of this shaft, an operative connection between this shaft and the feeler members such that as the shaft rotates these feeler members will be moved first in one direction and then in another direction, answer-indicating mechanism, means controlled by the said power driven shaft for operatively connecting the several feeler members with the answer-indicating mechanism whereby the partial products ascertained in terms of distances moved by the feelers are transmitted into the answer-indicating mechanism, said control causing the operative connection between the feeler members and the answer-indicating mechanism to be established as and when the feeler members move in the second direction.

38. In a calculating machine, the combination with key actuated mechanism, of a plurality of elements associated with said mechanism and adapted to be positioned thereby to represent partial products, a plurality of unitary feeling members, and means for shifting said unitary members to cause separate but rigidly connected parts of each of the latter to contact successively with two of said elements.

39. In a calculating machine, the combination with key actuated mechanism, of a plurality of elements associated with said mechanism and adapted to be positioned thereby to represent partial products, said key actuated mechanism including means for selecting certain of said elements and shifting the selected elements from an inoperative to an operative position, and means for engaging and moving only the elements thus shifted to position the same so as to represent partial products.

40. In a calculating machine, the combination with key actuated mechanism, of a plurality of elements associated with said mechanism and adapted to be positioned thereby to represent partial products, and means for mounting said elements for rotation, said key actuated mechanism including means for selecting certain of said elements and rotating the selected elements from an operative to an inoperative position, and means for engaging and rotating the elements occupying such operative position to locate the same so as to represent partial products.

41. In a calculating machine, the combination with two sets of numeral keys, of a plurality of elements, each adapted to be positioned to represent a partial product, means associated with the keys of one of said sets for effecting the positioning of pre-selected elements of said plurality of elements, means associated with the keys of the other of said sets for pre-selecting said elements, means associated with the elements and the keys of the first named set for effecting movement of such pre-selected elements into operative relationship with said first named means, a plurality of unitary feeling members, and means for shifting said unitary members to cause each of the latter to contact successively with two of said elements.

42. In a calculating machine, the combination with key actuated mechanism, of a plurality of elements associated with said mechanism and adapted to be positioned thereby to represent partial products, a plurality of unitary feeling members, means for shifting said unitary members to cause each of the latter to contact successively with two of said elements, and means for mounting said elements for independent rotative movement, said key actuated mechanism including means movable to rotate said elements to position the latter to represent partial products, and means for effecting rotation of selected elements into operative relation with said last named means.

43. In a calculating machine, the combination with two sets of numeral keys, of a plurality of elements each adapted to be positioned to represent a partial product and initially occupying inoperative positions, means associated with the keys of the first set for effecting selection of one or more of said elements, means associated with said elements and the keys of the second set for shifting the selected elements to operative position upon operation of any one of said keys, and means actuated by said keys of the second set for simultaneously positioning all of the selected elements to represent partial products.

44. In a calculating machine, the combination with two sets of numeral keys, of a plurality of elements each adapted to be positioned to represent a partial product, means for initially retaining said elements in inoperative position, means actuated by keys in the first set for selecting said elements, means actuated by operation of any one of the keys of said second set for releasing the selected elements for movement, and means actuated by the keys of said second set for positioning the released elements to represent partial products.

45. In a calculating machine, the combination with a set of multiplicand keys and a set of multiplier keys, each set including one key only for each digit, a plurality of elements adapted to be positioned to represent partial products, means associated with the multiplicand keys for selecting elements corresponding to the keys upon successive operation of the keys, and means actuated by successive operation of said multiplier keys for positioning all of the selected elements to represent partial products as each such key is operated.

46. In a calculating machine, the combination with a set of multiplicand keys and a set of multiplier keys, each set including one key only for each digit, a plurality of elements adapted to be positioned to represent partial products, said elements initially occupying an inoperative position, means associated with the multiplicand keys for selecting elements corresponding to the keys upon successive operation of the keys, means for shifting the selected elements to operative position upon operation of any multiplier key, and means actuated by successive operation of said multiplier keys for positioning all of the elements thus rendered operative to represent partial products as each such key is operated.

47. In a calculating machine, the combination with key actuated mechanism, of a plurality of elements associated with said mechanism and adapted to be positioned thereby to represent partial products, a plurality of unitary feeling members, means for shifting said unitary members to cause each of the latter to contact successively with two of said elements, an accumulator, and means associated with said feeling members and actuated thereby only during movement of the latter from engagement with one such element into engagement with the other of such elements for feeding the total amount thus ascertained by each feeling member into the accumulator.

48. In a calculating machine, the combination with numeral keys, of a plurality of elements adapted to be positioned to represent partial products, means arranged to simultaneously engage and move in the same direction all pre-selected elements of said plurality of elements to position the same to represent partial products, means initially retaining said elements in inoperative position out of the path of element positioning movement of said first named means, and key actuated mechanism for pre-selecting and releasing the pre-selected elements for engagement with said first named means.

49. In a calculating machine, the combination with numeral keys, of a plurality of elements adapted to be positioned to represent partial products, means arranged to simultaneously engage and move pre-selected elements of said plurality of elements to position the same to represent partial products, means initially retaining said elements in inoperative position out of the path of element positioning movement of said first named means, key actuated mechanism for pre-selecting and releasing the pre-selected elements for engagement with said first named means, and means for moving said first named means beyond the path of element positioning movement to restore said elements to inoperative position.

50. In a calculating machine, the combination with a plurality of movable elements adapted to be positioned to represent partial products, of means for selecting certain of said elements for positioning movement, said means comprising a set of numeral keys representing each of the digits, a plurality of sets of members, each set corresponding to a different order of digits, means for shifting said members on successive operation of said keys to bring the different sets of members successively into operative relationship with said keys, means for shifting one member in each set on operation of the corresponding key to place such members in operative relation with corresponding elements of said plurality of elements, means for imparting an additional movement to the members thus shifted, and means associated with said elements and actuated by the shifted members upon such additional movement for rendering the corresponding elements operative.

51. In a calculating machine, the combination with a plurality of movable elements adapted to be positioned to represent partial products, of means for selecting certain of said elements for positioning movement, said means comprising a set of numeral keys representing each of the digits, a plurality of sets of members, each set corresponding to a different order of digits, means for shifting said members on successive operation of said keys to bring the different sets of members successively into operative relationship with said keys, means for shifting one member in each set on operation of the corresponding key to place such members in operative relation with corresponding elements of said plurality of elements, a second similar set of numeral keys, means associated with said second set of keys for imparting an additional movement to the members thus shifted on actuation of any of the keys of said second set, mechanism actuated by said second set of keys for positioning said elements to represent partial products, and means associated with said elements and actuated by the shifted members upon such additional movement for rendering the corresponding elements operative.

52. In a calculating machine for performing multiplication, the combination with two sets of numeral keys, of a plurality of elements adapted to be positioned to represent partial products, means actuated by keys in the first set for effecting preliminary selection of said elements, and means actuated by operation of any key in the second set for completing the selection of and positioning of all of the selected elements.

53. In a calculating machine for performing multiplication, the combination with two sets of numeral keys, of a plurality of elements adapted to be positioned to represent partial products, means actuated by keys in the first set for effecting preliminary selection of said elements, means actuated by operation of any key in the second set for completing the selection and positioning of all of the selected elements, and means actuated by the said operation of the key in the second set for totalling the partial products thus represented.

54. In a calculating machine for performing multiplication, the combination with two sets of numeral keys, each set representing one series only of digits, of a plurality of elements adapted to be positioned to represent partial products, means actuated by keys in the first set for effecting preliminary selection of said elements, and means actuated by operation of any key in the second set for completing the selection and positioning all of the selected elements.

55. In a calculating machine for performing multiplication, the combination with two sets of numeral keys, of a plurality of elements adapted to be positioned to represent partial products, means actuated by keys in the first set for effecting preliminary selection of said elements, means actuated by operation of any key in the second set for completing the selection and positioning of all of the selected elements, said last named means being actuated by successive operation of keys in the second set to successively position said selected elements, and means actuated by successive operation of keys in the second set for successively totalling the partial products thus represented.

56. In a calculating machine for performing multiplication, the combination with two sets of numeral keys, of a plurality of elements adapted to be positioned to represent partial products, means actuated by keys in the first set for effecting preliminary selection of said elements, means actuated by operation of any key in the second set for completing the selection and positioning of all of the selected elements, and means associated with said first named means for effecting selection of elements representing zero when a number of digits entered by operation of keys in said first set is less than a predetermined number.

57. In a calculating machine for performing multiplication, the combination with two sets of numeral keys, means actuated by successive operation of keys in said first set for feeding in succession digits of different orders of a first factor into the machine, means actuated by sucessive operation of keys in said second set for feeding in succession digits of different orders of a second factor into the machine, and means actuated by operation of the first key in said second set of keys for feeding in a sufficient number of zero digits in the first factor to provide for the feeding in of a fixed number of digits in the first factor on each operation of the machine.

58. In a calculating machine for performing multiplication, the combination with two sets of numeral keys, of a plurality of elements adapted to be positioned to represent partial products, means actuated by successive operation of keys in the first set for selecting certain of said elements representing digits of different orders in one factor, and means actuated by successive operation of keys in the second set for successively positioning all of the selected elements.

59. In a calcualting machine for performing multiplication, the combination with two sets of numeral keys, of a plurality of elements adapted to be positioned to represent partial products, means actuated by successive operation of keys in the first set for selecting certain of said elements representing digits of different orders in one factor, means actuated by successive operation of keys in the second set for successively positioning all of the selected elements, and means actuated by operation of each key in the second set and acting immediately following the positioning of the elements for totalling the partial products represented.

60. In a calculating machine for performing multiplication, the combination with two sets of numeral keys, of a plurality of elements adapted to be positioned to represent partial products, means actuated by successive operation of keys in the first set for selecting certain of said elements representing digits of different orders in one factor, means for automatically selecting elements representing zero digits in orders not included by operation of keys in the first set, and means actuated by successive operation of keys in the second set for successively positioning all of the selected elements.

61. In a calculating machine for performing multiplication, the combination with two sets of numeral keys, of a plurality of elements adapt- to be positioned to represent partial products, means responsive to actuation of the keys in one set for selecting certain of said elements, key actuated mechanism for rendering the selected elements operative, and means actuated by successive operation of keys in the second set for successively positioning all of said selected and operative elements, 62. In a calculating machine for performing multiplication, the combination with two sets of numeral keys, of a plurality of elements adapted to be positioned to represent partial products, each element having two portions representing digits of adjacent orders, means responsive to actuation of the keys in one set for selecting certain of said elements, key actuated mechanism for rendering the selected elements operative, means actuated by successive operation of keys in the second set for successively positioning all of said selected and operative elements, and members actuated by operation of each key in the second set for engaging such portions of separate elements as represent digits of the same order.

63. In a calculating machine for performing multiplication, the combination with two sets of numeral keys, of a plurality of elements adapted to be positioned to represent partial products, each element having two portions representing digits of adjacent orders, means responsive to actuation of the keys in one set for selecting certain of said elements, key actuated mechanism for rendering the selected elements operative, means actuated by successive operation of keys in the second set for successively positioning all of said selected and operative elements, and members actuated by operation of each key in the second set for engaging such portions of separate elements as represent digits of the same order, each member being adapted to move in one direction to engage one element, and in the other direction to engage the other element.

64. In a calculating machine for performing multiplication, the combination with a plurality of elements adapted to be positioned to represent partial products, each of said elements having two portions representing digits of adjacent orders, means for selecting and moving certain of said elements in one direction to render the selected elements operative, and means for moving said selected and operative elements in the oposite direction to position the same, and means associated with said elements for totalling the partial products thus represented.

65. In a calculating machine for performing multiplication, the combination with a plurality of elements adapted to be positioned to represent partial products, each of said elements having two portions representing digits of adjacent orders, means for selecting and moving certain of said elements in one direction to render the selected elements operative, means for moving said selected and operative elements in the opposite direction to position the same, and means associated with said elements for totalling the partial products thus represented, said last named means comprising a plurality of members each movable in opposite directions to engage first a portion of one element representing a digit and thereafter a portion of a second element representing a digit of the same order.

66. In a calculating machine for performing multiplication, the combination with a plurality of elements adapted to be positioned to represent partial products, each of said elements having two portions representing digits of adjacent orders, means for selecting and moving certain of said elements in one direction to render the selected elements operative, means for moving said selected and operative elements in the opposite direction to position the same, means associated with said elements for totalling the partial products thus represented, said last named means comprising a plurality of members each movable in opposite directions to engage first a portion of one element representing a digit and thereafter a portion of a second element representing a digit of the same order, and a totalizer driven by each member during movement thereof from one element engaging position to the other element engaging position only.

67. In a calculating machine of the type indicated, the combination of a set of numeral keys by means of which the figures in the first factor are fed into the machine, a second set of numeral keys by means of which the figures in the second factor are fed into the machine, a series of separately rotatable template members constituting mechanical representations of partial products and arranged in sets corresponding to the different denominations of the figures in the first factor, means for initially retaining each template member in inoperative position, selective mechanism actuated by the numeral keys in the first of the said sets of keys for effecting the selection of templates in the said series, means for actuating said selective mechanism to release and render operative said selected template members, means whereby operation of a key in the said second set of numeral keys causes corresponding positioning of all the templates selected as the result of operation of keys in the first set of numeral keys, a rotatable shaft, power-actuated means for rotating said shaft, means for retaining said shaft against rotation, said means being operable on actuation of a key in the second set of numeral keys for releasing said shaft for rotation, answer indicating mechanism, and mechanism actuated by rotation of the shaft for feeling the selected and positioned template members and transmitting the partial products thus ascertained into the answer indicating mechanism.

68. In a calculating machine, the combination with two sets of numeral keys, of a plurality of elements, each adapted to be positioned to represent a partial product, means associated with the keys of one of said sets for effecting the positioning of pre-selected elements of said plurality of elements, means associated with the keys of the other of said sets for pre-selecting said elements, and key actuated means for effecting movement of the pre-selected elements into operative relationship with said first named means.

HAROLD ISHERWOOD.